US012342756B2

(12) United States Patent
Vandike et al.

(10) Patent No.: US 12,342,756 B2
(45) Date of Patent: Jul. 1, 2025

(54) SYSTEMS AND METHODS FOR PREDICTIVE HARVESTING LOGISTICS

(71) Applicant: Deere & Company, Moline, IL (US)

(72) Inventors: Nathan R. Vandike, Geneseo, IL (US); Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 174 days.

(21) Appl. No.: 18/171,559

(22) Filed: Feb. 20, 2023

(65) Prior Publication Data

US 2024/0049637 A1 Feb. 15, 2024

Related U.S. Application Data

(63) Continuation of application No. PCT/US2022/040067, filed on Aug. 11, 2022.

(51) Int. Cl.
*A01D 41/127* (2006.01)
*A01D 90/10* (2006.01)
*G05D 1/00* (2006.01)

(52) U.S. Cl.
CPC ..... *A01D 41/1278* (2013.01); *A01D 41/1277* (2013.01); *A01D 90/105* (2013.01);
(Continued)

(58) Field of Classification Search
CPC ............ A01D 41/1278; A01D 41/1277; A01D 90/105; G05D 1/0219; G05D 1/0274; G05D 1/0287; G05D 2105/15; G05D 2105/28; G05D 2107/21; G05D 2109/10; G05D 1/6985; G06Q 10/06316
See application file for complete search history.

(56) References Cited

U.S. PATENT DOCUMENTS 5,957,304 A 9/1999 Dawson
6,327,569 B1 12/2001 Reep
(Continued)

FOREIGN PATENT DOCUMENTS

WO WO 2024035410 A1 2/2024

OTHER PUBLICATIONS

The International Search Report and the Written Opinion of the International Searching Authority issued in counterpart application No. PCT/US2022/40067, dated Nov. 4, 2022, 14 pages.

*Primary Examiner* — Ashley L Redhead, Jr.
(74) *Attorney, Agent, or Firm* — Kelly, Holt & Christenson; Joseph R. Kelly

(57) ABSTRACT

A computer implemented method includes receiving a map that maps values of a crop characteristic to different locations across a field; receiving harvester route data indicative of a planned route of a harvester at the field; identifying a crop characteristic threshold; identifying a material transfer end location indicative of a location, along the planned route of the harvester, at which a material transfer operation between the harvester and a receiving machine is to end, based on the map, the planned route of the harvester, and the crop characteristic threshold; identifying a material transfer start location range indicative of a geographic area, along the planned route of the harvester, at which the material transfer operation is to start based on the material transfer end location; and generating a route for the receiving machine to travel based on the material transfer end location and the material transfer start location range.

20 Claims, 16 Drawing Sheets

(52) U.S. Cl.
CPC ......... *G05D 1/0219* (2013.01); *G05D 1/0274*
(2013.01); *G05D 1/0287* (2013.01)

(56) References Cited

U.S. PATENT DOCUMENTS

| | | |
|---|---|---|
| 6,360,179 B1 | 3/2002 | Reep |
| 7,725,233 B2 | 5/2010 | Hendrickson et al. |
| 9,696,162 B2 * | 7/2017 | Anderson ............... G01C 21/20 |
| 9,772,625 B2 | 9/2017 | Gilmore et al. |
| 10,126,282 B2 | 11/2018 | Anderson et al. |
| 10,537,061 B2 | 1/2020 | Farley et al. |
| 10,677,723 B2 | 6/2020 | Ditterich |
| 10,853,894 B2 | 12/2020 | Rupp et al. |
| 11,961,289 B2 * | 4/2024 | McNichols ............ G06V 10/82 |
| 2016/0026940 A1 * | 1/2016 | Johnson ................ A01D 91/00 |
| | | 705/7.11 |
| 2016/0345485 A1 | 12/2016 | Acheson et al. |
| 2019/0075727 A1 | 3/2019 | Duke et al. |
| 2019/0261560 A1 | 8/2019 | Jelenkovic |
| 2020/0128720 A1 | 4/2020 | Cizek et al. |
| 2020/0193589 A1 * | 6/2020 | Peshlov ............... G06V 20/188 |
| 2021/0029877 A1 | 2/2021 | Vandike et al. |
| 2021/0099522 A1 | 4/2021 | Chiocco et al. |
| 2021/0195840 A1 | 7/2021 | Puryk et al. |
| 2022/0019796 A1 * | 1/2022 | McNichols ............ G06N 3/045 |
| 2022/0110255 A1 | 4/2022 | Vandike et al. |
| 2022/0113734 A1 | 4/2022 | Vandike et al. |
| 2022/0122197 A1 | 4/2022 | Hanrieder |
| 2022/0197302 A1 * | 6/2022 | McClelland ....... A01D 41/1278 |
| 2024/0107947 A1 * | 4/2024 | Borgatti ................ A01D 46/00 |

* cited by examiner

SYSTEMS AND METHODS FOR PREDICTIVE HARVESTING LOGISTICS

CROSS-REFERENCE TO RELATED APPLICATION

The present application is a U.S. Bypass Continuation of and claims priority of PCT/US2022/040067, filed Aug. 11, 2022, the content of which is hereby incorporated by reference in its entirety.

FIELD OF THE DESCRIPTION

The present description relates to agriculture. More specifically, the present description relates to agricultural harvesting.

BACKGROUND

There are a wide variety of different types of agricultural machines. Some agricultural machines include harvesters, such as combine harvesters, sugarcane harvesters, cotton harvesters, forage harvesters, and windrowers. Some harvesters can also be fitted with different types of headers to harvest different types of crops.

Some current harvesters have sensors that sense characteristics of the crop (or harvested crop material) such as constituents of the crop (or harvested crop material), moisture of the crop, quality of the crop, as well as various other characteristics.

The discussion above is merely provided for general background information and is not intended to be used as an aid in determining the scope of the claimed subject matter.

SUMMARY

A computer implemented method includes receiving a map that maps values of a crop characteristic to different locations across a field; receiving harvester route data indicative of a planned route of a harvester at the field; identifying a crop characteristic threshold; identifying a material transfer end location indicative of a location, along the planned route of the harvester, at which a material transfer operation between the harvester and a receiving machine is to end, based on the map, the planned route of the harvester, and the crop characteristic threshold; identifying a material transfer start location range indicative of a geographic area, along the planned route of the harvester, at which the material transfer operation is to start based on the material transfer end location; and generating a route for the receiving machine to travel based on the material transfer end location and the material transfer start location range.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted below.

DETAILED DESCRIPTION

Figure 1:
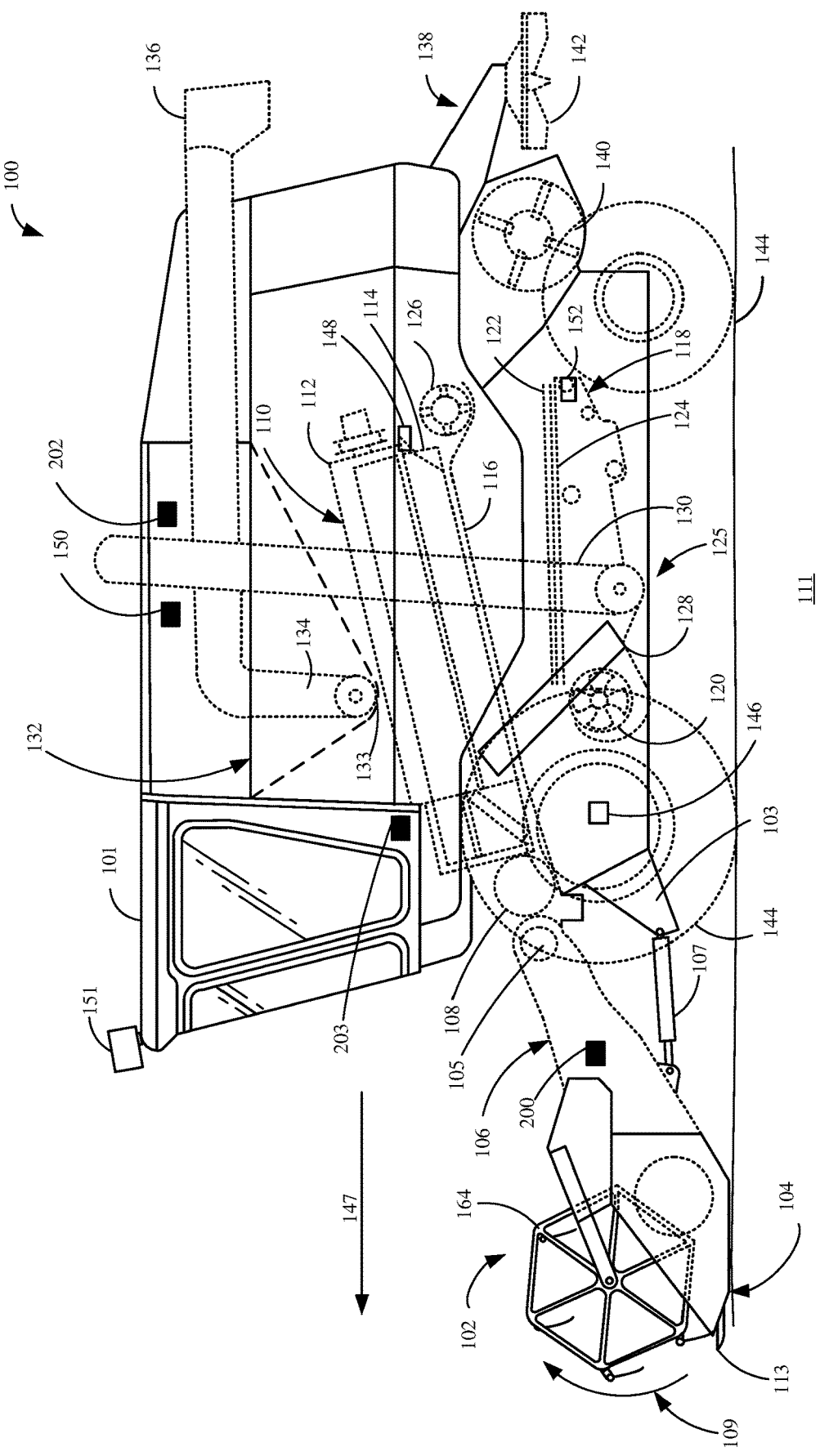
FIG. 1 is a partial pictorial, partial schematic illustration of a self-propelled agricultural harvester.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

In some examples, the present description relates to using in-situ data taken concurrently with an operation, such as an agricultural spraying operation, in combination with prior or predicted data, such as prior or predicted data represented in a map, to generate a predictive model and a predictive map, such as a predictive crop characteristic model and a predictive crop characteristic map. In some examples, the predictive crop characteristic map can be used to control a mobile machine, such as an agricultural sprayer.

During an agricultural harvesting operation an agricultural harvester engages crop plants at a worksite (e.g., field) and harvests the crop. The harvested crop material (e.g., grain, etc.), is transferred from the agricultural harvester to material receptacle of a receiving machine, such as a grain cart towed by a tractor, or a trailer towed by a truck. In this way, the harvested crop material can be transported, by the receiving machine, from the field to another material delivery location, such as a storage location (e.g., storage bin, dryer, storage bunk, silo, barn, etc.) or to a purchasing facility (e.g., a mill, ethanol plant, etc.). In some examples, the crop material can be transferred from one receiving machine to another receiving machine. For instance, the crop material may initially be transferred from the harvester to a towed grain cart. The towed grain cart may include a material transfer subsystem that can be used to transfer material from the grain cart to another receiving machine, such as a trailer towed by a truck. The truck may then drive away from the field to deliver the crop material to another material delivery location.

Purchasing facilities, such as mills, ethanol plants, etc., or other purchasers, may have crop characteristic requirements, or otherwise may pay based on certain crop characteristic levels. For example, a purchasing facility, or other purchaser, may have a moisture level threshold of 13% for soybeans, such that soybeans having a moisture level above 13% will be discounted (sometimes cumulatively for every percentage point above the threshold). In other examples, the threshold level may be a range, such as 13-15% such that crop having moisture outside (above or below) the range will be discounted. Ideally, farmers want to deliver the crop at exactly the threshold level as they get paid by weight, and more moisture means more weight. Thus, the farmer can be paid more for the same soybean if it has a higher moisture (e.g., higher weight). In other examples, the farmer may wish to store the harvested material for later use (e.g., feed for livestock) or to hold out for better prices, or both. It may be desirable to store harvested material at a higher moisture level such that by the time it is sold or used it will be at a desirable level. In some examples, the farmer may wish to immediately sell crop material having certain moisture levels, while storing (for later sale, after drying) crop material having other moisture levels. Additionally, the farmer may wish to keep the crop material separately stored based on the moisture levels, for example, the farmer may wish to dictate the order or timing of use of the crop material based on the harvested moisture level (e.g., feed the dryer material first), or keep separate crop material that is to be eventually sold from crop material that is to be used for feed.

In other examples, purchasing facilities, or other purchasers, may pay more or less depending on the levels of crop constituents (e.g., protein, starch, oil, etc.) of the crop material. For example, a farmer may receive a premium for crop material having higher levels of protein, starch, or oil. In some examples, the farmer may desire to keep crop material having certain crop constituent levels for personal use (e.g., feed for livestock), while selling other crop material having other certain crop constituent levels. In some examples, the farmer may wish to keep the crop material separately stored based on the crop constituent levels, for example, the farmer may wish to dictate the order or timing of use of the crop material based on the harvested moisture level (e.g., feed higher starch level feed in winter), or keep crop material that is to be eventually sold separate from crop material that is to be used for feed.

In other examples, purchasing facilities may pay more or less depending on the quality of the crop material. For example, the farmer may be paid less for broken grains, crop material with higher levels of material other than grain (MOG, such as weeds, other crop plant material, dirt, other contaminants, etc.), and/or for crop material with signs of pest damage or infestation. In some examples, the farmer may desire to keep crop material having certain quality levels for personal use while selling other crop material having other certain quality levels. In some examples, the farmer may wish to keep the crop material separately stored based on the quality levels, for example, the farmer may wish to dictate the order or timing of use of the crop material based on the quality level, or keep crop material that is to be eventually sold separate from crop material that is to be used for feed.

In some current systems, crop material having a characteristic level, such as a moisture level, that satisfies a threshold may be mixed with crop material that does not satisfy the threshold. In such a case, the aggregated mixture of crop material may have an aggregated moisture level that does not satisfy the threshold moisture level, in which case, the entire mixture is often run through a dryer, instead of just drying the crop material that does not satisfy the threshold. This can increase cost and slow down production. In some current systems, crop material having a characteristic level, such as moisture level, that satisfies a threshold may unintentionally be separated from crop material that does not satisfy a threshold and the crop material that is too moist must first be dried, instead of being mixed with the crop material that has the desirable level of moisture, where the mixture would have an aggregated moisture value that satisfies the threshold. This can increase cost and slow down production.

The crop characteristic levels of crop may vary across a field. Depending on the crop characteristic levels present and the quantity of crop with given levels, it may be desirable to keep crop material separated based on crop characteristic values or it may be desirable to mix crop of different crop characteristic values to achieve a mixture having a desirable aggregate crop characteristic level, or both.

The present description thus relates to a system that can predict crop characteristic levels, such that the logistics parameters of the harvesting operation can be controlled, such as path planning for the harvester(s) and/or the receiving vehicles, timing, location, and amount of material transfer, the locations to which the crop material is delivered, as well as various other parameters.

In one example, the present description relates to obtaining an information map such as a vegetative index map. A vegetative index map illustratively maps georeferenced vegetative index values (which may be indicative of vegetative growth or plant health) across different geographic locations in a field of interest. One example of a vegetive index includes a normalized difference vegetation index (NDVI). There are many other vegetative indices that are within the scope of the present disclosure. In some examples, a vegetive index map be derived from sensor readings of one or more bands of electromagnetic radiation reflected by the plants. Without limitations, these bands may be in the microwave, infrared, visible or ultraviolet portions of the electromagnetic spectrum. A vegetative index map can be used to identify the presence and location of vegetation. In some examples, these maps enable vegetation to be identified and georeferenced in the presence of bare soil, crop residue, or other plants, including crop or other weeds. The sensor readings can be taken at various times during the growing season (or otherwise prior to spraying), such as during satellite observation of the field of interest, a fly over operation (e.g., manned or unmanned aerial vehicles), sensor readings during a prior operation (e.g., prior to spraying or prior to a particular spraying operation) at the field of interest, as well as during a human scouting operation. The vegetative index map can be generated in a variety of other ways.

In one example, the present description relates to obtaining an information map, such as a topographic map. A topographic map illustratively maps topographic characteristic values across different geographic locations in a field of interest, such as elevations of the ground across different geographic locations in a field of interest. Since ground slope is indicative of a change in elevation, having two or more elevation values allows for calculation of slope across the areas having known elevation values. Greater granularity of slope can be accomplished by having more areas with known elevation values. As an agricultural harvester travels across the terrain in known directions, the pitch and roll of the agricultural harvester can be determined based on the slope of the ground (i.e., areas of changing elevation). Topographic characteristics, when referred to below, can include, but are not limited to, the elevation, slope (e.g., including the machine orientation relative to the slope), and ground profile (e.g., roughness). The topographic map can be derived from sensor readings taken during a previous operation on the field of interest or from an aerial survey of the field (such as a plane, drone, or satellite equipped with lidar or other distance measuring devices). In some examples, the topographic map can be obtained from third parties. The topographic map can be generated in a variety of other ways.

In one example, the present description relates to obtaining an information map, such as a soil property map. A soil property map illustratively maps soil property values (which may be indicative of soil type, soil moisture, soil cover, soil structure, as well as various other soil properties) across different geographic locations in a field of interest. The soil property maps thus provide geo-referenced soil properties across a field of interest. Soil type can refer to taxonomic units in soil science, wherein each soil type includes defined sets of shared properties. Soil types can include, for example, sandy soil, clay soil, silt soil, peat soil, chalk soil, loam soil, and various other soil types. Soil moisture can refer to the amount of water that is held or otherwise contained in the soil. Soil moisture can also be referred to as soil wetness. Soil cover can refer to the amount of items or materials covering the soil, including, vegetation material, such as crop residue or cover crop, debris, as well as various other items or materials. Commonly, in agricultural terms, soil cover includes a measure of remaining crop residue, such as a remaining mass of plant stalks, as well as a measure of cover crop. Soil structure can refer to the arrangement of solid parts of the soil and the pore space located between the solid parts of the soil. Soil structure can include the way in which individual particles, such as individual particles of sand, silt, and clay, are assembled. Soil structure can be described in terms of grade (degree of aggregation), class (average size of aggregates), and form (types of aggregates), as well as a variety of other descriptions. These are merely examples. Various other characteristics and properties of the soil can be mapped as soil property values on a soil property map.

These soil property maps can be generated on the basis of data collected during another operation corresponding to the field of interest, for example, previous agricultural operations in the same season, such as planting operations or spraying operations, as well as previous agricultural operations performed in past seasons, such as a previous harvesting operation. The agricultural machines performing those agricultural operations can have on-board sensors that detect characteristics indicative of soil properties, for example, characteristics indicative of soil type, soil moisture, soil cover, soil structure, as well as various other characteristics indicative of various other soil properties. Additionally, operating characteristics, machine settings, or machine performance characteristics of the agricultural machines during previous operations along with other data can be used to generate a soil property map. For instance, header height data indicative of a height of an agricultural harvester's header across different geographic locations in the field of interest during a previous harvesting operation along with weather data that indicates weather conditions such as precipitation data or wind data during an interim period (such as the period since the time of the previous harvesting operation and the generation of the soil property map) can be used to generate a soil moisture map. For example, by knowing the height of the header, the amount of remaining plant residue, such as crop stalks, can be known or estimated and, along with precipitation data, a level of soil moisture can be predicted. This is merely an example.

In other examples, surveys of the field of interest can be performed, either by various machines with sensors, such as imaging systems, or by humans. The data collected during these surveys can be used to generate a soil property map. For instance, aerial surveys of the field of interest can be performed in which imaging of the field is conducted, and, on the basis of the image data, a soil property map can be generated. In another example, a human can go into the field to collect various data or samples, with or without the assistance of devices such as sensors, and, on the basis of the data or samples, a soil property map of the field can be generated. For instance, a human can collect a core sample at various geographic locations across the field of interest. These core samples can be used to generate soil property maps of the field. In other examples, the soil property maps can be based on user or operator input, such as an input from a farm manager, which may provide various data collected or observed by the user or operator.

Additionally, the soil property map can be obtained from remote sources, such as third-party service providers or government agencies, for instance, the USDA Natural Resources Conservation Service (NRCS), the United States Geological Survey (USGS), as well as from various other remote sources.

In some examples, a soil property map may be derived from sensor readings of one or more bands of electromagnetic radiation reflected by the soil (or surface of the field). Without limitation, these bands may be in the microwave, infrared, visible or ultraviolet portions of the electromagnetic spectrum.

The soil property map can be generated in a variety of other ways.

In one example, the present description relates to obtaining an information map, such as a prior operation map. A prior operation map illustratively maps prior operation characteristics across different locations in a field of interest. Prior operation characteristics refer to parameters of a prior operation performed on the field of interest. In some examples, the machines performing the prior operations can be equipped with sensors to detect values of these parameters. In other examples, the values of the parameters can be derived from a prescriptive map used to control the prior operation. The prior operation map can be generated in a variety of other ways.

In one example, the present description relates to obtaining an information map, such as a biomass map. A biomass map illustratively maps biomass values across different geographic locations in a field of interest. The biomass map can be generated based on historical biomass values, based on sensor readings taken during an aerial survey of the field of interest or during another operation on the field of interest, such as during a spraying operation performed by a sprayer with a sensor that detects characteristic(s) of the plants indicative of biomass, from human scouting of the field, or derived from other values, such as vegetative index values. The biomass map can be generated in a variety of other ways.

In one example, the present description relates to obtaining an information map, such as a yield map. A yield map illustratively maps yield values across different geographic locations in a field of interest. The yield map may be predictive, in that the predictive yield values are based on historical yield values, sensor readings taken during an aerial survey of the field of interest or during another operation on the field of interest, or derived from other values, such as vegetative index values. The yield map may be historical, in that the historical yield map maps historical values of yield (e.g., yield values at the field of interest, or another field, from a previous harvesting operation). The yield map may be generated in a variety of other ways.

In one example, the present description relates to obtaining an information map, such as a seeding map. A seeding map illustratively maps values of seeding characteristics (e.g., seed location, seed spacing, row spacing, population, seed/crop genotype, such as hybrid, cultivar, species, etc., as well as various other seeding characteristics) across different geographic locations in a field of interest. The seeding map can be generated based on data generated by a planting or seeding machine that plants seeds at the field of interest. For example, the planting or seeding machine may be outfitted with one or more sensors that detect values indicative of one or more of the seeding characteristics. In other examples, a prescriptive map that is used to control the planting or seeding machine may be used as the basis for the seeding map. In other examples, inputs may be provided by an operator or user that are used as the basis for the seeding map. A combination of the above may be utilized to generate the seeding map. The seeding map can be generated in a variety of other ways.

In one example, the present description relates to obtaining an information map, such as a weed map. A weed map illustratively maps values of weed characteristics (e.g., weed type, weed intensity, etc.). Weed intensity values may include, without limitation, at least one of weed population, weed growth stage, weed size, weed biomass, weed moisture, or weed health. The weed type values may include, without limitation, an indication of weed type, such as identification of the weed species. The weed map can be generated based on sensor readings of the field of interest, such as sensor readings taken during an aerial survey of the field of interest, or during another operation of the field of interest, such as from a sprayer equipped with a sensor to detect weed characteristics during a spraying operation. The weed map can be generated in a variety of other ways.

In one example, the present description relates to obtaining an information map, such as a historical pest map. A historical pest map illustratively maps past locations of pests from past years or the current growing season. The historical pest map can be manually generated based on the reporting of an operator in the past year. For example, as the operator observes pests or pest affected areas in a field an interface can be provided that allows the operator to mark these geographic locations as ones containing or affected by pests. In other examples, the historic pest map may be generated from scouting, modeling or other ways from data collected earlier in the current growing season. The historical pest map can be generated in a variety of other ways.

In one example, the present description relates to obtaining an information map, such as an optical characteristic map. An optical characteristic map illustratively maps electromagnetic radiation values across different geographic locations in a field of interest. Electromagnetic radiation values can be from across the electromagnetic spectrum. This disclosure uses electromagnetic radiation values from infrared, visible light and ultraviolet portions of the electromagnetic spectrum as examples only and other portions of the spectrum are also envisioned. An optical characteristic map may map datapoints by wavelength (e.g., a vegetative index described above). In other examples, an optical characteristic map identifies textures, patterns, color, shape, or other relations of data points. Textures, patterns, or other relations of data points can be indicative of presence or identification of an object in the field, such as crop state (e.g., downed/lodged or standing crop), plant presence, plant type, animal presence, insect presence, insect type, mammal type, bird type, etc. For example, plant type can be identified by a given leaf pattern which can be used to identify the plant. Or for example, an insect silhouette or a bite pattern in a leaf can be used to identify the insect. Or for example, a disease can be spotted on plants.

In one example, the present description relates to obtaining an information map, such as a scouting map. A scouting map illustratively maps scouted characteristic values across different geographic locations in a field of interest. Scouting maps can be generated automatically by an agricultural scouting robot or manually by a one or more people. For instance, a scouting robot can navigate a field during a growing season down the crop rows without significant impact on the growing plants. The robot can sense, among other things, damaged crop plants, diseased plants, animal sign, animal presence, eaten crop material, uprooted plants, the number of pods, ears, heads, etc. The scouting map can be generated in a variety of other ways.

In one example, the present description relates to obtaining an information map, such as an animal activity map. An animal activity map illustratively maps animal activity characteristic values across different locations in a field of interest. Animal activity maps can be generated automatically or manually by one or more people. For example, an animal activity map may be generated by a camera monitoring the field that is able to detect animal movement across the field. Or for example, a person can manually identify positions where they have spotted animal activity. Some example animals of interest include feral pigs, birds, raccoons, deer, elk, etc. The positions where animals are detected can be plotted on map. These positions may also be time referenced for the times that the animals were spotted. This can be useful for instance, because in early stages of growth an animal can completely uproot a crop plant and some animal presence in later growth stages has less of an effect on a crop plant. While in some instances, an animal can cause minimal damage to a late stage crop but completely degrade the grain yield of the given plant (e.g., a deer eating the ears of corn off of a plant). The time reference may also be aggregated to identify hot spots of animal activity in a field over time. This can be useful, for instance, because the longer an animal is in a given position in a field, the more likely crop damage will occur due to that animal. The animal activity map can be generated in a variety of other ways.

In one example, the present description relates to obtaining an information map, such as a historical crop constituent map. A historical crop constituent map illustratively maps historical values of crop constituents across different geographic locations in a field of interest. In some examples, machines performing prior operations, such as a prior harvesting operation, may be outfitted with sensors that detect values of the crop constituents during the prior operation. In other examples, the crop constituent values can be detected after the previous harvesting operation (such as lab sampling or other sensor measurements, such as at a purchasing facility). The historical crop constituent map can be generated in a variety of other ways.

In one example, the present description relates to obtaining an information map, such as a historical crop moisture map. A historical crop moisture map illustratively maps historical values of crop moisture across different geographic locations in a field of interest. In some examples, machines performing prior operations, such as a prior harvesting operation, may be outfitted with sensors that detect values of crop moisture during the prior operation. In other examples, the crop moisture values can be detected after the previous harvesting operation (such as lab sampling or other sensor measurement, such as at a purchasing facility). The historical crop moisture map can be generated in a variety of other ways.

In other examples, one or more other types of information maps can be obtained. The various other types of information maps illustratively map values of various other characteristics across different geographic locations in a field of interest.

The present discussion proceeds, in some examples, with respect to systems that obtain one or more information maps of a worksite (e.g., field) and also use an in-situ sensor to detect a characteristic. The systems generate a model that models a relationship between the values on the one or more obtained maps and the output values from the in-situ sensor. The model is used to generate a predictive map that predicts, for example, values of the characteristic detected by the in-situ sensor to different geographic locations in the worksite. The predictive map, generated during an operation, can be presented to an operator or other user or can be used in automatically controlling a mobile machine (e.g., agricultural harvester, receiving machines, etc.) or both, during an agricultural harvesting operation.

FIG. 1 is a partial pictorial, partial schematic, illustration of a self-propelled agricultural harvester 100. In the illustrated example, agricultural harvester 100 is a combine harvester. Further, although combine harvesters are provided as examples throughout the present disclosure, it will be appreciated that the present description is also applicable to other types of harvesters, such as cotton harvesters, sugarcane harvesters, self-propelled forage harvesters, windrowers, or other agricultural work machines. Consequently, the present disclosure is intended to encompass the various types of harvesters and is, thus, not limited to combine harvesters. Consequently, the present disclosure is intended to encompass these various types of harvesters and is thus not limited to combine harvesters.

As shown in FIG. 1, agricultural harvester 100 illustratively includes an operator compartment 101, which may have a variety of different operator interface mechanisms (e.g., 418 shown in FIG. 3) for controlling agricultural harvester 100. Agricultural harvester 100 includes a front-end subsystem that has front-end equipment, such as a header 102, and a cutter generally indicated at 104. Header 102 in FIG. 1 is illustrated as a reel-type header, but in other examples, other types of headers are contemplated, such as draper headers, corn headers, etc. Agricultural harvester 100 also includes a feeder house 106, a feed accelerator 108, and a thresher generally indicated at 110. The feeder house 106 and the feed accelerator 108 form part of a material handling subsystem 125. Header 102 is pivotally coupled to a frame 103 of agricultural harvester 100 along pivot axis 105. One or more actuators 107 drive movement of header 102 about axis 105 in the direction generally indicated by arrow 109. Thus, a vertical position of header 102 (the header height) above ground 111 over which the header 102 travels is controllable by actuating actuator 107. While not shown in FIG. 1, agricultural harvester 100 may also include one or more actuators that operate to apply a tilt angle, a roll angle, or both to the header 102 or portions of header 102. Tilt refers to an angle at which the cutter 104 engages the crop. The tilt angle is increased, for example, by controlling header 102 to point a distal edge 113 of cutter 104 more toward the ground. The tilt angle is decreased by controlling header 102 to point the distal edge 113 of cutter 104 more away from the ground. The roll angle refers to the orientation of header 102 about the front-to-back longitudinal axis of agricultural harvester 100 or about an axis parallel to the front-to-back longitudinal axis of agricultural harvester 100.

Thresher 110 illustratively includes a separation subsystem with a threshing rotor 112, a set of concaves 114, and a separator 116. Agricultural harvester 100 also includes a cleaning subsystem or cleaning shoe (collectively referred to as cleaning subsystem 118) that includes a cleaning fan 120, chaffer 122, and sieve 124. The material handling subsystem 125 also includes discharge beater 126, tailings elevator 128, and clean grain elevator 130. The clean grain elevator 130 moves clean grain into clean grain tank 132. Agricultural harvester 100 also includes a material transfer subsystem that includes an unloading auger/blower 134, chute 134, and spout 136. Unloading auger/blower 134 coveys grain from grain tank 132 through chute 134 and spout 136 such that material can be offloaded from agricultural harvester 100. The material transfer subsystem is deployable from a storage position (shown in FIG. 1) to a wide range of angular positions for operation. Agricultural harvester 100 also includes a residue subsystem 138 that can include chopper 140 and spreader 142. Agricultural harvester 100 also includes a propulsion subsystem that includes an engine (or other power plant) that drives ground engaging components 144, such as wheels or tracks. In some examples, an agricultural harvester 100 within the scope of the present disclosure may have more than one of any of the subsystems mentioned above. In some examples, agricultural harvester 100 may have left and right cleaning subsystems, separators, etc., which are not shown in FIG. 1.

In operation, and by way of overview, agricultural harvester 100 illustratively moves through a field in the direction indicated by arrow 147. As agricultural harvester 100 moves, header 102 (and the associated reel 164) engages the crop to be harvested and gathers the crop toward cutter 104. An operator of agricultural harvester 100 can be a local human operator, a remote human operator, or an automated system. An operator command is a command by an operator. The operator of agricultural harvester 100 may determine one or more of a height setting, a tilt angle setting, or a roll angle setting for header 102. For example, the operator inputs a setting or settings to a control system, that controls actuator 107. The control system may also receive a setting from the operator for establishing the tilt angle and roll angle of the header 102 and implement the inputted settings by controlling associated actuators, not shown, that operate to change the tilt angle and roll angle of the header 102. The actuator 107 maintains header 102 at a height above ground 111 based on a height setting and, where applicable, at desired tilt and roll angles. Each of the height, roll, and tilt settings may be implemented independently of the others. The control system responds to header error (e.g., the difference between the height setting and measured height of header 102 above ground 111 and, in some examples, tilt angle and roll angle errors) with a responsiveness that is determined based on a selected sensitivity level. If the sensitivity level is set at a greater level of sensitivity, the control system responds to smaller header position errors, and attempts to reduce the detected errors more quickly than when the sensitivity is at a lower level of sensitivity.

Returning to the description of the operation of agricultural harvester 100, after crops are cut by cutter 104, the severed crop material is moved through a conveyor in feeder house 106 toward feed accelerator 108, which accelerates the crop material into thresher 110. The crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 100 in a windrow. In other examples, the residue subsystem 138 can include weed seed eliminators (not shown) such as seed baggers or other seed collectors, or seed crushers or other seed destroyers.

Grain falls to cleaning subsystem 118. Chaffer 122 separates some larger pieces of material from the grain, and sieve 124 separates some of finer pieces of material from the clean grain. Clean grain falls to an auger that moves the grain to an inlet end of clean grain elevator 130, and the clean grain elevator 130 moves the clean grain upwards, depositing the clean grain in clean grain tank 132. Residue is removed from the cleaning subsystem 118 by airflow generated by cleaning fan 120. Cleaning fan 120 directs air along an airflow path upwardly through the sieves and chaffers. The airflow carries residue rearwardly in agricultural harvester 100 toward the residue handling subsystem 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

FIG. 1 also shows that, in one example, agricultural harvester 100 includes ground speed sensor 146, one or more separator loss sensors 148, a clean grain camera 150, a forward looking image capture mechanism 151, which may be in the form of a stereo or mono camera, one or more crop characteristic sensors 200, 202, a geographic positioning system 203, and one or more loss sensors 152 provided in the cleaning subsystem 118.

Ground speed sensor 146 senses the travel speed of agricultural harvester 100 over the ground. Ground speed sensor 146 may sense the travel speed of the agricultural harvester 100 by sensing the speed of rotation of the ground engaging components (such as wheels or tracks), a drive shaft, an axle, or other components. In some instances, the travel speed may be sensed using geographic positioning system 203, which may be a global positioning system (GPS), a dead reckoning system, a long range navigation (LORAN) system, or a wide variety of other systems or sensors that provide an indication of a geographic positioning of agricultural harvester 100 in a global or local coordinate system. Detecting a change in position over time may provide an indication of travel speed.

Loss sensors 152 illustratively provide an output signal indicative of the quantity of grain loss occurring in both the right and left sides of the cleaning subsystem 118. In some examples, sensors 152 are strike sensors which count grain strikes per unit of time or per unit of distance traveled to provide an indication of the grain loss occurring at the cleaning subsystem 118. The strike sensors for the right and left sides of the cleaning subsystem 118 may provide individual signals or a combined or aggregated signal. In some examples, sensors 152 may include a single sensor as opposed to separate sensors provided for each cleaning subsystem 118.

Separator loss sensor 148 provides a signal indicative of grain loss in the left and right separators, not separately shown in FIG. 1. The separator loss sensors 148 may be associated with the left and right separators and may provide separate grain loss signals or a combined or aggregate signal. In some instances, sensing grain loss in the separators may also be performed using a wide variety of different types of sensors as well.

As mentioned above, agricultural harvester 100 also includes one or more crop characteristic sensors 200, 202 located at one or more different locations on agricultural harvester 100. Crop characteristic sensor 200 is shown mounted in feeder house 106, while crop characteristic sensor 202 is shown as mounted to sense crop in clean grain elevator 130. However, one or more crop characteristic sensors may be provided at one or more other locations on the agricultural harvester 100. Crop characteristic sensors 200, 202 illustratively detect crop characteristics, such as crop constituents (e.g., protein, starch, oil, water, etc.), crop moisture, or crop quality (e.g., broken grain, cleanliness, etc.). Without limitation, crop characteristic sensors 200, 202 utilize one or more bands of electromagnetic radiation in detecting crop characteristics. For example, in some instances, crop characteristic sensors 200, 202 utilize the reflectance or absorption of various ranges (e.g., various wavelengths or frequencies, or both) of electromagnetic radiation by crop or other vegetation material, including grain, in detecting crop characteristics. In some examples, a crop characteristic sensor 200, 202 includes an optical sensor, such as an optical spectrometer. In one example, a crop constituent sensor 200, 202 utilize near-infrared spectroscopy or visible near-infrared spectroscopy. In one example, a crop characteristic sensor 200, 202 can include a capacitive moisture sensor. In one example, the capacitive moisture sensor can include a moisture measurement cell for containing the crop material sample and a capacitor for determining the dielectric properties of the sample. In other examples, the crop characteristic sensor 200, 202 may be a microwave sensor or a conductivity sensor for sensing the moisture content of crop material. In other examples, the crop moisture sensor may utilize wavelengths of electromagnetic radiation for sensing the moisture content of the crop material. In some examples, crop characteristic sensor 200, 202 may include an imaging system (e.g., mono or stereo camera), an optical sensor, ultrasonic, infrared, etc., for detecting crop quality characteristics, such as clean grain levels, broken grain levels, unthreshed grain levels, material other than grain (MOG) levels, and MOG types (e.g., weeds, bugs, dirt or other contaminants, crop plant material other than grain, etc.). Crop and crop material may include grain or MOG or both.

In some examples, agricultural harvester 100 may include one or more of crop characteristic sensors 200, 202 in the form of crop constituent sensors, crop characteristic sensors 200, 202 in the form of crop moisture sensors, and crop characteristic sensors 200, 202 in the form of crop quality sensors. In some examples, one type of sensor may detect or otherwise indicated multiple characteristics, for instance, a crop characteristic sensor 200, 202 in the form of a crop constituent sensor may detect crop constituents and crop moisture.

Crop characteristic sensors 200, 202 can be disposed at or have access to various locations within agricultural harvester 100. For example, the crop characteristic sensor 200 is disposed within the feeder house 106 (or otherwise has sensing access to crop material within feeder house 106) and is configured to detect constituents of harvested crop material passing through the feeder house 106. In other examples, the crop constituent sensor 202 is located at other areas within agricultural harvester 100, for instance, on or coupled to the clean grain elevator 130, in a clean grain auger, or in a grain tank 132. In some examples, the crop characteristic sensors 200, 202 can include a chamber (or measurement cell) to which crop material is diverted to from the flow path so the crop constituent sensor 200, 202 can take a reading.

It will be noted that these are merely examples of the types and locations of crop characteristic sensors 200, 202 and that various other types and locations of crop constituent sensors are contemplated.

Agricultural harvester 100 may also include other sensors and measurement mechanisms. For instance, agricultural harvester 100 may include one or more of the following sensors: a header height sensor that senses a height of header 102 above ground 111; stability sensors that sense oscillation or bouncing motion (and amplitude) of agricultural harvester 100; a residue setting sensor that is configured to sense whether agricultural harvester 100 is configured to chop the residue, produce a windrow, etc.; a cleaning shoe fan speed sensor to sense the speed of cleaning fan 120; a concave clearance sensor that senses clearance between the rotor 112 and concaves 114; a threshing rotor speed sensor that senses a rotor speed of rotor 112; a chaffer clearance sensor that senses the size of openings in chaffer 122; a sieve clearance sensor that senses the size of openings in sieve 124; a material other than grain (MOG) moisture sensor, such as a capacitive moisture sensor, that senses a moisture level of the MOG passing through agricultural harvester 100; one or more machine setting sensors configured to sense various configurable settings of agricultural harvester 100; a machine orientation sensor (e.g., inertial measurement unit) that senses the orientation of agricultural harvester 100; mass sensors (e.g., pressure sensors, strain gauges, etc.) that sense a mass of material in grain tank 132; feed rate sensors that sense the feed rate of grain as the grain travels through the feeder house 106, clean grain elevator 130, or elsewhere in the agricultural harvester 100. In some implementations, the feed rate sensors sense the feed rate of biomass through feeder house 106, thresher 110, through the separator 116, or elsewhere in agricultural harvester 100. Further, in some instances, the feed rate sensors sense the feed rate as a mass flow rate of grain through elevator 130 or through other portions of the agricultural harvester 100 or provide other output signals indicative of other sensed variables. Various other sensors are contemplated herein, some of which are discussed in further detail below.

Figure 2:
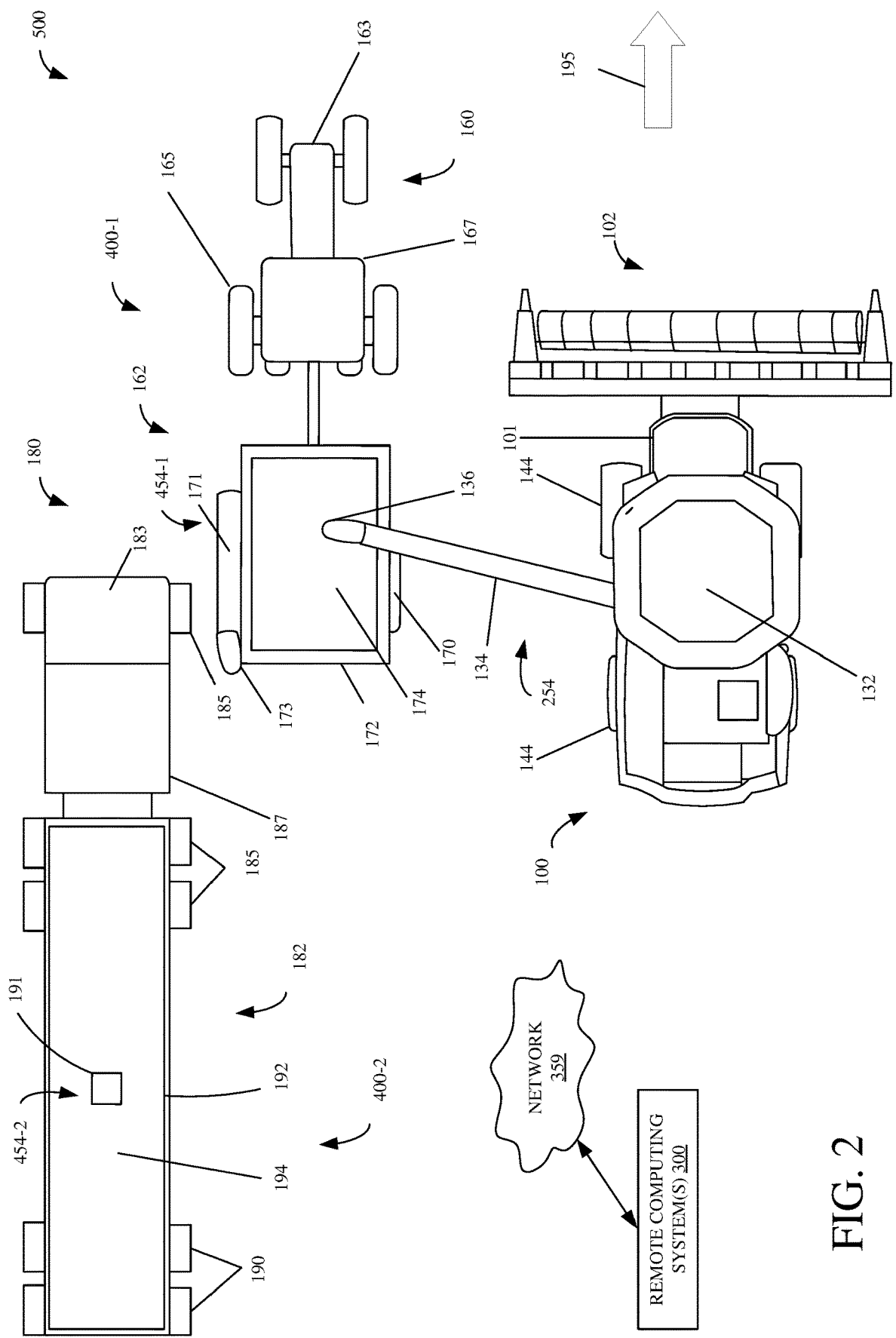
FIG. 2 is a partial plan view, partial pictorial illustration of one example of an agricultural harvesting system, including an agricultural harvester and receiving machine(s), according to some examples of the present disclosure.

FIG. 2 is a partial plan view, partial pictorial illustration of an agricultural harvesting system 500 and shows an agricultural harvester 100 and one or more receiving machines 400 operating at a worksite (e.g., field) during a harvesting operation. Agricultural harvesting system 500, as illustrated in FIG. 2, includes agricultural harvester 100, one or more receiving machines 400, one or more remote computing systems 300. Agricultural harvester 100, receiving machines 400, and remote computing systems 300 can communicate over network 359 via respective communication systems. Network 359 and the communication systems will be discussed in more detail in FIG. 3.

FIG. 2 shows that a receiving machine 400 can be include a towing vehicle and towed implement, such as a tractor 160 and towed grain cart 162 or a truck (e.g., semi-truck) 180 and trailer (e.g., semi-trailer) 182. Various other forms of receiving machines 400 are contemplated herein. In the illustrated example, agricultural harvester 100 is traveling in the direction indicated by arrow 195 and is harvesting crop, while receiving vehicle 400-1 is traveling alongside agricultural harvester 100 and is receiving harvested material (e.g., grain) from grain tank 132 of agricultural harvester 100 via material transfer subsystem 254 of agricultural harvester 100, which is shown in a deployed position. In other examples, receiving machine 400-1 may travel behind agricultural harvester 100 and receive harvested material. In other examples, receiving machine 400-2 can receive harvested material from agricultural harvester 100, including receiving harvested material from agricultural harvester 100 while traveling in-tandem with agricultural harvester 100.

Tractor 106, as illustrated, includes a power plant 163 (e.g., internal combustion engine, battery and electric motors, etc.), ground engaging elements 165 (e.g., wheels or tracks), and an operator compartment 167. Grain cart 162 is coupled to tractor by way of a connection assembly (e.g., one or more of hitch, electrical coupling, hydraulic coupling, pneumatic coupling, etc.) and, as illustrated, includes ground engaging elements 170, such as wheels or tracks, grain bin 172 which includes a volume 174 for receiving material, such as harvested crop material from agricultural harvester 100. Grain cart 162 also includes a material transfer subsystem 454-1 which includes a chute 171, a spout 173, and an auger or blower (not shown) as well as various actuator(s) (not shown). Material transfer subsystem 454-1 is actuatable between a storage position (as shown) and a range of deployed positions. Material transfer subsystem 454 can be used to transfer material from grain bin 172 to another machine such as receiving machine 400-2, an elevator, a grinder, as well as various other machines or to a storage facility.

Truck 180, as illustrated, includes a power plant 183 (e.g., internal combustion engine, battery and electric motors, etc.), ground engaging elements 185 (e.g., wheels or tracks), and an operator compartment 187. Trailer 182 is coupled to track by way of a connection assembly (e.g., one or more of a hitch, electrical coupling, hydraulic coupling, pneumatic coupling, etc.) and, as illustrated, includes ground engaging elements 190, such as wheels or tracks, grain bin 192 which includes a volume 194 for receiving material, such as harvested crop material from agricultural harvester 100 or another receiving machine, such as receiving machine 400-1. Trailer 182 also includes a material transfer subsystem 454-2 which includes an actuatable door 191 disposed on the bottom side of trailer 182 as well as various actuator(s) (not shown). Actuatable door 191 is actuatable between an open position and a closed position, such that material in grain bin 192 can exit grain bin 192 via door 191. In one example, the interior walls of grain bin 192 taper towards door 191 such that material exits door 191 via gravity. Thus, material transfer subsystem 454-2 can be used to transfer material from grain bin 192 to another machine, such as an elevator, as well as various other machines or to a storage facility.

The operator compartments 101, 167, and 187 can include one or more operator interface mechanisms, which will be described below. Receiving machines 400 can include various other components as well, some of which will be described below.

Figure 3:
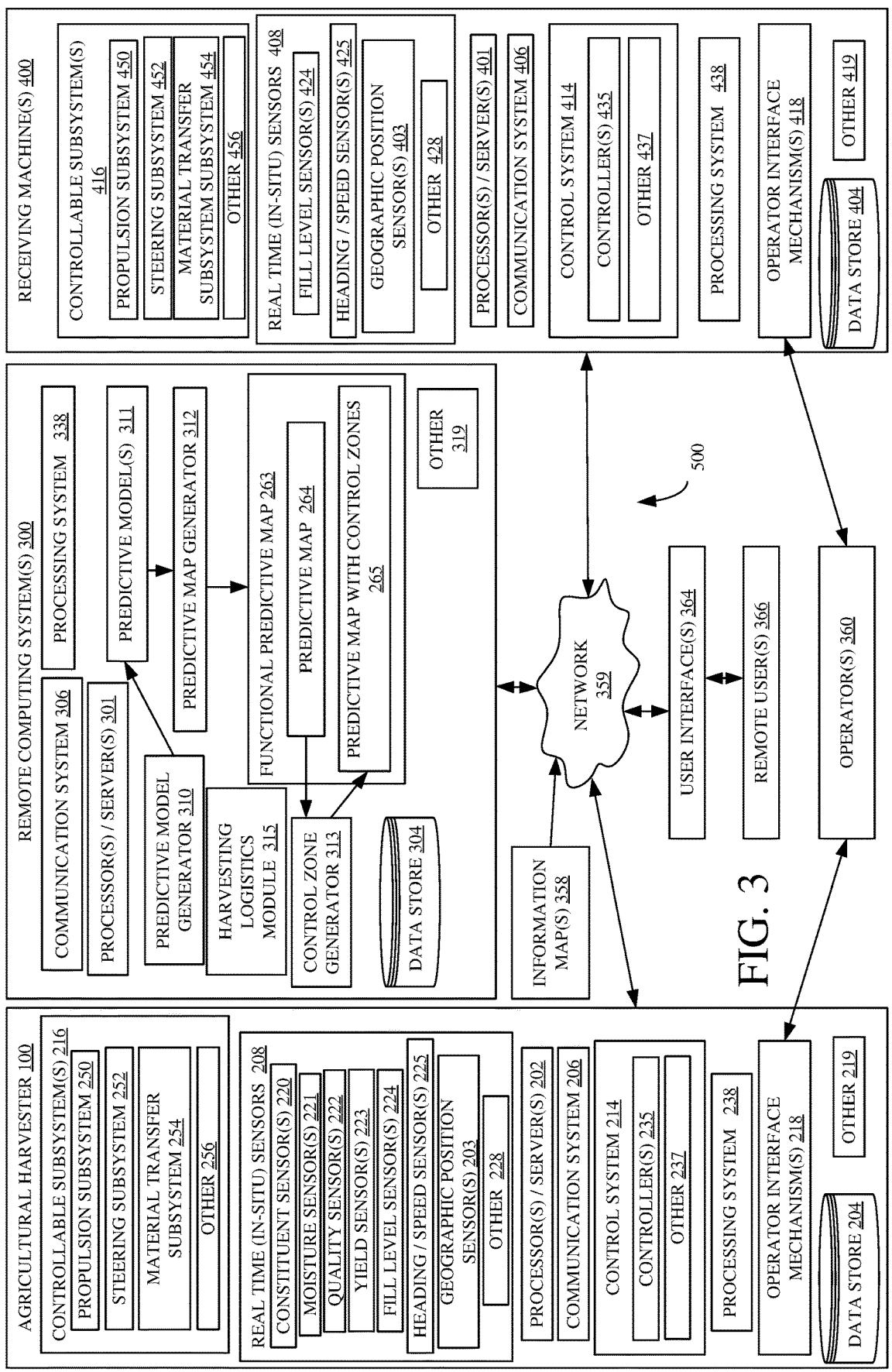
FIG. 3 is a block diagram showing some portions of an agricultural harvesting system, including a mobile machine, such as an agricultural harvester or a receiving machine, or both, in more detail, according to some examples of the present disclosure.

FIG. 3 is a block diagram of agricultural system 400 in more detail. FIG. 2 shows that agricultural system 500 includes agricultural harvester 100, one or more receiving machines 400, one or more remote computing systems 300, one or more remote user interfaces 364, network 359, and one or more information maps 358. Agricultural harvester 100, itself, illustratively includes one or more processors or servers 202, data store 204, communication system 206, one or more in-situ sensors 208 that sense one or more characteristics at a worksite concurrent with an operation, control system 214, one or more controllable subsystems 216, one or more operator interface mechanisms 218, processing system 238 that processes the sensor data (e.g., signals, images, etc.) generated by in-situ sensors 208 to generate processed sensor data, and can include various other items and functionality 219 as well. In-situ sensors 208 can include crop constituent sensors 220, crop moisture sensors 221, crop quality sensors 222, yield sensors 223, fill level sensors 124, heading/speed sensors 225, geographic position sensors 203, and can include various other sensors 228 as well. The in-situ sensors 208 generate values corresponding to sensed characteristics. The information generated by in-situ sensors 208 can be communicated to receiving vehicles 400 and/or to remote computing systems 300. The information generated by in-situ sensors 208 can be georeferenced to areas of the worksite based on geographic location data provided by geographic position sensors 203. Control system 214, itself, can include one or more controllers 235 for controlling various other items of agricultural harvester 100, and can include other items 237 as well. Controllable subsystems 216 can include propulsion subsystem 250, steering subsystem 252, material transfer subsystem 254, and can include various other subsystems 256 as well, including, but not limited to those discussed above.

Receiving machines 400, themselves, illustratively include one or more processors or servers 402, data store 404, communication system 406, one or more in-situ sensors 408 that sense one or more characteristics at a worksite concurrent with an operation, control system 414, one or more controllable subsystems 416, one or more operator interface mechanisms 418, processing system 438 that processes the sensor data (e.g., signals, images, etc.) generated by in-situ sensors 408 to generate processed sensor data, and can include various other items and functionality 419 as well. In-situ sensors 408 can include fill level sensors 424, heading/speed sensors 425, geographic position sensors 403, and can include various other sensors 428 as well. The in-situ sensors 408 generate values corresponding to sensed characteristics. The information generated by in-situ sensors 408 can be communicated to other receiving vehicles 400, agricultural harvester 100, and/or to remote computing systems 300. The information generated by in-situ sensors 408 can be georeferenced to areas of the worksite based on geographic location data provided by geographic position sensor 403. Control system 414, itself, can include one or more controllers 435 for controlling various other items of a receiving machine 400, and can include other items 437 as well. Controllable subsystems 416 can include propulsion subsystem 450, steering subsystem 452, material transfer subsystem 454, and can include various other subsystems 456 as well.

Remote computing systems 300, as illustrated, include one or more processors or servers 301, data store 304, communication system 306, predictive model or relationship generator (collectively referred to herein as "predictive model generator 310"), predictive map generator 312, control zone generator 313, harvesting logistics module 315, machine learning component 317, processing system 338 which can process sensor data (e.g., signals, images, etc.) generated by in-situ sensors 208 or 408, or both, to generate processed sensor data, and can include various other items and functionality 319.

Fill level sensors 224 sense a characteristic indicative of a fill level of grain tank 132. Fill level sensors 224 can be an imaging system, such as a stereo or mono camera, that observes clean grain tank 132 and detects a fill level of material within the grain tank 132. The images generated by the imaging system can be processed, such as by processing system 138 or processing system 338, using image processing, to generate a value indicative of the fill level of the grain tank 132. The imaging system can be mounted to the exterior side of the roof of the operator compartment 101, to the grain tank 132, or to other suitable locations on agricultural harvester 100. Fill level sensors 224 can include one or more electromagnetic radiation (ER) sensors that transmit and/or receive electromagnetic radiation (ER) to detect presence of material. For instance, one or more ER sensors can be placed within grain tank 132 at a given distance from a perimeter of the grain tank 132 or mounted to observe the interior of grain tank 132 to detect when the grain pile in the grain tank 132 has reached a given height. Fill level sensors 224 can include one or more mass sensors (such as load cells, strain gauges, pressure sensors, etc.) disposed within grain tank 132 or between grain tank 132 and another component (e.g., an axle or frame) of agricultural harvester 100. The mass sensors sense a mass of the material within grain tank 132 which can be used to derive a fill level of the grain tank 132. Fill level sensors 224 can also include or a one or more feed rate (or mass flow) sensors that measure an amount of material entering grain tank 132. For instance, a feed rate sensor that senses a feed rate of grain through the clean grain elevator 130 of the agricultural harvester 100. Fill level sensors 224 can also include one or more contact sensors disposed within the grain tank 132, for instance a contact pad that detects contact with grain, or a contact member that is displaced by contact with the grain. Various other types of fill level sensors are also contemplated herein.

Heading/speed sensors 225 detect a heading and speed characteristics (e.g., travel speed, acceleration, deceleration, etc.) at which agricultural harvester 100 is traversing the worksite during the operation. This can include sensors that sense the movement (e.g., rotation) of ground-engaging elements (e.g., wheels or tracks 144), or movement of components coupled to the ground engaging elements, or can utilize signals received from other sources, such as geographic position sensors 203, thus, while heading/speed sensors 225 as described herein are shown as separate from geographic position sensors 203, in some examples, machine heading/speed is derived from signals received from geographic position sensors 203 and subsequent processing. In other examples, heading/speed sensors 225 are separate sensors and do not utilize signals received from other sources.

Geographic position sensors 203 illustratively sense or detect the geographic position or location of agricultural harvester 100. Geographic position sensor 203 can include, but is not limited to, a global navigation satellite system (GNSS) receiver that receives signals from a GNSS satellite transmitter. Geographic position sensors 203 can also include a real-time kinematic (RTK) component that is configured to enhance the precision of position data derived from the GNSS signal. Geographic position sensors 203 can include a dead reckoning system, a cellular triangulation system, or any of a variety of other geographic position sensors.

Crop constituent sensors 220 illustratively sense or detect levels of constituents (e.g., protein, starch, oil, etc.) of crop material (e.g., grain) harvested by agricultural harvester 100. Crop constituent sensors 220 can be crop characteristic sensors 200, 202. For example, crop constituent sensors 220 can be optical spectrometer that utilizes near-infrared spectroscopy or visible near-infrared spectroscopy. Other types of crop constituent sensors 220 are also contemplated.

Crop moisture sensors 221 illustratively sense or detect levels of moisture of crop material (e.g., grain) harvested by agricultural harvester 100. Crop moisture sensors 221 can be crop characteristic sensors 200, 202. For example, crop moisture sensors can be a capacitive moisture sensor that detects dielectric properties of crop material. Other types of crop moisture sensors 221 are also contemplated. In some examples, crop moisture sensors 221 utilize data received from other sources, such as crop constituent sensors 220, thus, while crop moisture sensors 221 as described herein are shown as separate from crop constituent sensors, in some examples, crop moisture is derived from data received from crop constituent sensors 220.

Crop quality sensors 222 illustratively sense or detect crop quality characteristics, such as clean grain levels, broken grain levels, unthreshed grain levels, MOG levels, and MOG types (e.g., weeds, bugs, dirt or other contaminants, crop plant material other than grain, etc.), of crop material (e.g., grain) harvested by agricultural harvester 100. Crop quality sensors 222 can be crop characteristic sensors 200, 202. For example, crop quality sensors 222 may include an imaging system (e.g., mono or stereo camera), an optical sensor, ultrasonic sensor, an infrared sensor, etc., for detecting crop quality characteristics. Other types of crop quality sensors 222 are also contemplated.

Yield sensors 223 illustratively sense or detect levels of yield of crop material (e.g., grain) harvested by agricultural harvester 100. Yield sensors 223 can include an imaging system (e.g., mono or stereo camera, an optical sensor, ultrasonic sensor, one or more mass sensors that sense a mass of crop material in clean grain tank 132, feed rate (or mass flow) sensors that detect a feed rate of grain to grain tank 132, etc. In some examples, yield sensors 223 utilize data received from other sources, such as fill level sensors 224. Thus, while yield sensors 223 as described herein are shown as separate from fill level sensors 224, in some examples, yield is derived from sensor data received from fill level sensors 224.

In-situ sensors 208 can also include various other types of sensors 228.

Processing system 238 or processing system 338 processes the sensor data generated by in-situ sensors 208 to generate processed sensor data indicative of one or more characteristics. For example, processing system 238 or 338 generates processed sensor data indicative of characteristic values based on the sensor data (e.g., signals, images, etc.) generated by in-situ sensors 208, such as: crop constituent values based on sensor data generated by crop constituent sensors 220; crop moisture values based on sensor data generated by crop moisture sensors 221; crop quality values based on sensor data generated by crop quality sensors 222; yield values based on sensor data generated by yield sensors 223; fill level values based on sensor data generated by fill level sensors 224; machine speed values (e.g., travel speed values, acceleration values, and/or deceleration values) based on sensor data generated by heading/speed sensors 225; machine heading values based on sensor data generated by heading/speed sensors 225; geographic position values based on sensor data generated by geographic position sensors 203; and various other characteristic values based on sensors data generated by various other in-situ sensors 228.

It will be understood that processing system 138 or 338 can be implemented by one or more processors or servers, such as processors or servers 101 or processors or servers 301, respectively. Additionally, processing system 138 and processing system 338 can utilize various sensor signal filtering, noise filtering, sensor signal categorization, aggregation, normalization, as well as various other processing functionality. Similarly, processing system 138 and processing system 338 can utilize various image processing such as, sequential image comparison, RGB, edge detection, black/white analysis, machine learning, neural networks, pixel testing, pixel clustering, shape detection, as well any number of other image processing and data extraction functionality.

Fill level sensors 424 sense a characteristic indicative of a fill level of a grain bin of the respective receiving machine 400 (e.g., grain bin 172 or 192). Fill level sensors 424 can be an imaging system, such as a stereo or mono camera, that observes the grain bin of the respective receiving vehicle and detects a fill level of material within the grain bin. The images generated by the imaging system can be processed, such as by processing system 438 or processing system 338, using image processing, to generate a value indicative of the fill level of the respective grain bin. The imaging system can be mounted to the exterior side of the roof of the operator compartment of the respective receiving machine (e.g., exterior side of the roof of operator compartment 167 or operator compartment 187), to the respective grain bin, or to other suitable locations on the respective receiving machine. Fill level sensors 424 can include one or more electromagnetic radiation (ER) sensors that transmit and/or receive electromagnetic radiation (ER) to detect presence of material. For instance, one or more ER sensors can be placed within the respective grain bin at a given distance from a perimeter of the grain bin or mounted to observe the interior of the grain bin to detect when the grain pile in the grain bin has reached a given height. Fill level sensors 424 can include one or more mass sensors (such as load cells, strain gauges, pressure sensors, etc.) disposed within the grain bin, between the grain bin and another component (e.g., an axle, a frame, etc.) of the receiving machine 400, and/or in the hitch assembly of the receiving vehicle 400. The mass sensors sense a mass of the material within the grain bin which can be used to derive a fill level of the grain bin. Fill level sensors 424 can also include one or more contact sensors disposed within the respective grain bin, for instance a contact pad that detects contact with grain, or a contact member that is displaced by contact with the grain. Various other types of fill level sensors are also contemplated herein.

In some examples, the fill level of the grain bin of the receiving machine is derived from sensors disposed on the agricultural harvester 100 or disposed on another receiving machine (e.g., in the case where another receiving machine is transferring material to the receiving machine 400). For instance, an imaging system, such as a stereo or mono camera can be mounted on the agricultural harvester 100 (e.g., on the chute 134) or another receiving machine (e.g., on the chute 171) and can be disposed to view the grain bin of the receiving machine during a material transfer operation. In another example, the agricultural harvester 100 or another receiving machine, or both, can include a mass flow sensor that senses a mass flow of material through the chute 134 or 171, respectively, which can be used to derive a fill level of the grain bin of the receiving machine 400. In another example, the agricultural harvester 100 or other receiving machine, or both, can include a sensor that senses a speed of the auger or blower of the material transfer subsystem 254 or material transfer subsystem 454, respectively, to derive flow rate of material to derive a fill level of the grain bin of the receiving machine 400. The sensor data generated by the sensors on the agricultural harvester 100 (or the processed sensor data) can be communicated to the remote computing systems 300 or to the receiving machine 400, or both. The sensor data generated by the sensors on the other receiving machine (or the processed sensor data) can be communicated to the remote computing systems 300 or to the receiving machine 400, or both.

Heading/speed sensors 425 detect a heading and speed characteristics (e.g., travel speed, acceleration, deceleration, etc.) at which the respective receiving machine 200 is traversing the worksite during the operation. This can include sensors that sense the movement (e.g., rotation) of ground-engaging elements (e.g., wheels or tracks 165, 170, 185, and/or 190), or the movement of components coupled to the ground engaging elements, or can utilize data received from other sources, such as geographic position sensors 403, thus, while heading/speed sensors 425 as described herein are shown as separate from geographic position sensor 403, in some examples, machine heading/speed is derived from sensor data received from geographic position sensors 403 and subsequent processing. In other examples, heading/speed sensors 425 are separate sensors and do not utilize signals received from other sources.

Geographic position sensor 403 illustratively senses or detects the geographic position or location of the respective receiving machine 400. Geographic position sensor 403 can include, but is not limited to, a global navigation satellite system (GNSS) receiver that receives signals from a GNSS satellite transmitter. Geographic position sensor 403 can also include a RTK component that is configured to enhance the precision of position data derived from the GNSS signal. Geographic position sensor 403 can include a dead reckoning system, a cellular triangulation system, or any of a variety of other geographic position sensors.

In-situ sensors 408 can also include various other types of sensors 428.

Processing system 438 or processing system 338 processes the sensor data generated by in-situ sensors 208 to generate processed sensor data indicative of one or more characteristics. For example, processing system 438 or 338 generates processed sensor data indicative of characteristic values based on the sensor data (e.g., signals, images, etc.) generated by in-situ sensors 408, such as: fill level values based on sensor data generated by fill level sensors 424, machine speed values (e.g., travel speed values, acceleration values, and/or deceleration values) based on sensor data generated by heading/speed sensors 425, machine heading values based on sensor data generated by heading/speed sensors 425, geographic position values based on sensor data generated by geographic position sensors 403; and various other characteristic values based on sensors data generated by various other in-situ sensors 428.

It will be understood that processing system 438 can be implemented by one or more processors or servers, such as processors or servers 401. Additionally, processing system 438 can utilize various sensor signal filtering, noise filtering, sensor signal categorization, aggregation, normalization, as well as various other processing functionality. Similarly, processing system 438 can utilize various image processing such as, sequential image comparison, RGB, edge detection, black/white analysis, machine learning, neural networks, pixel testing, pixel clustering, shape detection, as well any number of other suitable image processing and data extraction functionality.

Control system 214 can include a variety of controllers 235, such as a communication system controller to control communication system 206, a propulsion controller to control propulsion subsystem 250 to control a travel speed, acceleration, and/or deceleration of agricultural harvester 100, a path planning controller to control steering subsystem 252 to control the heading of agricultural harvester 100, and a material transfer controller to control material transfer subsystem 254, to initiate or end a material transfer operation, to control the position of chute 134 and/or spout 136, and/or to control the actuation (speed) of the auger or blower 133. Controllers 235 can also include an operator interface controller to control operator interface mechanisms 118 to provide indications, such as displays, alerts, notifications, as well as various other outputs. Some examples of the different types of controllers 235 will be shown in FIG. 6.

Control system 414 can include a variety of controllers 435, such as a communication system controller to control communication system 206, a propulsion controller to control propulsion subsystem 450 to control a travel speed, acceleration, and/or deceleration of the respective receiving vehicle 400, a path planning controller to control steering subsystem 452 to control the heading of the respective receiving vehicle 400, and a material transfer controller to control material transfer subsystem 454, to initiate or end a material transfer operation, to control the actuation of door 191 or to control the position of chute 171 and/or spout 173, and/or to control the actuation (speed) of the auger or blower. Controllers 435 can also include an operator interface controller to control operator interface mechanisms 418 to provide indications, such as displays, alerts, notifications, as well as various other outputs. Some examples of the different types of controllers 435 will be shown in FIG. 6.

Communication system 206 is used to communicate between components of agricultural harvester 100 or with other items of agricultural system 500, such as remote computing systems 300 and/or receiving machines 400. Communication system 206 can include one or more of wired communication circuitry and wireless communication circuitry, as well as wired and wireless communication components. In some examples, communication system 206 can be a cellular communication system, a system for communicating over a wide area network or a local area network, a system for communicating over a controller area network (CAN), such as a CAN bus, a system for communication over a near field communication network, or a communication system configured to communicate over any of a variety of other networks. Communication system 206 can also include a system that facilitates downloads or transfers of information to and from a secure digital (SD) card or a universal serial bus (USB) card, or both. Communication system can utilize network 359. Network 359 can be any of a wide variety of different types of networks such as the Internet, a cellular network, a wide area network (WAN), a local area network (LAN), a controller area network (CAN), a near-field communication network, or any of a wide variety of other networks or communication systems.

Communication system 406 is used to communicate between components of the respective receiving machine 400 or with other items of agricultural system 500, such as remote computing systems 300, other receiving machines 400, and/or agricultural harvester 100. Communication system 406 can include one or more of wired communication circuitry and wireless communication circuitry, as well as wired and wireless communication components. In some examples, communication system 406 can be a cellular communication system, a system for communicating over a wide area network or a local area network, a system for communicating over a controller area network (CAN), such as a CAN bus, a system for communication over a near field communication network, or a communication system configured to communicate over any of a variety of other networks. Communication system 406 can also include a system that facilitates downloads or transfers of information to and from a secure digital (SD) card or a universal serial bus (USB) card, or both. Communication system 406 can utilize network 359.

Communication system 306 is used to communicate between components of the remote computing system 300 or with other items of agricultural system 500, such as remote receiving machines 400 and/or agricultural harvester 100. Communication system 306 can include one or more of wired communication circuitry and wireless communication circuitry, as well as wired and wireless communication components. In some examples, communication system 306 can be a cellular communication system, a system for communicating over a wide area network or a local area network, a system for communicating over a controller area network (CAN), such as a CAN bus, a system for communication over a near field communication network, or a communication system configured to communicate over any of a variety of other networks. Communication system 306 can also include a system that facilitates downloads or transfers of information to and from a secure digital (SD) card or a universal serial bus (USB) card, or both. In communicating with other items of agricultural system 500, communication system can utilize network 359.

FIG. 3 also shows remote users 366 interacting with agricultural harvester 100, receiving machines 200, and/or remote computing systems 300 through user interfaces mechanisms 364 over network 359. In some examples, user interface mechanisms 364 may include joysticks, levers, a steering wheel, linkages, pedals, buttons, wireless devices (e.g., mobile computing devices, etc.), dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, the users 366 may interact with user interface mechanisms 364 using touch gestures. These examples described above are provided as illustrative examples and are not intended to limit the scope of the present disclosure. Consequently, other types of user interface mechanisms 364 may be used and are within the scope of the present disclosure.

FIG. 3 also shows that one or more operators 360 may operate agricultural harvester 100 and receiving machines 200. The operators 360 interact with operator interface mechanisms 118 and 218. In some examples, operator interface mechanisms 118 and 218 may include joysticks, levers, a steering wheel, linkages, pedals, buttons, wireless devices (e.g., mobile computing devices, etc.), dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, the operators 360 may interact with operator interface mechanisms 118 and 218 using touch gestures. These examples described above are provided as illustrative examples and are not intended to limit the scope of the present disclosure. Consequently, other types of operator interface mechanisms 118 and 218 may be used and are within the scope of the present disclosure.

Remote computing systems 300 can be a wide variety of different types of systems, or combinations thereof. For example, remote computing systems 300 can be in a remote server environment. Further, remote computing systems 300 can be remote computing systems, such as mobile devices, a remote network, a farm manager system, a vendor system, or a wide variety of other remote systems. In one example, agricultural harvester 100 or receiving machines 400, or both, can be controlled remotely by remote computing systems 300 or by remote users 366, or both. As will be described below, in some examples, one or more of the components shown in FIG. 3 as being disposed on agricultural harvester 100 or on receiving machines 400 can be located elsewhere, such as at remote computing systems 300. Similarly, in some examples, one or more of the components shown in FIG. 3 as being disposed on remote computing systems 300 can be located elsewhere, such as on agricultural harvester 100 or receiving machines 400, or both.

FIG. 3 also shows that agricultural harvesting system 500 can obtain one or more information maps 358. As described herein, the information maps 358 include, for example, one or more of a vegetative index map, a topographic map, a soil property map, a prior operation map, a biomass map, a yield map, a seeding map, a weed map, an optical characteristic map, a scouting map, an animal activity map, a historical crop constituent map, a historical yield map, a historical crop moisture map, and a historical pest map. However, information maps 358 may also encompass other types of data, such as other types of data that were obtained prior to a harvesting operation or a map from a prior operation. In other examples, information maps 358 can be generated during a current operation, such a map generated by predictive map generator 312 based on a predictive model 311 generated by predictive model generator 310.

Information maps 358 may be downloaded over network 359 and stored in a data store, such as data store 302, using a communication system, such as communication system 306, or in other ways.

Predictive model generator 310 generates a predictive model or relationship (collectively referred to hereinafter as "predictive model 311") that is indicative of a relationship between the values sensed by the in-situ sensors 208 or derived from sensor data generated by in-situ sensors 208 and values mapped to the worksite by the information maps 358. As an illustrative example, if the information map 358 maps a vegetative index value to different locations in the worksite, and the in-situ sensor 208 is sensing a value indicative of yield, then model generator 310 generates a predictive yield model that models the relationship between vegetative index values and yield values.

In some examples, the predictive map generator 312 uses the predictive models 311 generated by predictive model generator 310 to generate functional predictive maps 263 that predict the value of a characteristic sensed by the in-situ sensors 208 at different locations in the worksite based upon one or more of the information maps 358. Keeping with the previous example, where the predictive model 311 is a predictive yield model that models a relationship between yield values sensed by in-situ sensors 208 and vegetative index values from a vegetative index map, then predictive map generator 312 generates a functional predictive yield map that predicts yield values at different locations at the field based on the mapped vegetative index values at those locations and the predictive yield model.

In some examples, the type of values in the functional predictive map 263 may be the same as the in-situ data type sensed by the in-situ sensors 208. In some instances, the type of values in the functional predictive map 263 may have different units from the data sensed by the in-situ sensors 208. In some examples, the type of values in the functional predictive map 263 may be different from the data type sensed by the in-situ sensors 208 but have a relationship to the type of data type sensed by the in-situ sensors 208. For example, in some examples, the data type sensed by the in-situ sensors 208 may be indicative of the type of values in the functional predictive map 263. In some examples, the type of data in the functional predictive map 263 may be different than the data type in the information maps 358. In some instances, the type of data in the functional predictive map 263 may have different units from the data in the information maps 358. In some examples, the type of data in the functional predictive map 263 may be different from the data type in the information map 358 but has a relationship to the data type in the information map 358. For example, in some examples, the data type in the information maps 358 may be indicative of the type of data in the functional predictive map 263. In some examples, the type of data in the functional predictive map 263 is different than one of, or both of, the in-situ data type sensed by the in-situ sensors 208 and the data type in the information maps 358. In some examples, the type of data in the functional predictive map 263 is the same as one of, or both of, of the in-situ data type sensed by the in-situ sensors 208 and the data type in information maps 358. In some examples, the type of data in the functional predictive map 263 is the same as one of the in-situ data type sensed by the in-situ sensors 208 or the data type in the information maps 358, and different than the other.

Continuing with the preceding example, in which prior information map 358 is a vegetative index map and in-situ sensor 208 senses a value indicative of a yield value, predictive map generator 312 can use the vegetative index values in prior information map 358, and the predictive model 311 generated by predictive model generator 310, to generate a functional predictive map 263 that predicts the yield value at different locations in the worksite. Predictive map generator 312 thus outputs predictive map 264.

As shown in FIG. 3, predictive map 264 predicts the value of a sensed characteristic (sensed by in-situ sensors 208), or a characteristic related to the sensed characteristic, at various locations across the worksite based upon one or more information values in one or more information maps 358 at those locations and using the predictive model(s) 311. For example, if predictive model generator 310 has generated a predictive model 311 indicative of a relationship between biomass values and crop constituent values, then, given the biomass value (from a biomass map) at different locations across the worksite, predictive map generator 312 generates a predictive map 264 that predicts crop constituent values at different locations across the worksite. The biomass value, obtained from the biomass map, at those locations and the relationship between biomass values and crop constituent values, obtained from the predictive model 311, are used to generate the predictive map 264. This is merely one example.

Some variations in the data types that are mapped in the information maps 358, the data types sensed by in-situ sensors 208, and the data types predicted on the predictive map 264 will now be described.

In some examples, the data type in one or more information maps 358 is different from the data type sensed by in-situ sensors 208, yet the data type in the predictive map 264 is the same as the data type sensed by the in-situ sensors 208. For instance, the information map 358 may be a topographic map, and the variable sensed by the in-situ sensors 308 may be crop moisture values. The predictive map 264 may then be a predictive crop moisture map that maps predicted crop moisture values to different geographic locations in the in the worksite.

Also, in some examples, the data type in the information map 358 is different from the data type sensed by in-situ sensors 208, and the data type in the predictive map 264 is different from both the data type in the prior information map 358 and the data type sensed by the in-situ sensors 108.

In some examples, the information map 358 is from a prior pass through the field during a prior operation and the data type is different from the data type sensed by in-situ sensors 208, yet the data type in the predictive map 264 is the same as the data type sensed by the in-situ sensors 208. For instance, the information map 358 may be a seeding map generated during a previous operation on the worksite (previous planting or seeding operation), and the variable sensed by the in-situ sensors 208 may be crop quality values. The predictive map 264 may then be a predictive crop quality map that maps predicted crop quality values to different geographic locations in the worksite.

In some examples, the information map 358 is from a prior pass through the field during a prior operation and the data type is the same as the data type sensed by in-situ sensors 208, and the data type in the predictive map 264 is also the same as the data type sensed by the in-situ sensors 208. For instance, the information map 358 may be a historical yield map generated during a previous year, and the variable sensed by the in-situ sensors 108 may yield values. The predictive map 264 may then be a predictive yield map that maps predicted yield values to different geographic locations in the field. In such an example, the relative yield value differences in the georeferenced information map 358 from the prior year can be used by predictive model generator 310 to generate a predictive model that models a relationship between the relative yield value differences on the information map 358 and the yield values sensed by in-situ sensors 208 during the current operation. The predictive model is then used by predictive map generator 312 to generate a predictive yield map.

In another example, the prior information map 258 may be a map generated during a prior operation in the same year and the data type is different from the data type sensed by the in-situ sensors 208, and the data type in the predictive map 264 is also the same as the data type sensed by the in-situ sensors 208. For instance, the information map 358 may be a weed map generated on the basis of sensor data generated during a spraying operation earlier in the same year, and the variable sensed by the in-situ sensors 208 during the current harvesting operation may be crop quality values. The predictive map 264 may then be a predictive crop quality map that maps predictive crop quality values to different geographic locations in the worksite. In such an example, the weed characteristic values at time of the prior spraying operation are geo-referenced, recorded, and provided to remote computing systems 300 as an information map 358 of weed values. In-situ sensors 208 during a current harvesting operation can detect crop quality characteristic values at geographic locations in the worksite and predictive model generator 310 may then build a predictive model that models a relationship between crop quality characteristic values at time of the current harvesting operation and weed values at the time of the prior spraying operation. This is because the weed values at the time of the prior spraying operation in the same year are likely to be the same as at the time of the current harvesting operation or otherwise may be more accurate than the weed values for the worksite provided in other ways.

In some examples, predictive map 264 can be provided to the control zone generator 313. Control zone generator 313 groups adjacent portions of an area into one or more control zones based on data values of predictive map 264 that are associated with those adjacent portions. A control zone may include two or more contiguous portions of a worksite, such as a field, for which a control parameter corresponding to the control zone for controlling a controllable subsystem is constant. For example, a response time to alter a setting of controllable subsystems may be inadequate to satisfactorily respond to changes in values contained in a map, such as predictive map 264. In that case, control zone generator 313 parses the map and identifies control zones that are of a defined size to accommodate the response time of the controllable subsystems. In another example, control zones may be sized to reduce wear from excessive actuator movement resulting from continuous adjustment. In some examples, there may be a different set of control zones for each controllable subsystem or for groups of controllable subsystems. The control zones may be added to the predictive map 264 to obtain predictive control zone map 265. Predictive control zone map 265 can thus be similar to predictive map 264 except that predictive control zone map 265 includes control zone information defining the control zones. Thus, a functional predictive map 263, as described herein, may or may not include control zones. Both predictive map 264 and predictive control zone map 265 are functional predictive maps 263. In one example, a functional predictive map 263 does not include control zones, such as predictive map 264. In another example, a functional predictive map 263 does include control zones, such as predictive control zone map 265. In some examples, multiple crops may be simultaneously present in a field if an intercrop production system is implemented. In that case, predictive map generator 312 and control zone generator 313 are able to identify the location and characteristics of the two or more crops and then generate predictive map 264 and predictive map with control zones 265 accordingly.

It will also be appreciated that control zone generator 313 can cluster values to generate control zones and the control zones can be added to predictive control zone map 265, or a separate map, showing only the control zones that are generated. In some examples, the control zones may be used for controlling or calibrating agricultural harvester 100 or receiving machines 400, or both. In other examples, the control zones may be presented to operator(s) 360 and used to control or calibrate agricultural harvester 100 or receiving machines 400, or both, and, in other examples, the control zones may be presented to an operator 360 or another user, such as a remote user 366, or stored for later use.

Predictive map 264 or predictive control zone map 265 or both are provided to control system 214, which generates control signals based upon the predictive map 264 or predictive control zone map 265 or both to control agricultural harvester 100. Predictive map 264 or predictive control zone map 265 or both are provided to control system 414, which generates control signals based upon the predictive map 264 or predictive control zone map 265 or both to control the respective receiving machine 400.

While the illustrated example of FIG. 3 shows that various components of agricultural harvesting system 500 are located at specific locations, it will be understood that in other examples one or more of the components illustrated as being located at one location in FIG. 3 can be located at other locations. For example, one or more of predictive model generator 310, predictive model 311, predictive map generator 312, functional predictive maps 263 (e.g., 264 and 265), and control zone generator 313 can be located on agricultural harvester 100 or receiving machines 400, or both, but can communicate with other items of agricultural system 500 over network 359. Thus, the predictive models 311 and functional predictive maps 263 may be generated locally at agricultural harvester 100 or receiving machines 400 and communicated to other items in agricultural system 500. In other examples, agricultural harvester 100 or receiving machines 400 may access the predictive models 311 and functional predictive maps 263 at the remote locations without downloading the predictive models 311 and functional predictive maps 263. In other examples, one or more of control system 214 and control system 414, or components thereof, can be located at remote computing systems 300. In another example, remote computing systems 300 can include a control system or a control value generator that communicates control commands to one or more of agricultural harvester 100 and receiving machines 400 which are then used by the local control system of the agricultural harvester 100 and/or the receiving machines 400. These are merely some examples of the ways in which the agricultural system 500 can be distributed. Thus, it will be understood that the items in agricultural system 500 can be distributed in various ways, including ways that differ from the example shown in FIG. 3.

Figure 4A:
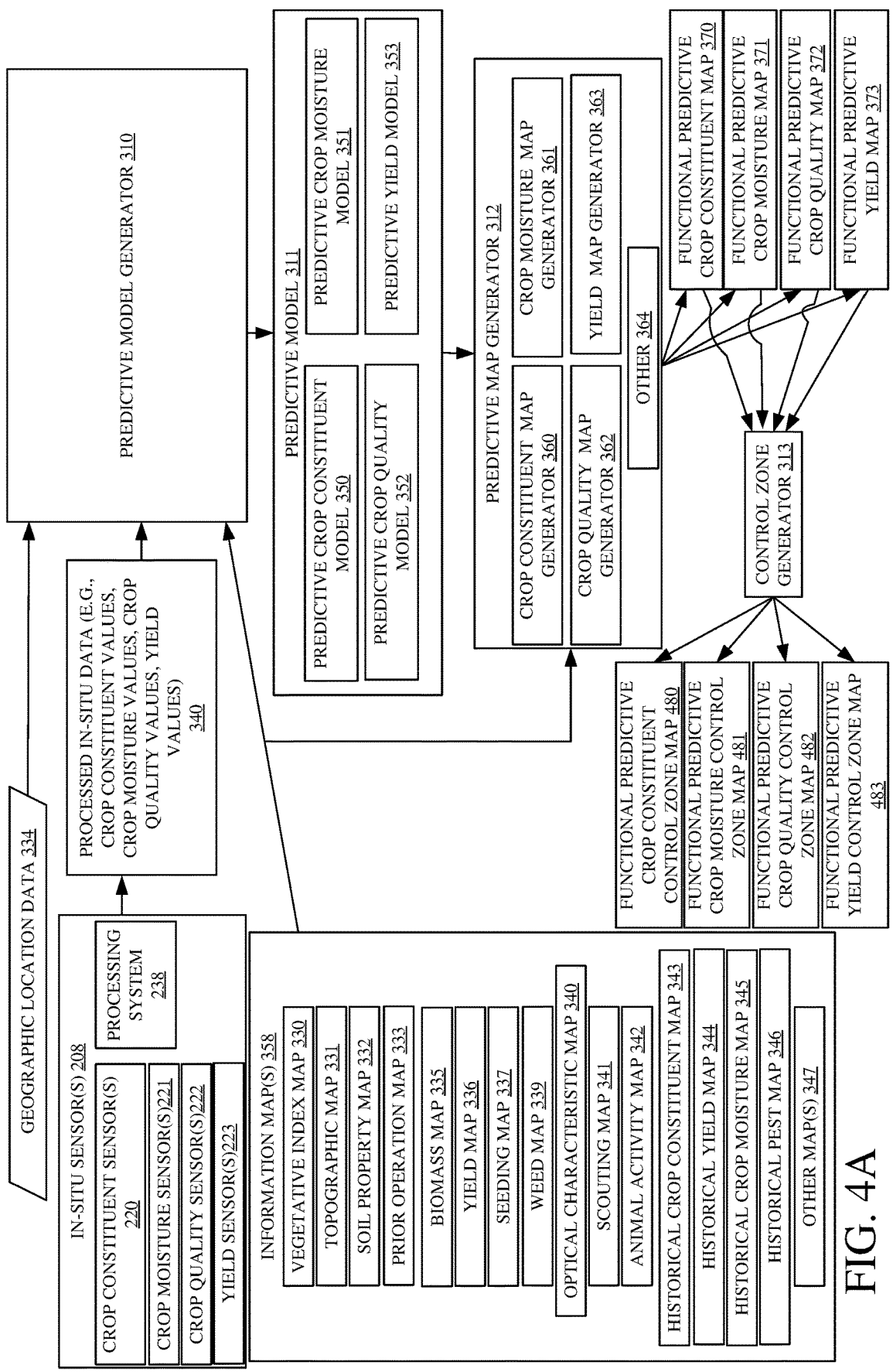
FIGS. 4A-4B (collectively referred to herein as FIG. 4) is a block diagram showing one example of a predictive model generator and predictive map generator.
Figure 4B:
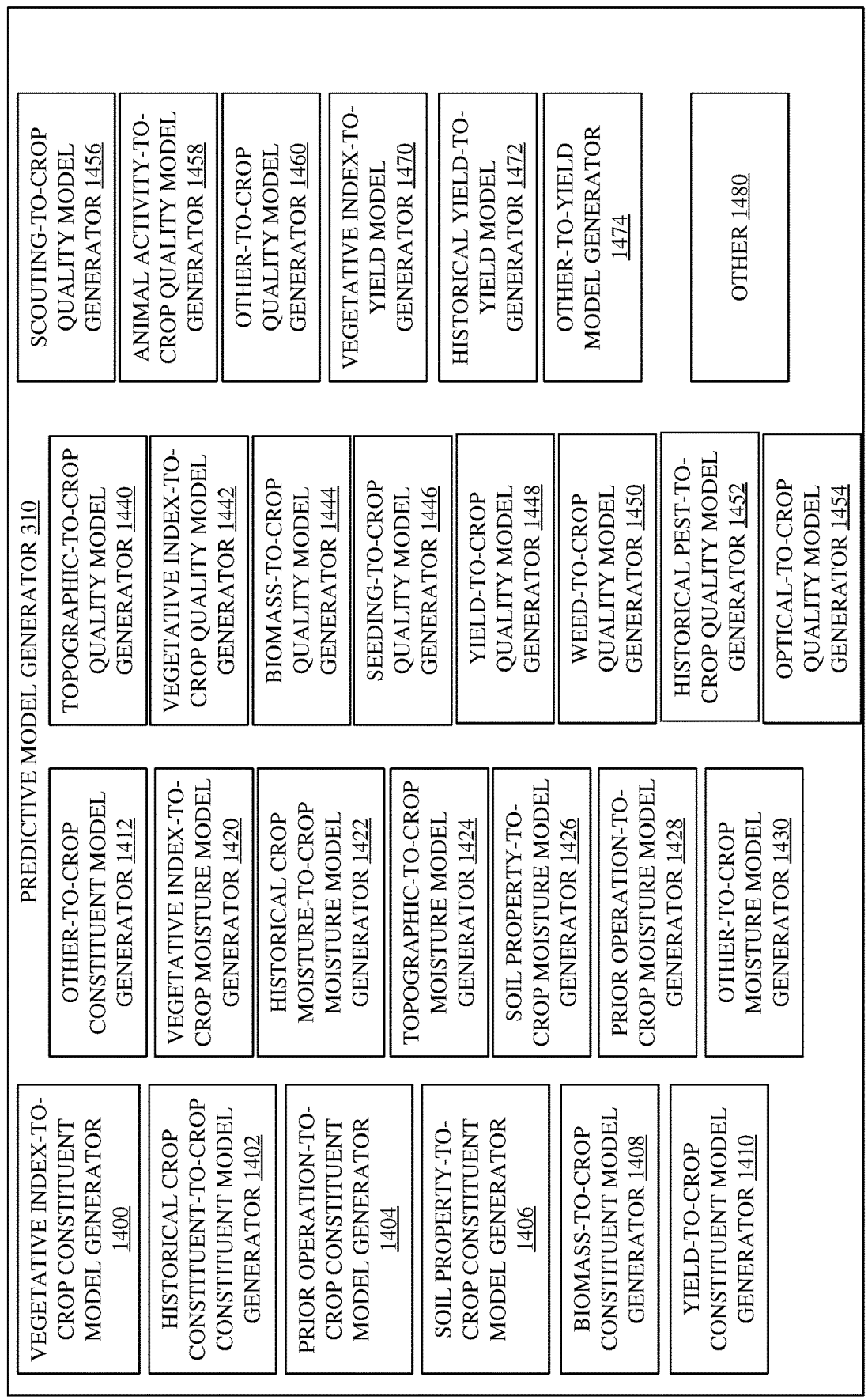

FIGS. 4A-4B (collectively referred to herein as FIG. 4) is a block diagram of a portion of the agricultural system architecture 400 shown in FIG. 3. Particularly, FIG. 4 shows, among other things, examples of the predictive model generator 310 and the predictive map generator 312 in more detail. FIG. 4 also illustrates information flow among the various components shown. The predictive model generator 310 receives one or more information map(s) 358. In the example illustrated in FIG. 4, information maps 358 include one or more of a vegetative index map 330, a topographic map 331, a soil property map 332, a prior operation map 333, a biomass map 335, a yield map 336, a seeding map 337, a weed map 339, an optical characteristic map 340, a scouting map 341, an animal activity map 342, a historical crop constituent map 343, a historical yield map 344, a historical crop moisture map 345, a historical pest map 346, or any of a wide variety of other maps 347. Predictive model generator 310 also receives geographic location data 334, such as an indication of a geographic location, from geographic position sensor 203. In-situ sensors 208 illustratively include machine crop constituent sensors 220, crop moisture sensors 221, crop quality sensors 222, and yield sensors 223 as well as a processing system 238. Processing system 238 processes sensor data generated from crop constituent sensors 220 to generate processed sensor data 340 indicative of crop constituent values, sensor data generated from crop moisture sensors 221 to generate processed sensor data 340 indicative of crop moisture values, sensor data from crop quality sensors 222 indicative of crop quality values, as well as sensor data from yield sensors 223 to generate processed sensor data 340 indicative of yield values. In some examples, other processing systems, such as processing system 338 or processing system 438 can process sensor data generated from in-situ sensors 208. Additionally, while the example shown in FIG. 4 illustrates the processing system 238 (or 338 or 438) as part of in-situ sensors 208, in other examples, processing system 238 (or 338 or 438) is separate from in-situ sensors 208 but in communication with in-situ sensors 208, such as the example shown in FIG. 3.

It will be understood that geographic location data 334 illustratively represents geographic locations on a field to which the values indicated by sensors 208 correspond. For example, where the in-situ sensor 208 detects a characteristic value, geographic location data 334 indicates the location of the field where that detected characteristic value corresponds. It will be understood that the geographic location of the agricultural harvester 100 at the time the characteristic value is detected by the in-situ sensor 208 may not be the location on the field to which the characteristic value corresponds. Thus, the geographic location data 334, indicative of the geographic location on the field to which the characteristic value detected by the in-situ sensor corresponds, can be derived from sensor data from geographic position sensor 203 along with heading data, travel speed data, machine latency data, as well as positional data of the sensor relative to the geographic position sensor 203 (or relative to another part of the agricultural harvester 100, such as the front of the header 102). This is merely one example. In any case, it will be understood that geographic location data 334 represents the geographic location on the field to which the characteristic values correspond (e.g., the crop constituent values, crop moisture values, crop quality values, and yield values).

As shown in FIG. 4, the example predictive model generator 310 includes one or more of: a vegetative index-to-crop constituent model generator 1400; a historical crop constituent-to-crop constituent model generator 1402; a prior operation-to-crop constituent model generator 1404; a soil property-to-crop constituent model generator 1406; a biomass-to-crop constituent model generator 1408; a yield-to-crop constituent model generator 1410; an other characteristic-to-crop constituent model generator 1412; a vegetative index-to-crop moisture model generator 1420; a historical crop moisture-to-crop moisture model generator 1422; a topographic characteristic-to-crop moisture model generator 1424; a soil property-to-crop moisture model generator 1426; a prior operation-to-crop moisture model generator 1428; an other characteristic-to-crop moisture model generator 1430; a topographic characteristic-to-crop quality model generator 1440; a vegetative index-to-crop quality model generator 1442; a biomass-to-crop quality model generator 1444; a seeding-to-crop quality model generator 1446; a yield-to-crop quality model generator 1448; a weed-to-crop quality model generator 1450; a historical pest-to-crop quality model generator 1452; an optical characteristic-to-crop quality model generator 1454; a scouting characteristic-to-crop quality model generator 1456; an animal activity-to-crop quality model generator 1458; an other characteristic-to-crop quality model generator 1460; a vegetative index-to-yield model generator 1470; a historical yield-to-yield model generator 1472; and an other characteristic-to-yield model generator 1474. In other examples, the predictive model generator 310 may include additional, fewer, or different components than those shown in the example of FIG. 4. Consequently, in some examples, the predictive model generator 310 may include other items 1480 as well, which may include other types of predictive model generators to generate other types of predictive models.

Vegetative index-to-crop constituent model generator 1400 identifies a relationship between crop constituent value(s) detected in processed sensor data 340, at geographic location(s) to which the detected crop constituent value(s) correspond, and vegetative index (VI) value(s) from the VI map 330 corresponding to the same location(s) in the worksite where the crop constituent value(s) correspond. Based on this relationship established by vegetative index-to-crop constituent model generator 1400, vegetative index-to-crop constituent model generator 1400 generates a predictive crop constituent model. The predictive crop constituent model is used by crop constituent map generator 360 to predict crop constituent values at different locations in the worksite based upon the georeferenced VI value contained in the vegetative index map 330 at the different locations in the worksite. Thus, for a given location in the worksite, a crop constituent value can be predicted at the given location based on the predictive crop constituent model and the VI value, from the vegetative index map 330, at that given location.

Historical crop constituent-to-crop constituent model generator 1402 identifies a relationship between crop constituent value(s) detected in processed sensor data 340, at geographic location(s) to which the detected crop constituent value(s) correspond, and historical crop constituent value(s) from the historical crop constituent map 343 corresponding to the same location(s) in the worksite where the crop constituent value(s) correspond. Based on this relationship established by historical crop constituent-to-crop constituent model generator 1402, historical crop constituent-to-crop constituent model generator 1402 generates a predictive crop constituent model. The predictive crop constituent model is used by crop constituent map generator 360 to predict crop constituent values at different locations in the worksite based upon the georeferenced historical crop constituent value contained in the historical crop constituent map 343 at the different locations in the worksite. Thus, for a given location in the worksite, a crop constituent value can be predicted at the given location based on the predictive crop constituent model and the historical crop constituent value, from the historical crop constituent map 343, at that given location.

Prior operation-to-crop constituent model generator 1404 identifies a relationship between crop constituent value(s) detected in processed sensor data 340, at geographic location(s) to which the detected crop constituent value(s) correspond, and prior operation value(s) from the prior operation map 333 corresponding to the same location(s) in the worksite where the crop constituent value(s) correspond. Based on this relationship established by prior operation-to-crop constituent model generator 1404, prior operation-to-crop constituent model generator 1404 generates a predictive crop constituent model. The predictive crop constituent model is used by crop constituent map generator 360 to predict crop constituent values at different locations in the worksite based upon the georeferenced prior operation value contained in the prior operation map 333 at the different locations in the worksite. Thus, for a given location in the worksite, a crop constituent value can be predicted at the given location based on the predictive crop constituent model and the prior operation value, from the prior operation map 333, at that given location.

Soil property-to-crop constituent model generator 1406 identifies a relationship between crop constituent value(s) detected in processed sensor data 340, at geographic location(s) to which the detected crop constituent value(s) correspond, and soil property value(s) from the soil property map 332 corresponding to the same location(s) in the worksite where the crop constituent value(s) correspond. Based on this relationship established by soil property-to-crop constituent model generator 1406, soil property-to-crop constituent model generator 1406 generates a predictive crop constituent model. The predictive crop constituent model is used by crop constituent map generator 360 to predict crop constituent values at different locations in the worksite based upon the georeferenced soil property value contained in the soil property map 332 at the different locations in the worksite. Thus, for a given location in the worksite, a crop constituent value can be predicted at the given location based on the predictive crop constituent model and the soil property value, from the soil property map 332, at that given location.

Biomass-to-crop constituent model generator 1408 identifies a relationship between crop constituent value(s) detected in processed sensor data 340, at geographic location(s) to which the detected crop constituent value(s) correspond, and biomass value(s) from the biomass map 335 corresponding to the same location(s) in the worksite where the crop constituent value(s) correspond. Based on this relationship established by biomass-to-crop constituent model generator 1408, biomass-to-crop constituent model generator 1408 generates a predictive crop constituent model. The predictive crop constituent model is used by crop constituent map generator 360 to predict crop constituent values at different locations in the worksite based upon the georeferenced biomass value contained in the biomass map 335 at the different locations in the worksite. Thus, for a given location in the worksite, a crop constituent value can be predicted at the given location based on the predictive crop constituent model and the biomass value, from the biomass map 335, at that given location.

Yield-to-crop constituent model generator 1410 identifies a relationship between crop constituent value(s) detected in processed sensor data 340, at geographic location(s) to which the detected crop constituent value(s) correspond, and yield value(s) from the yield map 336 corresponding to the same location(s) in the worksite where the crop constituent value(s) correspond. Based on this relationship established by yield-to-crop constituent model generator 1410, yield-to-crop constituent model generator 1410 generates a predictive crop constituent model. The predictive crop constituent model is used by crop constituent map generator 360 to predict crop constituent values at different locations in the worksite based upon the georeferenced yield value contained in the yield map 336 at the different locations in the worksite. Thus, for a given location in the worksite, a crop constituent value can be predicted at the given location based on the predictive crop constituent model and the yield value, from the yield map 336, at that given location.

Other characteristic-to-crop constituent model generator 1412 identifies a relationship between crop constituent value(s) detected in processed sensor data 340, at geographic location(s) to which the detected crop constituent value(s) correspond, and other characteristic value(s) from an other map 347 corresponding to the same location(s) in the worksite where the crop constituent value(s) correspond. Based on this relationship established by other characteristic-to-crop constituent model generator 1412, other characteristic-to-crop constituent model generator generates a predictive crop constituent model. The predictive crop constituent model is used by crop constituent map generator 360 to predict crop constituent values at different locations in the worksite based upon the georeferenced other characteristic value contained in the other map 347 at the different locations in the worksite. Thus, for a given location in the worksite, a crop constituent value can be predicted at the given location based on the predictive crop constituent model and the other characteristic value, from the other map 347, at that given location.

In light of the above, the predictive model generator 310 is operable to produce a plurality of predictive crop constituent models, such as one or more of the predictive crop constituent models generated by model generators 1400, 1402, 1404, 1406, 1408, 1410, 1412, and 1480. In another example, two or more of the predictive crop constituent models described above may be combined into a single predictive crop constituent model, such as a predictive crop constituent model that predicts crop constituent values based upon two or more of the VI value, the historical crop constituent value, the prior operation value, the soil property value, the biomass value, the yield value, and the other characteristic value at those different locations in the field. Any of these predictive crop constituent models, or combinations thereof, are represented collectively by predictive crop constituent model 350 in FIG. 4.

The predictive crop constituent model 350 is provided to predictive map generator 312. In the example of FIG. 4, predictive map generator 312 includes a predictive crop constituent map generator 360. In other examples, predictive map generator 312 may include additional or different map generators. Thus, in some examples, predictive map generator 312 may include other items 364 which may include other types of map generators to generate other types of maps.

Predictive crop constituent map generator 360 receives one or more of the VI map 330, historical crop constituent map 343, the prior operation map 333, the soil property map 332, the biomass map 335, the yield map 336, and other maps 347 along with the predictive crop constituent model 350 which predicts crop constituent values based upon one or more of VI values, historical crop constituent values, prior operation values, soil property values, biomass values, yield values, and other characteristic values and generates a functional predictive crop constituent map 370 that predicts crop constituent values at different locations in the worksite.

The functional predictive crop constituent map 370 is a predictive map 264. The functional predictive crop constituent map 370 predicts crop constituent values at different locations in a worksite. The functional predictive crop constituent map 370 may be provided to control zone generator 313, control system 214, and/or control system 414. Control zone generator 313 generates control zones and incorporates those control zones into the functional predictive crop constituent map 370 to produce a predictive control zone map 265, that is, a functional predictive crop constituent control zone map 380. One or both of functional predictive crop constituent map 370 and functional predictive crop constituent control zone map 380 may be provided to control system 214, which generates control signals to control one or more of the controllable subsystems 216 based upon the functional predictive crop constituent map 370, the functional predictive crop constituent control zone map 380, or both. One or both of functional predictive crop constituent map 370 and functional predictive crop constituent control zone map may be provided to control system 414, which generates control signals to control one or more of the controllable subsystems 416 based upon the functional predictive crop constituent map 370, the functional predictive crop constituent control zone map 380, or both. One or both of functional predictive crop constituent map 370 and functional predictive crop constituent control zone map 380 may be presented to an operator 360, such as on an operator interface mechanism 218 or 418, or to a remote user 366, such as on a remote user interface 364, or both.

Vegetative index-to-crop moisture model generator 1420 identifies a relationship between crop moisture value(s) detected in processed sensor data 340, at geographic location(s) to which the detected crop moisture value(s) correspond, and vegetative index (VI) value(s) from the VI map 330 corresponding to the same location(s) in the worksite where the crop moisture value(s) correspond. Based on this relationship established by vegetative index-to-crop moisture model generator 1420, vegetative index-to-crop moisture model generator 1420 generates a predictive crop moisture model. The predictive crop moisture model is used by crop moisture map generator 361 to predict crop moisture values at different locations in the worksite based upon the georeferenced VI value contained in the vegetative index map 330 at the different locations in the worksite. Thus, for a given location in the worksite, a crop moisture value can be predicted at the given location based on the predictive crop moisture model and the VI value, from the vegetative index map 330, at that given location.

Historical crop moisture-to-crop moisture model generator 1422 identifies a relationship between crop moisture value(s) detected in processed sensor data 340, at geographic location(s) to which the detected crop moisture value(s) correspond, and historical crop moisture value(s) from the historical crop moisture map 345 corresponding to the same location(s) in the worksite where the crop moisture value(s) correspond. Based on this relationship established by historical crop moisture-to-crop moisture model generator 1422, historical crop moisture-to-crop moisture model generator 1422 generates a predictive crop moisture model. The predictive crop moisture model is used by crop moisture map generator 361 to predict crop moisture values at different locations in the worksite based upon the georeferenced historical crop moisture value contained in the historical crop moisture map 345 at the different locations in the worksite. Thus, for a given location in the worksite, a crop moisture value can be predicted at the given location based on the predictive crop moisture model and the historical crop moisture value, from the historical crop moisture map 345, at that given location.

Topographic characteristic-to-crop moisture model generator 1424 identifies a relationship between crop moisture value(s) detected in processed sensor data 340, at geographic location(s) to which the detected crop moisture value(s) correspond, and topographic characteristic value(s) from the topographic map 331 corresponding to the same location(s) in the worksite where the crop moisture value(s) correspond. Based on this relationship established by topographic characteristic-to-crop moisture model generator 1424, topographic characteristic-to-crop moisture model generator 1424 generates a predictive crop moisture model. The predictive crop moisture model is used by crop moisture map generator 361 to predict crop moisture values at different locations in the worksite based upon the georeferenced topographic characteristic value contained in the topographic map 331 at the different locations in the worksite. Thus, for a given location in the worksite, a crop moisture value can be predicted at the given location based on the predictive crop moisture model and the topographic characteristic value, from the topographic map 331, at that given location.

Soil property-to-crop moisture model generator 1426 identifies a relationship between crop moisture value(s) detected in processed sensor data 340, at geographic location(s) to which the detected crop moisture value(s) correspond, and soil property value(s) from the soil property map 332 corresponding to the same location(s) in the worksite where the crop moisture value(s) correspond. Based on this relationship established by soil property-to-crop moisture model generator 1426, soil property-to-crop moisture model generator 1426 generates a predictive crop moisture model. The predictive crop moisture model is used by crop moisture map generator to predict crop moisture values at different locations in the worksite based upon the georeferenced soil property value contained in the soil property map 332 at the different locations in the worksite. Thus, for a given location in the worksite, a crop moisture value can be predicted at the given location based on the predictive crop moisture model and the soil property value, from the soil property map 332, at that given location.

Prior operation-to-crop moisture model generator 1428 identifies a relationship between crop moisture value(s) detected in processed sensor data 340, at geographic location(s) to which the detected crop moisture value(s) correspond, and prior operation value(s) from the prior operation map 333 corresponding to the same location(s) in the worksite where the crop moisture value(s) correspond. Based on this relationship established by prior operation-to-crop moisture model generator 1428, prior operation-to-crop moisture model generator 1428 generates a predictive crop moisture model. The predictive crop moisture model is used by crop moisture map generator 361 to predict crop moisture values at different locations in the worksite based upon the georeferenced prior operation value contained in the prior operation map 333 at the different locations in the worksite. Thus, for a given location in the worksite, a crop moisture value can be predicted at the given location based on the predictive crop moisture model and the prior operation value, from the prior operation map 333, at that given location.

Other characteristic-to-crop moisture model generator 1430 identifies a relationship between crop moisture value(s) detected in processed sensor data 340, at geographic location(s) to which the detected crop moisture value(s) correspond, and other characteristic value(s) from an other map 347 corresponding to the same location(s) in the worksite where the crop moisture value(s) correspond. Based on this relationship established by other characteristic-to-crop moisture model generator 1430, other characteristic-to-crop moisture model generator 1430 generates a predictive crop moisture model. The predictive crop moisture model is used by crop moisture map generator 361 to predict crop moisture values at different locations in the worksite based upon the georeferenced other characteristic value contained in the other map 347 at the different locations in the worksite. Thus, for a given location in the worksite, a crop moisture value can be predicted at the given location based on the predictive crop moisture model and the other characteristic value, from the other map 347, at that given location.

In light of the above, the predictive model generator 310 is operable to produce a plurality of predictive crop moisture models, such as one or more of the predictive crop moisture models generated by model generators 1420, 1422, 1424, 1426, 1428, 1430, and 1480. In another example, two or more of the predictive crop moisture models described above may be combined into a single predictive crop moisture model, such as a predictive crop moisture model that predicts crop moisture values based upon two or more of the VI value, the historical crop moisture value, the topographic characteristic value, the soil property value, the prior operation value, and the other characteristic value at those different locations in the field. Any of these predictive crop moisture models, or combinations thereof, are represented collectively by predictive crop moisture model 351 in FIG. 4.

The predictive crop moisture model 351 is provided to predictive map generator 312. In the example of FIG. 4, predictive map generator 312 includes a predictive crop moisture map generator 361. In other examples, predictive map generator 312 may include additional or different map generators. Thus, in some examples, predictive map generator 312 may include other items 364 which may include other types of map generators to generate other types of maps.

Predictive crop moisture map generator 361 receives one or more of the VI map 330, historical crop moisture map 345, the topographic map 331, the soil property map 332, the prior operation map 333, and other maps 347 along with the predictive crop moisture model 351 which predicts crop moisture values based upon one or more of VI values, historical crop moisture values, topographic characteristic values, soil property values, prior operation values, and other characteristic values and generates a functional predictive crop moisture map 371 that predicts crop moisture values at different locations in the worksite.

The functional predictive crop moisture map 371 is a predictive map 264. The functional predictive crop moisture map 371 predicts crop moisture values at different locations in a worksite. The functional predictive crop moisture map 371 may be provided to control zone generator 313, control system 214, and/or control system 414. Control zone generator 313 generates control zones and incorporates those control zones into the functional predictive crop moisture map 371 to produce a predictive control zone map 265, that is, a functional predictive crop moisture control zone map 381. One or both of functional predictive crop moisture map 371 and functional predictive crop moisture control zone map 381 may be provided to control system 214, which generates control signals to control one or more of the controllable subsystems 216 based upon the functional predictive crop moisture map 371, the functional predictive crop moisture control zone map 381, or both. One or both of functional predictive crop moisture map and functional predictive crop moisture control zone map 381 may be provided to control system 414, which generates control signals to control one or more of the controllable subsystems 416 based upon the functional predictive crop moisture map 371, the functional predictive crop moisture control zone map 381, or both. One or both of functional predictive crop moisture map 371 and functional predictive crop moisture control zone map 381 may be presented to an operator 360, such as on an operator interface mechanism 218 or 418, or to a remote user 366, such as on a remote user interface 364, or both.

Topographic characteristic-to-crop quality model generator 1440 identifies a relationship between crop quality value(s) detected in processed sensor data 340, at geographic location(s) to which the detected crop quality value(s) correspond, and topographic characteristic value(s) from the topographic map 331 corresponding to the same location(s) in the worksite where the crop quality value(s) correspond. Based on this relationship established by topographic characteristic-to-crop quality model generator 1440, topographic characteristic-to-crop quality model generator 1440 generates a predictive crop quality model. The predictive crop quality model is used by crop quality map generator 362 to predict crop quality values at different locations in the worksite based upon the georeferenced topographic characteristic value contained in the topographic map 331 at the different locations in the worksite. Thus, for a given location in the worksite, a crop quality value can be predicted at the given location based on the predictive crop quality model and the topographic characteristic value, from the topographic map 331, at that given location.

Vegetative index-to-crop quality model generator 1442 identifies a relationship between crop quality value(s) detected in processed sensor data 340, at geographic location(s) to which the detected crop quality value(s) correspond, and vegetative index (VI) value(s) from the VI map 330 corresponding to the same location(s) in the worksite where the crop quality value(s) correspond. Based on this relationship established by vegetative index-to-crop quality model generator 1442, vegetative index-to-crop quality model generator 1442 generates a predictive crop quality model. The predictive crop quality model is used by crop quality map generator 362 to predict crop quality values at different locations in the worksite based upon the georeferenced VI value contained in the VI map 330 at the different locations in the worksite. Thus, for a given location in the worksite, a crop quality value can be predicted at the given location based on the predictive crop quality model and the VI value, from the VI map 330, at that given location.

Biomass-to-crop quality model generator 1444 identifies a relationship between crop quality value(s) detected in processed sensor data 340, at geographic location(s) to which the detected crop quality value(s) correspond, and biomass value(s) from the biomass map 335 corresponding to the same location(s) in the worksite where the crop quality value(s) correspond. Based on this relationship established by biomass-to-crop quality model generator 1444, biomass-to-crop quality model generator 1444 generates a predictive crop quality model. The predictive crop quality model is used by crop quality map generator 362 to predict crop quality values at different locations in the worksite based upon the georeferenced biomass value contained in the biomass map 335 at the different locations in the worksite. Thus, for a given location in the worksite, a crop quality value can be predicted at the given location based on the predictive crop quality model and the biomass value, from the biomass map 335, at that given location.

Seeding-to-crop quality model generator 1446 identifies a relationship between crop quality value(s) detected in processed sensor data 340, at geographic location(s) to which the detected crop quality value(s) correspond, and seeding characteristic value(s) from the seeding map 337 corresponding to the same location(s) in the worksite where the crop quality value(s) correspond. Based on this relationship established by seeding-to-crop quality model generator 1446, seeding-to-crop quality model generator 1446 generates a predictive crop quality model. The predictive crop quality model is used by crop quality map generator 362 to predict crop quality values at different locations in the worksite based upon the georeferenced seeding value contained in the seeding map 337 at the different locations in the worksite. Thus, for a given location in the worksite, a crop quality value can be predicted at the given location based on the predictive crop quality model and the seeding value, from the seeding map 337, at that given location.

Yield-to-crop quality model generator 1448 identifies a relationship between crop quality value(s) detected in processed sensor data 340, at geographic location(s) to which the detected crop quality value(s) correspond, and yield value(s) from the yield map 336 corresponding to the same location(s) in the worksite where the crop quality value(s)

correspond. Based on this relationship established by yield-to-crop quality model generator 1448, yield-to-crop quality model generator 1448 generates a predictive crop quality model. The predictive crop quality model is used by crop quality map generator 362 to predict crop quality values at different locations in the worksite based upon the georeferenced yield value contained in the yield map 336 at the different locations in the worksite. Thus, for a given location in the worksite, a crop quality value can be predicted at the given location based on the predictive crop quality model and the yield value, from the yield map 336, at that given location.

Weed-to-crop quality model generator 1450 identifies a relationship between crop quality value(s) detected in processed sensor data 340, at geographic location(s) to which the detected crop quality value(s) correspond, and weed value(s) from the weed map 339 corresponding to the same location(s) in the worksite where the crop quality value(s) correspond. Based on this relationship established by weed-to-crop quality model generator 1450, weed-to-crop quality model generator 1450 generates a predictive crop quality model. The predictive crop quality model is used by crop quality map generator 362 to predict crop quality values at different locations in the worksite based upon the georeferenced weed value contained in the weed map 339 at the different locations in the worksite. Thus, for a given location in the worksite, a crop quality value can be predicted at the given location based on the predictive crop quality model and the weed value, from the weed map 339, at that given location.

Historical pest-to-crop quality model generator 1452 identifies a relationship between crop quality value(s) detected in processed sensor data 340, at geographic location(s) to which the detected crop quality value(s) correspond, and historical pest value(s) from the historical pest map 346 corresponding to the same location(s) in the worksite where the crop quality value(s) correspond. Based on this relationship established by historical pest-to-crop quality model generator 1452, historical pest-to-crop quality model generator 1452 generates a predictive crop quality model. The predictive crop quality model is used by crop quality map generator 362 to predict crop quality values at different locations in the worksite based upon the georeferenced historical pest value contained in the historical pest map 346 at the different locations in the worksite. Thus, for a given location in the worksite, a crop quality value can be predicted at the given location based on the predictive crop quality model and the historical pest value, from the historical pest map 346, at that given location.

Optical characteristic-to-crop quality model generator 1454 identifies a relationship between crop quality value(s) detected in processed sensor data 340, at geographic location(s) to which the detected crop quality value(s) correspond, and optical characteristic value(s) from the optical characteristic map 340 corresponding to the same location(s) in the worksite where the crop quality value(s) correspond. Based on this relationship established by optical characteristic-to-crop quality model generator 1454, optical characteristic-to-crop quality model generator 1454 generates a predictive crop quality model. The predictive crop quality model is used by crop quality map generator 362 to predict crop quality values at different locations in the worksite based upon the georeferenced optical characteristic value contained in the optical characteristic map 340 at the different locations in the worksite. Thus, for a given location in the worksite, a crop quality value can be predicted at the given location based on the predictive crop quality model and the optical characteristic value, from the optical characteristic map 340, at that given location.

Scouting-to-crop quality model generator 1456 identifies a relationship between crop quality value(s) detected in processed sensor data 340, at geographic location(s) to which the detected crop quality value(s) correspond, and scouting value(s) from the scouting map 341 corresponding to the same location(s) in the worksite where the crop quality value(s) correspond. Based on this relationship established by scouting-to-crop quality model generator 1456, scouting-to-crop quality model generator 1456 generates a predictive crop quality model. The predictive crop quality model is used by crop quality map generator 362 to predict crop quality values at different locations in the worksite based upon the georeferenced scouting value contained in the scouting map 341 at the different locations in the worksite. Thus, for a given location in the worksite, a crop quality value can be predicted at the given location based on the predictive crop quality model and the scouting value, from the scouting map 341, at that given location.

Animal activity-to-crop quality model generator 1458 identifies a relationship between crop quality value(s) detected in processed sensor data 340, at geographic location(s) to which the detected crop quality value(s) correspond, and animal activity value(s) from the animal activity map 342 corresponding to the same location(s) in the worksite where the crop quality value(s) correspond. Based on this relationship established by animal activity-to-crop quality model generator 1458, animal activity-to-crop quality model generator 1458 generates a predictive crop quality model. The predictive crop quality model is used by crop quality map generator 362 to predict crop quality values at different locations in the worksite based upon the georeferenced animal activity value contained in the animal activity map 342 at the different locations in the worksite. Thus, for a given location in the worksite, a crop quality value can be predicted at the given location based on the predictive crop quality model and the animal activity value, from the animal activity map 342, at that given location.

Other characteristic-to-crop quality model generator 1460 identifies a relationship between crop quality value(s) detected in processed sensor data 340, at geographic location(s) to which the detected crop quality value(s) correspond, and other characteristic value(s) from an other map 347 corresponding to the same location(s) in the worksite where the crop quality value(s) correspond. Based on this relationship established by other characteristic-to-crop quality model generator 1460, other characteristic-to-crop quality model generator 1460 generates a predictive crop quality model. The predictive crop quality model is used by crop quality map generator 362 to predict crop quality values at different locations in the worksite based upon the georeferenced other characteristic value contained in the other map 347 at the different locations in the worksite. Thus, for a given location in the worksite, a crop quality value can be predicted at the given location based on the predictive crop quality model and the other characteristic value, from the other map 347, at that given location.

In light of the above, the predictive model generator 310 is operable to produce a plurality of predictive crop quality models, such as one or more of the predictive crop quality models generated by model generators 1440, 1442, 1444, 1446, 1448, 1450, 1452, 1454, 1456, 1458, 1460, and 1480. In another example, two or more of the predictive crop quality models described above may be combined into a single predictive crop quality model, such as a predictive crop quality model that predicts crop quality values based upon two or more of the topographic characteristic value, the vegetative index value, the biomass value, the seeding characteristic value, the yield value, the weed value, the historical pest value, the optical characteristic value, the scouting value, the animal activity value, and the other characteristic value at those different locations in the field. Any of these predictive crop quality models, or combinations thereof, are represented collectively by predictive crop quality model 352 in FIG. 4.

The predictive crop quality model 352 is provided to predictive map generator 312. In the example of FIG. 4, predictive map generator 312 includes a predictive crop quality map generator 362. In other examples, predictive map generator 312 may include additional or different map generators. Thus, in some examples, predictive map generator 312 may include other items which may include other types of map generators to generate other types of maps.

Predictive crop quality map generator 362 receives one or more of the topographic map 331, the vegetative index map 330, the biomass map 335, the seeding map 337, the yield map 336, the weed map 339, the historical pest map 346, the optical characteristic map 340, the scouting map 341, the animal activity map 342, and other maps 347 along with the predictive crop quality model 352 which predicts crop quality values based upon one or more of topographic characteristic values, vegetative index values, biomass values, seeding characteristic values, yield values, weed values, historical pest values, optical characteristic values, scouting values, animal activity values, and other characteristic values and generates a functional predictive crop quality map 372 that predicts crop quality values at different locations in the worksite.

The functional predictive crop quality map 372 is a predictive map 264. The functional predictive crop quality map 372 predicts crop quality values at different locations in a worksite. The functional predictive crop quality map 372 may be provided to control zone generator 313, control system 214, and/or control system 414. Control zone generator 313 generates control zones and incorporates those control zones into the functional predictive crop quality map 372 to produce a predictive control zone map 265, that is, a functional predictive crop quality control zone map 382. One or both of functional predictive crop quality map 372 and functional predictive crop quality control zone map 382 may be provided to control system 214, which generates control signals to control one or more of the controllable subsystems 216 based upon the functional predictive crop quality map 372, the functional predictive crop quality control zone map 382, or both. One or both of functional predictive crop quality map 372 and functional predictive crop quality control zone map 382 may be provided to control system 414, which generates control signals to control one or more of the controllable subsystems 416 based upon the functional predictive crop quality map 372, the functional predictive crop quality control zone map 382, or both. One or both of functional predictive crop quality map 372 and functional predictive crop quality control zone map 382 may be presented to an operator 360, such as on an operator interface mechanism 218 or 418, or to a remote user 366, such as on a remote user interface 364, or both.

Vegetative index-to-yield model generator 1470 identifies a relationship between yield value(s) detected in processed sensor data 340, at geographic location(s) to which the detected yield value(s) correspond, and vegetative index (VI) value(s) from the VI map 330 corresponding to the same location(s) in the worksite where the yield value(s) correspond. Based on this relationship established by vegetative index-to-yield model generator 1470, vegetative index-to-yield model generator 1470 generates a predictive yield model. The predictive yield model is used by yield map generator 363 to predict yield values at different locations in the worksite based upon the georeferenced VI value contained in the vegetative index map 330 at the different locations in the worksite. Thus, for a given location in the worksite, a yield value can be predicted at the given location based on the predictive yield model and the VI value, from the vegetative index map 330, at that given location.

Historical yield-to-yield model generator 1472 identifies a relationship between yield value(s) detected in processed sensor data 340, at geographic location(s) to which the detected yield value(s) correspond, and historical yield value(s) from the historical yield map 344 corresponding to the same location(s) in the worksite where the yield value(s) correspond. Based on this relationship established by historical yield-to-yield model generator 1472, historical yield-to-yield model generator 1472 generates a predictive yield model. The predictive yield model is used by yield map generator 363 to predict yield values at different locations in the worksite based upon the georeferenced historical yield value contained in the historical yield map 344 at the different locations in the worksite. Thus, for a given location in the worksite, a yield value can be predicted at the given location based on the predictive yield model and the historical yield value, from the historical yield map 344, at that given location.

Other characteristic-to-yield model generator 1474 identifies a relationship between yield value(s) detected in processed sensor data 340, at geographic location(s) to which the detected yield value(s) correspond, and other characteristic value(s) from an other map 347 corresponding to the same location(s) in the worksite where the yield value(s) correspond. Based on this relationship established by other characteristic-to-yield model generator 1474, other characteristic-to-yield model generator 1474 generates a predictive yield model. The predictive yield model is used by yield map generator 363 to predict yield values at different locations in the worksite based upon the georeferenced other characteristic value contained in the other map 347 at the different locations in the worksite. Thus, for a given location in the worksite, a yield value can be predicted at the given location based on the predictive yield model and the other characteristic value, from the other map 347, at that given location.

In light of the above, the predictive model generator 310 is operable to produce a plurality of predictive yield models, such as one or more of the predictive yield models generated by model generators 1470, 1472, 1474, and 1480. In another example, two or more of the predictive yield models described above may be combined into a single predictive yield model, such as a predictive yield model that predicts yield values based upon two or more of the vegetative index value, the historical yield value, and the other characteristic value at those different locations in the field. Any of these predictive yield models, or combinations thereof, are represented collectively by predictive yield model 353 in FIG. 4.

The predictive yield model 353 is provided to predictive map generator 312. In the example of FIG. 4, predictive map generator 312 includes a predictive yield map generator 363. In other examples, predictive map generator 312 may include additional or different map generators. Thus, in some examples, predictive map generator 312 may include other items 364 which may include other types of map generators to generate other types of maps.

Predictive yield map generator 363 receives one or more of the topographic map the vegetative index map 330, the historical yield map 344, and other maps 347 along with the predictive yield model 353 which predicts yield values based upon one or more of vegetative index values, historical yield values, and other characteristic values and generates a functional predictive yield map 373 that predicts yield values at different locations in the worksite.

The functional predictive yield map 373 is a predictive map 264. The functional predictive yield map 373 predicts yield values at different locations in a worksite. The functional predictive yield map 373 may be provided to control zone generator 313, control system 214, and/or control system 414. Control zone generator 313 generates control zones and incorporates those control zones into the functional predictive yield map 373 to produce a predictive control zone map 265, that is, a functional predictive yield control zone map 373. One or both of functional predictive yield map 373 and functional predictive yield control zone map 383 may be provided to control system 214, which generates control signals to control one or more of the controllable subsystems 216 based upon the functional predictive yield map 373, the functional predictive yield control zone map 383, or both. One or both of functional predictive yield map 373 and functional predictive yield control zone map 383 may be provided to control system 414, which generates control signals to control one or more of the controllable subsystems 416 based upon the functional predictive yield map 373, the functional predictive yield control zone map 383, or both. One or both of functional predictive yield map 373 and functional predictive yield control zone map 383 may be presented to an operator 360, such as on an operator interface mechanism 218 or 418, or to a remote user 366, such as on a remote user interface 364, or both.

In some examples, one or more of the functional predictive crop constituent map 370, the functional predictive crop constituent control zone map 380, the functional predictive crop moisture map 371, the functional predictive crop moisture control zone map 381, the functional predictive crop quality map 372, the functional predictive crop quality control zone map 382, the functional predictive yield map 373, and the functional predictive yield control zone map 383 can be provided to the control system 214 or the control system 414, or both. In some examples, one or more of the functional predictive crop constituent map 370, the functional predictive crop constituent control zone map 380, the functional predictive crop moisture map 371, the functional predictive crop moisture control zone map 381, the functional predictive crop quality map 372, the functional predictive crop quality control zone map 382, the functional predictive yield map 373, and the functional predictive yield control zone map 383 can be provided to the operator interface mechanisms 218 or 418, or both, for presentation to operator(s) 360. In some examples, one or more of the functional predictive crop constituent map 370, the functional predictive crop constituent control zone map 380, the functional predictive crop moisture map 371, the functional predictive crop moisture control zone map 381, the functional predictive crop quality map 372, the functional predictive crop quality control zone map 382, the functional predictive yield map 373, and the functional predictive yield control zone map 383 can be provided to user interface mechanisms 364 for presentation to remote user(s) 366.

Figure 5A:
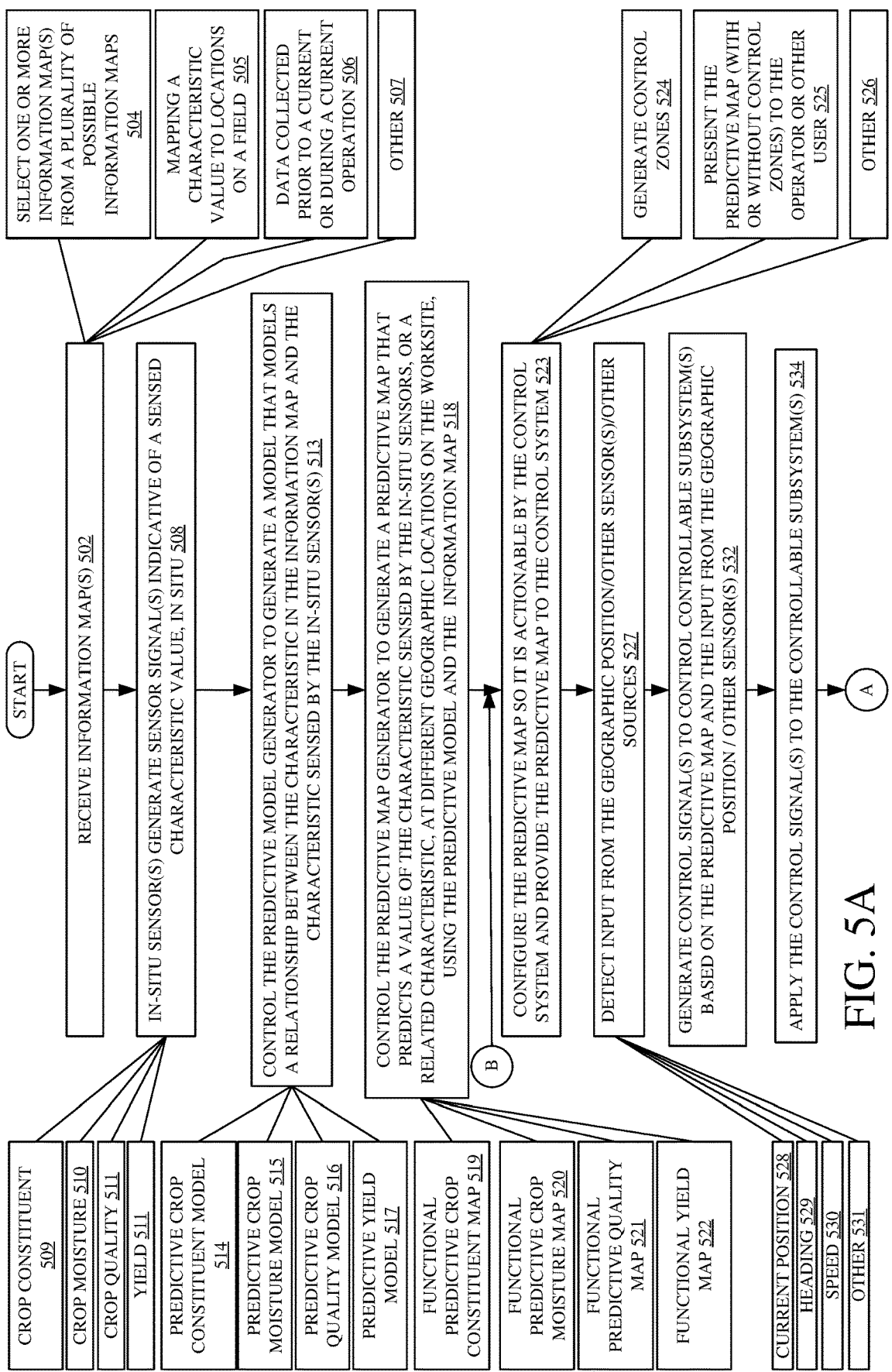
FIGS. 5A-5B (collectively referred to herein as FIG. 5) show a flow diagram illustrating one example of operation of an agricultural harvesting system in generating a map.
Figure 5B:
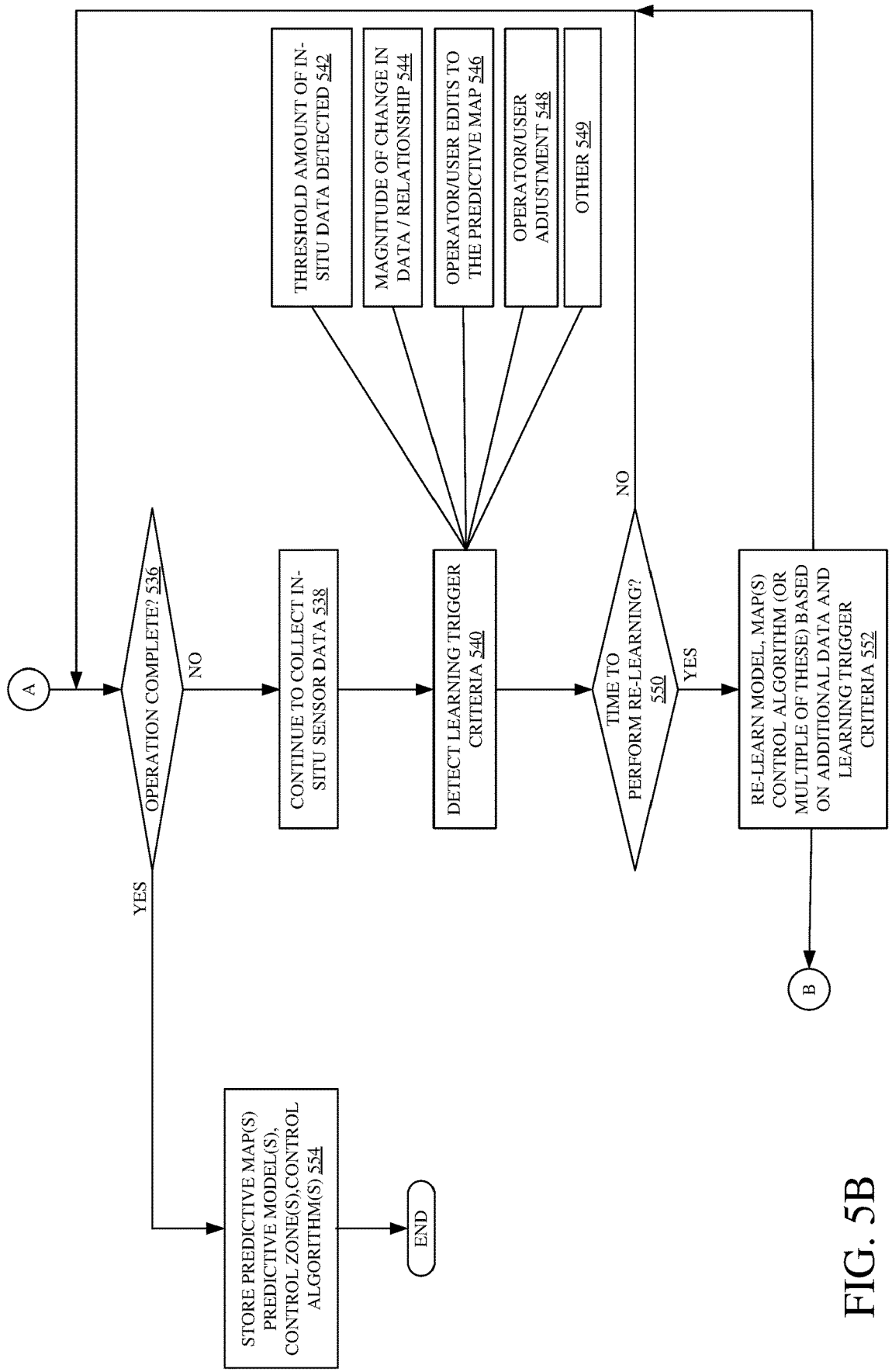

FIGS. 5A-5B (collectively referred to herein as FIG. 5) show a flow diagram illustrating one example of the operation of agricultural harvesting system architecture 500 in generating a predictive model and a predictive map.

At block 502, agricultural system 500 receives one or more information maps 358. Examples of information maps 358 or receiving information maps 358 are discussed with respect to blocks 504, 505, 507, and 508. As discussed above, information maps 358 map values of a variable, corresponding to a characteristic, to different locations in the worksite, as indicated at block 505. As indicated at block 504, receiving the information maps 358 may involve selecting one or more of a plurality of possible information maps 358 that are available. For instance, one information map 358 may be a VI map, such as VI map 330. Another information map 358 may be a topographic map, such as topographic map 331. Another information map 358 may be a soil property map, such as soil property map 332. Another information map 358 may be a prior operation map, such as prior operation map 333. Another information map 358 may be a biomass map, such as biomass map 335. Another information map may be a yield map, such as yield map 336. Another information map 358 may be a seeding map, such as seeding map 337. Another information map may be a weed map, such as weed map 339. Another information map may be an optical characteristic map, such as optical characteristic map 340. Another information map may be a scouting map, such as scouting map 341. Another information map may be an animal activity map, such as animal activity map 342. Another information map may be a historical crop constituent map, such as historical crop constituent map 343. Another information map may be a historical yield map, such as historical yield map 344. Another information map may be a historical crop moisture map, such as historical crop moisture map 345. Another information map may be a historical pest map, such as historical pest map 346. Information maps 358 may include various other types of characteristic maps, such as other maps 447. The process by which one or more information maps 358 are selected can be manual, semi-automated, or automated. The information maps 358 can be based on data collected prior to a current operation, as indicated by block 506. For instance, the data may be collected based on aerial taken during a previous year, or earlier in the current season, or at other times. The data may be based on data detected in ways other than using aerial images. For instance, the data may be collected during a previous operation on the worksite, such an operation during a previous year, or a previous operation earlier in the current season, or at other times. The machines performing those previous operations may be outfitted with one or more sensors that generate sensor data indicative of one or more characteristics. For example, the sensed yield during a previous harvesting operation at the worksite may be used as data to generate a historical yield map. In other examples, and as described above, the information maps 358 may be predictive maps having predictive values, such as a predictive yield map having predictive yield values or a predictive biomass map having predictive biomass values. The predictive information map 358 can be generated during a current operation by predictive map generator 312 based on a model generated by predictive model generator 310, as indicated by block 506. The predictive information map 358 can be predicted in other ways (before or during the current operation), such as based on other measured values (e.g., predictive yield or predictive biomass based on measured vegetative index values). The data for the information maps 358 can be obtained by predictive model generator 310 and predictive map generator 312 using communication system 306 and stored in data store 304. The data for the information maps 358 can be obtained by harvesting system 500 using a communication system in other ways as well, and this is indicated by block 507 in the flow diagram of FIG. 5.

As agricultural harvester 100 is operating, in-situ sensors 208 generate sensor data indicative of one or more in-situ data values indicative of a characteristic, as indicated by block 508. For example, crop constituent sensors 220 generate sensor data indicative of one or more in-situ crop constituent values as indicated by block 509. In another example, crop moisture sensors 221 generate sensor data indicative of one or more in-situ crop moisture values as indicated by block 510. In other example, crop quality sensors 222 generate sensor data indicative of one or more in-situ crop quality values as indicated by block 511. In another example, yield sensors 223 generate sensor data indicative of one or more in-situ yield values as indicated by block 512. In some examples, data from in-situ sensors 208 is georeferenced using position data from geographic position sensor 203 as well as one or more of heading data, travel speed data, machine latency data, and positional information of the in-situ sensors 208.

In one example, at block 513, predictive model generator 310 controls one or more of the model generators 1400, 1402, 1404, 1406, 1408, 1410, and 1412 to generate a model that models the relationship between the mapped values, such as the VI values, the historical crop constituent values, the prior operation values, the soil property values, the biomass values, the yield values, and the other characteristic values contained in the respective information map and the in-situ crop constituent values sensed by crop constituent sensors 220. Predictive model generator 310 thus generates a predictive crop constituent model 350 as indicated by block 514. In one example, at block 513, predictive model generator 310 controls one or more of the model generators 1420, 1422, 1424, 1426, 1428, and 1430 to generate a model that models the relationship between the mapped values, such as the VI values, the historical crop moisture values, the topographic characteristic values, the soil property values, the prior operation values, and the other characteristic values contained in the respective information map and the in-situ crop moisture values sensed by crop moisture sensors 221. Predictive model generator 310 thus generates a predictive crop moisture model 351 as indicated by block 515. In one example, at block 513, predictive model generator 310 controls one or more of the model generators 1440, 1442, 1444, 1446, 1448, 1450, 1452, 1454, 1456, 1458, and 1460 to generate a model that models the relationship between the mapped values, such as the topographic characteristic values, the vegetative index values, the biomass values, the seeding characteristic values, the yield values, the weed values, the historical pest values, the optical characteristic values, the scouting values, the animal activity values, and the other characteristic values contained in the respective information map and the in-situ crop quality values sensed by crop quality sensors 222. Predictive model generator 310 thus generates a predictive crop quality model 352 as indicated by block 516. In one example, at block 513, predictive model generator 310 controls one or more of the model generators 1470, 1472, and 1474 to generate a model that models the relationship between the mapped values, such as the VI values, the historical yield values, and the other characteristic values contained in the respective information map and the in-situ yield values sensed by yield sensors 223. Predictive model generator 310 thus generates a predictive yield model 353 as indicated by block 517.

The relationship(s) or model(s) generated by predictive model generator 310 are provided to predictive map generator 312.

In one example, at block 518, predictive map generator 312 controls predictive crop constituent map generator 460 to generate a functional predictive crop constituent map 470 that predicts crop constituent values (or sensor value(s) indicative of crop constituent values) at different geographic locations in a worksite at which agricultural harvester 100 is operating using the predictive crop constituent model 350 and one or more of the VI map 330, the historical crop constituent map 343, the prior operation map 333, the soil property map 332, the biomass map 335, the yield map 336, and various other maps 347. Generating a functional predictive crop constituent map 470 is indicated by block 519.

In one example, at block 518, predictive map generator 312 controls predictive crop moisture map generator 461 to generate a functional predictive crop moisture map 471 that predicts crop moisture values (or sensor value(s) indicative of crop moisture values) at different geographic locations in a worksite at which agricultural harvester 100 is operating using the predictive crop moisture model 351 and one or more of the VI map 330, the historical crop moisture map 345, the topographic map 331, the soil property map 332, the prior operation map 333, and various other maps 347. Generating a functional predictive crop moisture map 471 is indicated by block 520.

In one example, at block 518, predictive map generator 312 controls predictive crop quality map generator 462 to generate a functional predictive crop quality map 472 that predicts crop quality values (or sensor value(s) indicative of crop quality values) at different geographic locations in a worksite at which agricultural harvester 100 is operating using the predictive crop quality model 352 and one or more of the topographic map 331, the VI map 330, the biomass map 335, the seeding map 337, the yield map 336, the weed map 339, the historical pest map 346, the optical characteristic map 340, the scouting map 341, the animal activity map 342, and various other maps 347. Generating a functional predictive crop quality map 472 is indicated by block 521.

In one example, at block 518, predictive map generator 312 controls predictive crop yield map generator 463 to generate a functional predictive yield map 473 that predicts yield values (or sensor value(s) indicative of yield values) at different geographic locations in a worksite at which agricultural harvester 100 is operating using the predictive yield model 353 and one or more of the VI map 330, the historical yield map 344, and various other maps 347. Generating a functional predictive yield map 473 is indicated by block 522.

It should be noted that, in some examples, the functional predictive crop constituent map 370 may include two or more different map layers. Each map layer may represent a different data type, for instance, a functional predictive crop constituent map 370 that provides two or more of a map layer that provides predictive crop constituent values based on VI values from VI map 330, a map layer that provides predictive crop constituent values based on historical crop constituent values from historical crop constituent map 343, a map layer that provides predictive crop constituent values based on prior operation values from prior operation map 333, a map layer that provides predictive crop constituent values based on soil property values from soil property map 332, a map layer that provides predictive crop constituent values based on biomass values from biomass map 335, a map layer that provides predictive crop constituent values based on yield values from yield map 336, and a map layer that provides predictive crop constituent values based on other characteristic values from an other map 347. In some examples, the functional predictive crop constituent map 370 may include a map layer that provides predictive crop constituent values based on two or more of VI values from VI map 330, historical crop constituent values from historical crop constituent map 343, prior operation values from prior operation map 333, soil property values from soil property map 332, biomass values from biomass map 335, yield values from yield map 336, and other characteristic values from an other map 347.

It should be noted that, in some examples, the functional predictive crop moisture map 371 may include two or more different map layers. Each map layer may represent a different data type, for instance, a functional predictive crop moisture map 371 that provides two or more of a map layer that provides predictive crop moisture values based on VI values from VI map 330, a map layer that provides predictive crop moisture values based on historical crop moisture values from historical crop moisture map 345, a map layer that provides predictive crop moisture values based on topographic characteristic values from topographic map 331, a map layer that provides predictive crop moisture values based on soil property values from soil property map 332, a map layer that provides predictive crop moisture values based on prior operation values from prior operation map 333, and a map layer that provides predictive crop moisture values based on other characteristic values from an other map 347. In some examples, the functional predictive crop moisture map 371 may include a map layer that provides predictive crop moisture values based on two or more of VI values from VI map 330, historical crop moisture values from historical crop moisture map 345, topographic characteristic values from topographic map 331, soil property values from soil property map 332, prior operation values from prior operation map 333, and other characteristic values from an other map 347.

It should be noted that, in some examples, the functional predictive crop quality map 372 may include two or more different map layers. Each map layer may represent a different data type, for instance, a functional predictive crop quality map 372 that provides two or more of a map layer that provides predictive crop quality values based on topographic characteristic values from topographic map 331, a map layer that provides predictive crop quality values based on VI values from VI map 330, a map layer that provides predictive crop quality values based on biomass values from biomass map 335, a map layer that provides predictive crop quality values based on seeding characteristic values from seeding map 337, a map layer that provides predictive crop quality values based on yield values from yield map 336, a map layer that provides predictive crop quality values based on weed values from weed map 339, a map layer that provides predictive crop quality values based on historical pest values from historical pest map 346, a map layer that provides predictive crop quality values based on optical characteristic values from optical characteristic map 340, a map layer that provides predictive crop quality values based on scouting values from scouting map 341, a map layer that provides predictive crop quality values based on animal activity values from animal activity map 342, and a map layer that provides predictive crop quality values based on other characteristic values from an other map 347. In some examples, the functional predictive crop quality map 372 may include a map layer that provides predictive crop quality values based on two or more of topographic characteristic values from topographic map 332, VI values from VI map 330, biomass values from biomass map 335, seeding characteristic values from seeding map 337, yield values from yield map 336, weed values from weed map 339, historical pest values from historical pest map 346, optical characteristic values from optical characteristic map 340, scouting values from scouting map 341, animal activity values from animal activity map 342, and other characteristic values from an other map 347.

It should be noted that, in some examples, the functional predictive yield map 373 may include two or more different map layers. Each map layer may represent a different data type, for instance, a functional predictive yield map 373 that provides two or more of a map layer that provides predictive yield values based on VI values from VI map 330, a map layer that provides predictive yield values based on historical yield values from historical yield map 344, and a map layer that provides predictive yield values based on other characteristic values from an other map 347. In some examples, the functional predictive yield map 373 may include a map layer that provides predictive yield values based on two or more of VI values from VI map 330, historical yield values from historical yield map 344, and other characteristic values from an other map 347.

At block 523, predictive map generator 312 configures the functional predictive map(s) (e.g., one or more of 370, 371, 372, and 373) so that the functional predictive map(s) are actionable (or consumable) by control system 214 or 414, or both. Predictive map generator 312 can provide one or more of the functional maps, 370, 371, 372, and 373 to the control system 214, to the control system 414, and/or to control zone generator 313. Some examples of the different ways in which the functional predictive map(s) 370, 371, 372, and 373 can be configured or output are described with respect to blocks 523, 524, 525, and 526. For instance, predictive map generator 312 configures one or more of the functional predictive maps 370, 371, 372, and 373 so that the one or more functional predictive maps 370, 371, 372, and 373 include values that can be read by control system 214 or 414, or both, and used as the basis for generating control signals for one or more of the different controllable subsystems 216 of agricultural harvester 100 or controllable subsystems 416 of a respective receiving machine 400, as indicated by block 523.

In one example, at block 524, control zone generator 313 can divide the functional predictive crop constituent map 370 into control zones based on the values on the functional predictive crop constituent map 370 to generate functional predictive crop constituent control zone map 380.

In one example, at block 524, control zone generator 313 can divide the functional predictive crop moisture map 371 into control zones based on the values on the functional predictive crop moisture map 371 to generate functional predictive crop moisture control zone map 381.

In one example, at block 524, control zone generator 313 can divide the functional predictive crop quality map 372 into control zones based on the values on the functional predictive crop quality map 372 to generate functional predictive crop quality control zone map 382.

In one example, at block 524, control zone generator 313 can divide the functional predictive yield map 373 into control zones based on the values on the functional predictive yield map 373 to generate functional predictive yield control zone map 383.

Contiguously-geolocated values that are within a threshold value of one another can be grouped into a control zone. The threshold value can be a default threshold value, or the threshold value can be set based on an operator input, based on an input from an automated system, or based on other criteria. A size of the zones may be based on a responsiveness of the control system, the controllable subsystems, based on wear considerations, or on other criteria.

At block 525, predictive map generator 312 configures one or more of the functional predictive maps 370, 371, 372, and 373 for presentation to an operator or other user. Alternatively, or additionally, at block 525, control zone generator 313 can configure one or more of the functional predictive control zone maps 380, 381, 382, and 383 for presentation to an operator or other user. When presented to an operator or other user, the presentation of the one or more functional predictive map(s) 370, 371, 372, and 373 or of the one or more functional predictive control zone map(s) 380, 381, 382, and 383, or both, may contain one or more of the predictive values on the functional predictive map(s) correlated to geographic location, the control zones of functional predictive control zone map(s) correlated to geographic location, and settings values or control parameters that are used based on the predicted values on functional predictive map(s) or control zones on functional predictive control zone map(s). The presentation can, in another example, include more abstracted information or more detailed information. The presentation can also include a confidence level that indicates an accuracy with which the predictive values on the one or more functional predictive map(s) 370, 371, 372, and 373 or the control zones on the one or more predictive control zone map(s) 380, 381, 382, and 383 conform to measured values that may be measured by sensors on agricultural harvester 100 as agricultural harvester 100 operates at the worksite. Further where information is presented to more than one location, an authentication and authorization system can be provided to implement authentication and authorization processes. For instance, there may be a hierarchy of individuals that are authorized to view and change maps and other presented information. By way of example, an on-board display device may show the maps in near real time locally on the machine, or the maps may also be generated at one or more remote locations, or both. In some examples, each physical display device at each location may be associated with a person or a user permission level. The user permission level may be used to determine which display elements are visible on the physical display device and which values the corresponding person may change. As an example, a local operator of agricultural harvester 100 or a receiving machine 400 may be unable to see the information corresponding to the one or more functional predictive maps 370, 371, 372, and 373 or make any changes to machine operation. A supervisor, such as a supervisor at a remote location, however, may be able to see the one or more functional predictive maps 370, 371, 372, and 373 on the display but be prevented from making any changes. A manager, who may be at a separate remote location, may be able to see all of the elements on the one or more functional predictive map(s) 370, 371, 372, and 373 and also be able to change the functional predictive map(s). In some instances, the one or more functional predictive maps 370, 371, 372, and 373 accessible and changeable by a manager located remotely may be used in machine control. This is one example of an authorization hierarchy that may be implemented. The one or more functional predictive maps 370, 371, 372, and 373 or the one or more functional predictive control zone maps 380, 381, 382, and 383, or both, can be configured in other ways as well, as indicated by block 526.

At block 527, when agricultural harvester 100 is being controlled, input from geographic position sensor 203 and other in-situ sensors 208 are received by the control system 214. Particularly, at block 528, control system 214 detects an input from the geographic position sensor 203 identifying a geographic location of agricultural harvester 100. Block 529 represents receipt by the control system 214 of sensor inputs indicative of trajectory or heading of agricultural harvester 100, and block 530 represents receipt by the control system 214 of a speed of agricultural harvester 100. Block 531 represents receipt by the control system 214 of other information from various in-situ sensors 208.

At block 527, when a receiving machine 400 is being controlled, input from geographic position sensor 403 and other in-situ sensors 408 are received by the control system 414. Particularly, at block 528, control system 414 detects an input from the geographic position sensor 403 identifying a geographic location of receiving machine 400. Block 529 represents receipt by the control system 414 of sensor inputs indicative of trajectory or heading of receiving machine 400, and block 530 represents receipt by the control system 414 of a speed of receiving machine 200. Block 531 represents receipt by the control system 414 of other information from various in-situ sensors 408.

At block 532, where agricultural harvester 100 is being controlled, control system 214 generates control signals to control the controllable subsystems 216 based on the one or more functional predictive maps 370, 371, 372, and 373 or the one or more functional predictive control zone maps 380, 381, 382, and 383, or both, and the input from the geographic position sensor 208 and any other in-situ sensors 208. At block 534, control system 214 applies the control signals to the controllable subsystems 216. It will be appreciated that the particular control signals that are generated, and the particular controllable subsystems 216 that are controlled, may vary based upon one or more different things. For example, the control signals that are generated and the controllable subsystems 216 that are controlled may be based on the type of the one or more functional predictive maps 370, 371, 372, and 373 or the one or more functional predictive control zone maps 380, 381, 382, and 383, or both, that is being used. Similarly, the control signals that are generated and the controllable subsystems 216 that are controlled and the timing of the control signals can be based on various latencies of agricultural harvester 100 and the responsiveness of the controllable subsystems 216.

At block 532, where a receiving machine 400 is being controlled, control system 414 generates control signals to control the controllable subsystems 416 based on the one or more functional predictive maps 370, 371, 372, and 373 or the one or more functional predictive control zone maps 480, 481, 482, and 483, or both, and the input from the geographic position sensor 403 and any other in-situ sensors 408. At block 534, control system 214 applies the control signals to the controllable subsystems 416. It will be appreciated that the particular control signals that are generated, and the particular controllable subsystems 416 that are controlled, may vary based upon one or more different things. For example, the control signals that are generated and the controllable subsystems 416 that are controlled may be based on the type of the one or more functional predictive maps 370, 371, 372, and 373 or the one or more functional predictive control zone maps 380, 381, 382, and 383, or both, that is being used. Similarly, the control signals that are generated and the controllable subsystems 416 that are controlled and the timing of the control signals can be based on various latencies of the receiving machine 400 and the responsiveness of the controllable subsystems 416.

At block 536, a determination is made as to whether the operation has been completed. If the operation is not completed, the processing advances to block 538 where in-situ sensor data from geographic position sensor 203 and in-situ sensors 208 (and perhaps other sensors) and from geographic position sensor 403 and in-situ sensors 408 (and perhaps other sensors) continue to be read.

In some examples, at block 540, agricultural harvesting system 500 can also detect learning trigger criteria to perform machine learning on one or more of the one or more functional predictive maps (e.g., 370, 371, 372, and 373), the one or more functional predictive control zone maps (e.g., 380, 381, 382, and 383), the one or more predictive models (e.g., 350, 351, 352, and 353), the one or more zones generated by control zone generator 313, the one or more control algorithms implemented by the controllers in the control system 214 or the control system 414, or both, and other triggered learning.

The learning trigger criteria can include any of a wide variety of different criteria. Some examples of detecting trigger criteria are discussed with respect to blocks 542, 544, 546, 548, and 549. For instance, in some examples, triggered learning can involve recreation of a relationship used to generate a predictive model when a threshold amount of in-situ sensor data are obtained from in-situ sensors 208. In such examples, receipt of an amount of in-situ sensor data from the in-situ sensors 208 that exceeds a threshold trigger or causes the predictive model generator 310 to generate a new predictive model that is used by predictive map generator 312. Thus, as agricultural harvester 100 continues an operation, receipt of the threshold amount of in-situ sensor data from the in-situ sensors 208 triggers the creation of a new relationship represented by one or more new predictive models 350, 351, 352, and 353 generated by predictive model generator 310. Further, one or more new functional predictive maps 370, 371, 372, and 373, one or more new functional predictive control zone maps 380, 381, 382, and 383, or both, can be generated using the respective one or more new predictive modes 350, 351, 352, and 353. Block 542 represents detecting a threshold amount of in-situ sensor data used to trigger creation of one or more new predictive models.

In other examples, the learning trigger criteria may be based on how much the in-situ sensor data from the in-situ sensors 208 are changing, such as over time or compared to previous values. For example, if variations within the in-situ sensor data (or the relationship between the in-situ sensor data and the information in the one or more information maps 358) are within a selected range or is less than a defined amount, or below a threshold value, then one or more new predictive models are not generated by the predictive model generator 310. As a result, the predictive map generator 312 does not generate one or more new functional predictive maps, one or more new functional predictive control zone maps, or both. However, if variations within the in-situ sensor data are outside of the selected range, are greater than the defined amount, or are above the threshold value, for example, then the predictive model generator 310 generates one or more new predictive models 350, 351, 352, and 353 using all or a portion of the newly received in-situ sensor data that the predictive map generator 312 uses to generate one or more new functional predictive maps 370, 371, 372, and 373 which can be provided to control zone generator 313 for the creation of one or more new functional predictive control zone maps 380, 381, 382, and 383. At block 544, variations in the in-situ sensor data, such as a magnitude of an amount by which the data exceeds the selected range or a magnitude of the variation of the relationship between the in-situ sensor data and the information in the one or more information maps, can be used as a trigger to cause generation of one or more of one or more new predictive models (e.g., 350, 351, 352, and 353), one or more new functional predictive maps (e.g., 370, 371, 372, and 373), and one or more new functional predictive control zone maps (e.g., 380, 381, 382, and 383). Keeping with the examples described above, the threshold, the range, and the defined amount can be set to default values; set by an operator or user interaction through a user interface; set by an automated system; or set in other ways.

Other learning trigger criteria can also be used. For instance, if predictive model generator 310 switches to a different information map (different from the originally selected information map), then switching to the different information map may trigger re-learning by predictive model generator 310, predictive map generator 312, control zone generator 313, control system 214, control system 414, or other items. In another example, transitioning of agricultural harvester 100 to a different topography, a different control zone, a different region of the worksite, a different area with different grouped characteristics (such as a different crop genotype area) may be used as learning trigger criteria as well.

In some instances, an operator 360 or user 366 can also edit the functional predictive map(s) or functional predictive control zone map(s), or both. The edits can change a value on the functional predictive map(s), change a size, shape, position, or existence of a control zone on functional predictive control zone map(s), or both. Block 546 shows that edited information can be used as learning trigger criteria.

In some instances, it may also be that an operator 360 or user 366 observes that automated control of a controllable subsystem, is not what the operator or user desires. In such instances, the operator 360 or user 366 may provide a manual adjustment to the controllable subsystem reflecting that the operator 360 or user 366 desires the controllable subsystem to operate in a different way than is being commanded by control system. Thus, manual alteration of a setting by the operator or user can cause one or more of predictive model generator 310 to relearn one or more predictive models, predictive map generator 312 to generate one or more new functional predictive maps, control zone generator 313 to generate one or more new control zones on one or more functional predictive maps, and a control system to relearn a control algorithm or to perform machine learning on one or more of the controllers in the control system based upon the adjustment by the operator or user, as shown in block 548. Block 549 represents the use of other triggered learning criteria.

In other examples, relearning may be performed periodically or intermittently based, for example, upon a selected time interval such as a discrete time interval or a variable time interval, as indicated by block 550.

If relearning is triggered, whether based upon learning trigger criteria or based upon passage of a time interval, as indicated by block 550, then one or more of the predictive model generator 310, predictive map generator 312, control zone generator 313, control system 214 and control system 414 performs machine learning to generate new predictive model(s), new functional predictive map(s), new control zone(s), and new control algorithm(s), respectively, based upon the learning trigger criteria. The new predictive model(s), the new functional predictive map(s), the new control zone(s), and the new control algorithm(s) are generated using any additional data that has been collected since the last learning operation was performed. Performing relearning is indicated by block 552.

If the operation has been completed, operation moves from block 552 to block 554 where one or more of the functional predictive map(s), functional predictive control zone map(s), the predictive model(s), the control zone(s), and the control algorithm(s) are stored. The functional predictive map(s), the functional predictive control zone map(s), the predictive model(s), the control zone(s), and the control algorithm(s) may be stored locally on a data store of a machine (e.g., data store 204 of agricultural harvester 100 or data store 404 of a receiving machine 400) or stored remotely (e.g., stored at data store 304 of remote computing systems 300), for later use.

If the operation has not been completed, operation returns to block 518 such that the new functional predictive map(s), the new functional predictive control zone map(s), the new control zone(s), and/or the new control algorithm(s) can be used to control the agricultural harvester 100 or the receiving machine(s) 400, or both.

Figure 6:
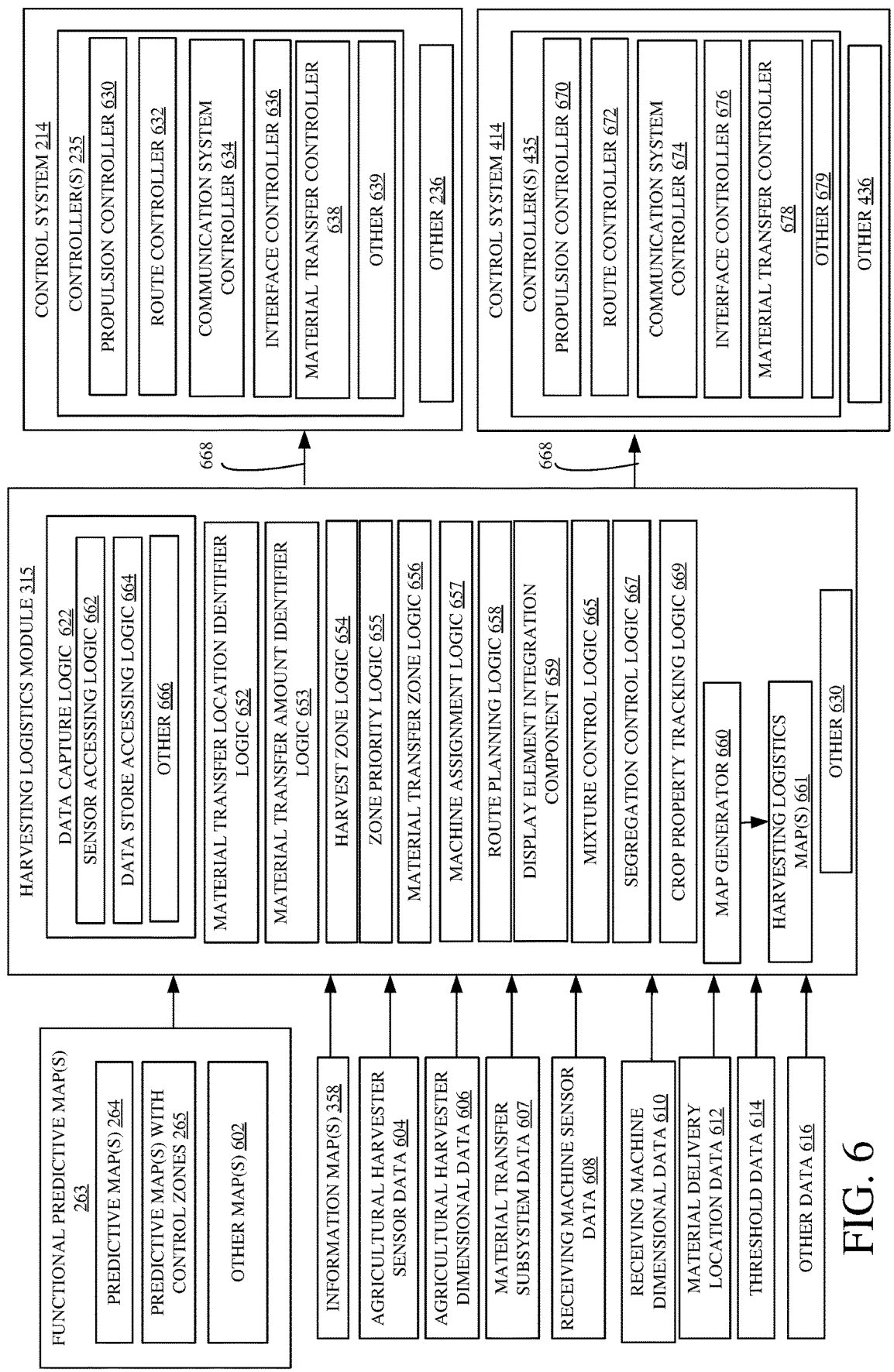
FIG. 6 is a block diagram showing one example of a harvesting logistics module in more detail.

FIG. 6 is a block diagram of a portion of agricultural harvesting system 500 shown in FIG. 3, in more detail. Particularly, FIG. 6 shows examples of the harvesting logistics module 315 in more detail. FIG. 6 also illustrates information flow among the various components shown.

As illustrated in FIG. 6, harvesting logistics module 315 receives one or more functional predictive maps 263, one or more information maps 358, agricultural harvester sensor data 604, agricultural harvester dimensional data 606, material transfer subsystem data 607, receiving machine sensor data 608, receiving machine fill data 610, material delivery location data 612, threshold data 614, and various other data 616, such as, but not limited to, other operator or user inputs. Functional predictive maps 263 can include one or more predictive maps 264, such as one or more of functional predictive crop constituent map 370, functional predictive crop moisture map 371, functional predictive crop quality map 372, and functional predictive yield map 373. Functional predictive maps 263 can include one or more predictive maps with control zones 265, such as one or more of functional predictive crop constituent control zone map 380, functional predictive crop moisture control zone map 381, functional predictive crop quality control zone map 382, and functional predictive yield control zone map 383. Functional predictive maps 263 can also include various other maps 602 (with or without control zones).

Information maps 358 can include one or more of the various information maps 358 discussed previously as well as one or more of a variety of other maps, for example, but not by limitation, a harvest map that maps areas of the field that have been harvested (harvested areas), areas of the field that have not yet been harvested (unharvested areas), as well as a route for one or more harvesters at a field. The harvest map may be continuously updated during a harvesting operation based on sensor data from the one or more harvesters at the field, such as tracked location data and, in some examples, sensor data the indicates operation of one or more crop processing components of the harvesters. These are just some examples.

Agricultural harvester sensor data 604 includes data generated by or derived from in-situ sensors 208 of agricultural harvester. Agricultural harvester dimensional data 606 includes dimensional information of the agricultural harvester 100, such as the length and width of the agricultural harvester 100, the width (or number of row units) of header 102, the dimensions (or fill capacity) of grain tank 132, and dimensional information with regard to the material transfer sub system 254.

Receiving machine sensor data 608 includes data generated by or derived from in-situ sensors 408 of receiving machine(s) 400. Receiving machine dimensional data 610 includes dimensional information of the receiving machine(s), such as the length and width of the receiving machine(s) 200, the dimensions (or fill capacity) of the grain bins 172 and/or 192, and dimensional information with regard to the material transfer subsystem 454.

Material transfer subsystem data 607 includes operational information with regard to the material transfer subsystem(s) 254 and/or 454, such as a rate (or range of rates) at which material transfer subsystem(s) 254 and/or 454, can convey material. In some examples, the rate at which the material transfer subsystem(s) 254 and/or 454 convey material can also be derived from sensors on agricultural harvester 100 or receiving machines 400 such as from a sensor that senses a speed of rotation of the respective auger or blower, a flow sensor that senses a flow of harvested material through the material transfer subsystem, or from fill level sensors 224 and/or 424 which can indicate the rate at which the respective machine is being filled.

Material delivery location data 612 includes material delivery identification information (e.g., type of location, such as dryer, storage location, purchasing facility, etc.), dimensional data (e.g., fill capacity data) with regard to storage location(s) (e.g., storage bin(s), storage bunk(s), silo(s), barn(s), dryer(s), etc.), locations of the material delivery location(s), current fill level(s) of the storage location(s), as well as designated use(s) of the material delivery location(s) (e.g., type of crop material to be stored, crop characteristic levels of crop to be stored, etc.).

Threshold data 614 includes threshold values with regard to operation of the harvesting system 500. For example, threshold data 614 can include thresholds for one or more crop characteristics such as crop constituent thresholds (or threshold ranges), crop moisture thresholds (or threshold ranges), and crop quality thresholds (or threshold ranges). For example, the threshold values (or threshold ranges) can be used to determine where harvested crop material (e.g., grain) is to be transferred, such as to a purchasing facility (e.g., mill) or to a storage location, to determine if/how crop material should be mixed or separated, and can be used in various other ways.

As illustrated in FIG. 6, harvesting logistics module 315 includes data capture logic 622, material transfer location identifier logic 652, material transfer amount identifier logic 653, harvest zone logic 654, zone priority logic 655, material transfer zone logic 656, machine assignment logic 657, route planning logic 658, display element integration component 659, map generator 660, mixture control logic 665, segregation control logic 667, crop property tracking logic 669, and can include other items 630 as well. Data capture logic 622, itself, includes sensor accessing logic 662, data store accessing logic 624, and can include other items 630 as well. Data capture logic 622 captures or obtains data that can be used by other items of harvesting logistics module 315. Sensor accessing logic 662 can be used by harvesting logistics module 315 to obtain or otherwise access sensor data (or values indicative of the sensed variables/characteristics) provided from in-situ sensors 208 and 408. Additionally, data store accessing logic 664 can be used by harvesting logistics module 315 to obtain or access data stored on data stores 204, 304, and/or 404. Upon obtaining the various data, harvesting logistics module 315 generates logistics outputs 668 which can be used in the control of agricultural harvester 100 and/or a receiving machine 400.

Harvest zone logic 654 illustratively identifies harvest zones of the worksite, the boundaries of which are determined based on the predictive values in the one or more functional predictive maps 263. For instance, harvest zones can be identified by dividing the worksite into harvest zones based on grouping of values (e.g., grouping values in a similar range) in the one or more functional predictive maps 263. For example, crop at the worksite having the same predictive crop constituent values or that are within the same range of predictive crop constituent values can be grouped into a harvest zone (e.g., a crop constituent harvest zone). In another example, crop at the worksite having the same predictive crop moisture values or that are within the same range of predictive crop moisture values can be grouped into a harvest zone (e.g., a crop moisture harvest zone). In another example, crop at the worksite having the same predictive crop quality values or that are within the same range of predictive crop moisture values can be grouped into a harvest zone (e.g., a crop quality harvest zone). In some examples, multiple of the different predictive characteristic values (e.g., predictive crop constituent values, predictive moisture values, and predictive crop quality values) can be used to identify the harvest zones, for example, crop having two or more of a certain predictive crop quality value (or within a certain range of crop quality values), a certain predictive crop constituent value (or within a certain range of crop constituent values), and a certain predictive crop moisture value (or within a certain range of crop moisture values) can be grouped into a harvest zone (e.g., a crop characteristics harvest zone). The values or ranges of values can be identified in threshold data 614, which may be input by an operator or user, stored from previous operations, or obtained in other ways, such as from postings from purchasing locations (e.g., mills). In some examples, the thresholds may separate crop that is to be transported to a purchasing location from crop that is to be transported to a storage location or separate crop that is to be transported to a first type of storage location (e.g., grain bin) from crop that is to be transported to a second type of storage location (e.g., dryer). Thus, the crop having predictive values such that they are to be transported to a purchasing location can be grouped into a harvest zone (e.g., purchasing location harvest zone) and the crop having predictive values such that they are to be transported to a storage location can be grouped into a different harvest zone (e.g., storage location harvest zone) or grouped into different types of storage location harvest zones (e.g., grain bin harvest zone and dryer harvest zone).

Additionally, harvest zone logic 654 may further identify harvest zones based on predictive yield values of the crop. For example, even crop having the same quality, crop constituent, or moisture value (or within the same range of values), may be separately zoned based on their predictive yield. Thus, crop at the worksite having the same predictive crop characteristic (or crop characteristics) may be further grouped into another harvest zone (e.g., a yield harvest zone) which may be a subzone of another zone. For example, crops in the same crop constituent harvest zone, the same crop moisture harvest zone, or the same crop quality zone may be further grouped, within that zone, into separate yield harvest zones.

It will be understood that multiple of the same type of harvest zone may be generated. For example, there may be areas of the worksite having crop groupable according to harvest zone logic 654. These areas may be spatially separate (e.g., non-contiguous). Thus, these areas may be separately zoned, such that a different zone (or multiple different zones) may be disposed between them.

Material transfer zone logic 656 illustratively identifies material transfer zones of the worksite, the boundaries of which may be determined based on the predictive values in the one or more functional predictive maps 263 or based on the harvest zones identified by harvest zone logic 654. In an example of in-tandem material transfer (where the receiving vehicle 400 travels in-tandem, such as alongside or behind, the agricultural harvester 100) the material transfer zone 656 may correspond to the same geographical boundaries of the respective harvest zone, or may be extended beyond the harvest zone to account for the distance between the receiving machine 400 and the agricultural harvester 100 during material transfer as well as to account for the machine latency that creates a delay between when crop is first encountered by the harvester to when it is available at the material transfer subsystem for transfer to another machine. This distance can, in some examples, be derived from dimensional data 606 and 610. For example, where the agricultural harvester 100 is traveling along or proximate a border of the harvest zone, it may be that the receiving machine, when operating in-tandem, has to travel in an area outside of the harvest zone. This distance can, in some examples, be derived from stored information (e.g., stored machine latency data), or derived from other variables, such as operating parameters of the machine. These material transfer zones are distinguished from one another such that a receiving machine 400 and/or an agricultural harvester can be controlled such that material from one harvest zone can remain separate from material from another harvest zone, that is, material from a second harvest zone will not be transferred to a receiving vehicle 400 having crop material (e.g., grain) from a first harvest zone. In other examples, it may be desirable to mix crop from different harvesting zones, at least in certain ratios. In such an example, distinguishing between the zones can help to identify how to control the machines to achieve a mixture of the desired ratio. In some examples, a material transfer zone stretches an area between a material transfer start location and a material transfer end location identified material transfer location identifier logic 652, as discussed in further detail below.

In other examples, it may be that no harvest zones are identified, and instead, only material transfer zones are identified, the boundaries of which are defined by the predictive values from the one or more functional predictive maps 263. For example, crop at the worksite having the same predictive crop constituent values or that are within the same range of predictive crop constituent values can be grouped into a material transfer zone (e.g., a crop constituent material transfer zone). In another example, crop at the worksite having the same predictive crop moisture values or that are within the same range of predictive crop moisture values can be grouped into a material transfer zone (e.g., a crop moisture material transfer zone). In another example, crop at the worksite having the same predictive crop quality values or that are within the same range of predictive crop moisture values can be grouped into a material transfer zone (e.g., a crop quality material transfer zone). In some examples, multiple of the different predictive characteristic values (e.g., predictive crop constituent values, predictive moisture values, and predictive crop quality values) can be used to identify the material transfer zones, for example, crop having two or more of a certain predictive crop quality value (or within a certain range of crop quality values), a certain predictive crop constituent value (or within a certain range of crop constituent values), and a certain predictive crop moisture value (or within a certain range of crop moisture values) can be grouped into a material transfer zone (e.g., a crop characteristics material transfer zone). The values or ranges of values can be identified in threshold data 614, which may be input by an operator or user, stored from previous operations, or obtained in other ways, such as from postings from purchasing locations (e.g., mills). In some examples, the thresholds may define separation of crop that is to be transported to a purchasing location from crop that is to be transported to a storage location or define separation of crop that is to be transported to a first type of storage location (e.g., grain bin) from crop that is to be transported to a second type of storage location (e.g., dryer). Thus, the crop having predictive values such that they are to be transported to a purchasing location can be grouped into a material transfer zone (e.g., purchasing location material transfer zone) and the crop having predictive values such that they are to be transported to a storage location can be grouped into a different material transfer zone (e.g., storage location material transfer zone) or grouped into different types of storage location harvest zones (e.g., grain bin material transfer zone and dryer material transfer zone).

In other examples, it may be that the harvest zones or the material transfer zones are not grouped based on similarity of values, but rather grouped based on predictive yield and predictive crop characteristics such that crop harvested and received from those zones will be of a mixture or will produce a mixture (in the case where the harvester 100 or receiving machine 400 already has some crop material on-board) that averages a desired crop characteristic level. For example, a zone could be sized according to a capacity (or remaining capacity) of a harvester 100 and the predictive yield, such that the zone ends at the location at which the harvester 100 will become full, at least to a threshold level, or that gathered crop material will have an aggregated characteristic value that satisfies a threshold level, or both. Thus, the material transfer location identifier logic 652 may identify, as an end location, a location relative to the end of the zone and, as the start location, a location relative to the start of the zone. Harvesting logistics module 315 can generate an output 668 to generate a route for a receiving machine 400 to travel to the start location and between the start location and the end location.

It will be understood that the zones can be designated with one or more given values, such as numerical values (e.g., a percentage or range of percentages), non-numerical values such as high, medium, low, wet, dry, storage (e.g., bin, dryer, etc.), purchasing (e.g., mill, ethanol plant, etc.), scaled values (e.g., 1 through 5, A through F, etc.), as well as various other values. The value of the zones can be displayed. Additionally, when displayed, the zones can be differentiated by color, pattern, or various other visual demarcation.

Zone priority logic 655 illustratively identifies and assigns priorities of the harvest zones, such that the harvest zones are harvested in order of priority. The priorities are determined based on the predictive values of the crop in the harvest zones, as well as, in some examples, threshold data 614 and other data 616 (e.g., other user or operator inputs). For example, it may be that a user or operator provides an input indicating that harvest zones having crop material to be transported to a purchasing location are to be harvested prior to harvest zones having crop material to be transported to a storage location. This may be because a purchasing facility is only open for a certain time range, whereas a storage location may be accessible as desired. In another example, harvest zones having predictive moisture values at or within a threshold range of a threshold moisture value, may be prioritized over (e.g., harvested before) harvest zones having predictive moisture values that are outside of the threshold moisture value or range of values. For instance, a purchasing location (e.g., mill) may pay a premium for crop material having a moisture values in the 12-14% range, thus, harvest zones having crop material at 12% moisture may be prioritized over harvest zones having crop material at 15% moisture. This is because, the crop may continue to dry over time, such that the crop material currently at 12% may no longer be in the premium range (after a given amount of time) whereas crop material currently at 15% may be in the premium range (after a given amount of time) or at least, their designation will not change with a short delay in their harvest order. Similarly, even for crop material in the premium range (e.g., at 14%) may be harvested after crop having a moisture value lower in the premium range (e.g., 13%). In another example, a user or operator may provide an input indicating that harvest zones having higher predictive quality values are to be prioritized over harvest zones having lower quality values. In another examples, the harvest zones can be prioritized based on other factors, which may be provided by user or operator input. For instance, it may be that a buyer is willing to pay a premium for crop material having certain values of crop constituents, but that the offer expires after a given date or after a given quantity is received (e.g., first come, first served). Thus, the user or operator may provide an input indicating that harvest zones having qualifying predictive crop constituent values are to be prioritized over harvest zones having nonqualifying predictive crop constituent values. In other examples, there may be a delivery date according to a purchase contract.

In some examples, zone priority logic 655 may further prioritize within the harvest zone. For example, as described above, the crop characteristic harvest zones may be further divided into yield harvest zones. Zone priority logic 655 may thus prioritize higher yield zones over lower yield zones within the same crop characteristic zone.

Machine assignment logic 657 illustratively assigns machines to certain designations, such as to receive crop that satisfies a threshold or to receive crop material that doesn't satisfy a threshold, or to certain zones at the worksite. For example, machine assignment logic 657 may assign an agricultural harvester 100 to only operate in specific harvest zones. In this way, the assigned agricultural harvester will not harvest (and potentially mix) crop material having distinguished predictive values, or harvest (and potentially mix) crop material that is to be transported to a purchasing location with crop material that is to be transported to a storage location or harvest (and potentially mix) crop material that is to be transported to a first type of storage location (e.g., dryer) with crop material that is to be transported to a second type of storage location (e.g., grain bin). In another example, machine assignment logic 657 may assign a receiving machine 400 to only receive crop material from specific harvest zones, or only receive crop material having specific predictive value(s). In this way, the assigned receiving machine will not have a mixture of crop material having distinguished predictive values, nor have a mixture having some crop material that is to be transported to a purchasing location with crop material that is to be transported to a storage location, nor have a mixture having some crop material that is to be transported to a first type of storage location with crop material that is to be transported to a second type of storage location. In other examples, machines may be assigned based on their dimensions (e.g., fill capacity, header width/number of row units, etc.) as well as operational parameters (e.g., bushels per unit of time that the machine can harvest) based on the predictive yield values of the harvest zones. For example, more, bigger, and/or faster machines may be assigned to zones having higher yields.

Additionally, machine assignment logic 657 may update machine assignments throughout the harvesting operation based on various factors, for example, due to breakdown of another machine, operator or user inputs, completion of one task, as well as various other factors. As an example, a machine initially assigned only to handle material to be transported to a storage facility, may be reassigned to other material once the storage facility is at capacity.

Material transfer location identifier logic 652 illustratively determines locations of material transfer locations, that is locations at which a material transfer operation is to take place. This can include identifying, as material transfer locations, locations of purchasing locations, locations of storage locations, or, when transferring from a first receiving machine 400 (e.g., a towed grain cart) to a second receiving machine 400 (e.g., a semi and semi-trailer), the location of the second receiving machine 400 (or a location proximate the second receiving machine given machine dimensions). The locations of the storage locations and the purchasing location(s) can be input by a user or operator or can be derived in other ways, such as, but not limited to, from public information (e.g., public location information of purchasing facilities). The locations of the receiving machines 400 can be derived from sensor data from geographic position sensor 403 (or in other ways). Additionally, the material transfer locations can be determined based on one or more of the machine assignments, the predictive values, the harvest zones, the material transfer zones, etc. For example, for a first receiving machine 400 (e.g., a towed grain cart), a material transfer location may be identified as the location of a second receiving machine 400 (e.g., semi and semi-trailer) because the second receiving machine is transporting material to the location (e.g., purchasing location or storage location) to which the material carried by the first receiving machine is to be delivered.

In some examples, material transfer location identifier logic 652 identifies, as material transfer locations, locations, at the end of a harvest zone (or at the end of a route within a harvest zone). For example, an agricultural harvester 100 may be controlled to stop and initiate a material transfer operation at the end of operation in one harvest zone to empty (or substantially empty) the agricultural harvester 100 prior to proceeding into another harvest zone, such as to avoid mixture of material having distinguished values (or distinguished transport locations). Additionally, one or more receiving machines 400 may be controlled to travel to and receive material from an agricultural harvester at the end of operation of the agricultural harvester in one harvest zone to empty (or substantially empty) the agricultural harvester 100 prior to the agricultural harvester 100 proceeding into another harvest zone.

In other examples, the material transfer locations may stretch across an area and include a start point (start location) and an end point (end location), such as in the case of in-tandem material transfer. For example, the end location may be based on certain criteria, such as ending prior to a pass, ending after a certain amount transferred, ending prior to the on-board grain bin of the harvester 100 receiving crop material having a different crop characteristic value (or different range of crop characteristic values), ending prior to the material transfer subsystem of the harvester 100 having access to (initiating transfer of) crop material having a different crop characteristic value (or a different range of crop characteristic values), ending prior to the crop material in the on-board grain tank having an aggregated crop characteristic value that would require different designation for the crop material, as well as various other criteria. In such a case, material transfer location identifier logic 652 identifies, as a material transfer location, a location that stretches an area between a start location and end location. The end location and start location may be identified by material transfer location identifier logic 652 based on various criteria. For instance, based on an amount to be transferred, a capacity of the receiving machine 400, a capacity (or fill level) of the agricultural harvester 100, areas of the field where material transfer is not to be performed or is preferably not to be performed, predictive values in the obtained maps (such as the predictive yield along the route of the harvester 100), as well as various other criteria. The material transfer location identifier logic 652 may first identify a start location and then identify an end location based on the start location and one or more criteria. In other examples, the material transfer location identifier logic 652 may identify an end location and then identify a start location based on the end location and one or more criteria.

In some examples, the end location is a location at which the material transfer must end such that the receiving machine 400 does not receive crop material that has undesired values (or values that do not correspond to the assignment/designation of the receiving machine 400). It will be understood that due to the machine latency, machine dimensions, travel speed, and material transfer rate, the end location may extend beyond a location of the end of zone, particularly for in-tandem material transfer. This is because, even when harvesting in a different zone, the harvester 100 may still transfer material harvested from the previous zone, at least for a given amount of time. Further, material transfer location identifier logic 652 may identify a plurality of start locations (or a material transfer start area/material transfer start location range that stretches between an earliest possible start location and a latest possible start location). For example, material transfer location identifier logic 652 may identify, as a latest possible start location, a location at which the material transfer operation must start by in order to transfer the crop material having the desired values. This identification can be based on the route or heading of the harvester, the speed of the harvester (e.g., current speed, prescribed/planned speed, etc.), the material transfer rate of the material transfer subsystem of the harvester, the predictive yield along the route, the fill level and capacity of the harvester 100, as well as other criteria. Further, material transfer location identifier logic 652 may identify, as an earliest possible start location, the earliest location at which the material transfer operation can begin. This identification can be based on the current locations of the harvester 100 and the receiving machine 400, the route or heading of the harvester 100, the speed of the harvester 100, characteristics of the field, as well as various other criteria. For example, it may be possible to start the material transfer operation at a given location, however, because the harvester will enter a turn shortly after that location, it may be determined that the earliest possible start location is after the harvester 100 finishes the turn. In another example, certain start locations may require the receiving machine 400 to travel over certain field features (e.g., waterways, highly compactable soil (e.g., wet soil), culverts, etc.) which may be undesirable, in which case it may be determined that the earliest possible start location is after these field features. In another example, certain start locations may require that the material transfer operation be conducted while the harvester travels uphill, in which case it may be determined that the earliest possible start location is after the terrain along the route of the harvester 100 flattens out. In another example, the earliest possible start location may be based the earliest location that the receiving machine 400 can arrive at given its current location, activity, and operational speed. Thus, the material transfer start location may be an area that stretches between the earliest possible start location and the latest possible start location, such that the receiving machine 400 is commanded to travel to that area, align itself relative to the harvester 100 (e.g., given lateral distance, given fore-to-aft distance, and heading in the same direction) and the harvester 100 is controlled to initiate material transfer to a receiving machine 400 in that area.

Further, in some examples, the end location for one receiving machine 400 may be the start location for another receiving machine 400. For example, certain types of harvesters continuously transfer harvested material while harvesting, such as sugar cane harvesters or forage harvesters. In such an example, a second receiving machine 400 may replace the first receiving machine 400 at the end location, such that the end location is the start location for the second receiving machine 400.

Route planning logic 658 can generate a route for a receiving machine 400 to travel to a material transfer location, a material transfer start location (or starting area) and another route (or a continuation of the previous route) for the receiving machine 400 to travel to the material transfer end location during a material transfer operation. Material transfer controller 638 can control material transfer subsystem 154 such that transfer of material to a designated receiving machine 400 begins at the start location (given confirmation of the presence and alignment of the designated receiving machine 400) and such that material is no longer being transferred (at least to the designated receiving machine 400) at the end location. It will be understood that depending on the type of harvester, the control of the material transfer subsystem 154 may differ. For example, where the harvester 100 is a combine harvester, the material transfer subsystem 154 may be activated at the start location and deactivated at the end location. With a sugar cane harvester or a forage harvester, which continuously transfer material during harvesting, the material transfer subsystem 154 may be controlled to change its position such that it stops delivering material to one receiving machine 400 and begins delivering material to a second receiving machine 400. In other examples, the position of the material transfer subsystem 154 need not be changed, instead one receiving machine 400 may be commanded to pull away while a second receiving machine 400 may be commanded to take the place of the first receiving machine 400. In some examples, even for sugar cane harvesters, the material transfer subsystem 154 may be deactivated for a short amount of time, when changing delivery from one receiving machine 400 to another receiving machine 400.

Crop characteristic tracking logic 669 illustratively tracks and generates values indicative of amounts of material that has been transported to purchasing location(s), to storage location(s), or that is within receiving machine(s) 400 awaiting transport to purchasing location(s) or storage location(s) or other receiving machine(s) 400. Material transfer tracking logic 663 can utilize agricultural harvester sensor data 604 or receiving machine sensor data 608, or both, such as geographic location data, control data (e.g., initiation and termination of material transfer operations), fill level data, as well as various other sensor data. Material transfer tracking logic 663 can also generate values indicative of remaining capacity of one or more storage location(s) based on sensor data 604 or 608 as well as storage location data 612. Crop characteristic tracking logic 669 illustratively tracks (calculates) the aggregated crop characteristic values of crop material on-board a harvester 100 or on-board a receiving machine 400, or both. For instance, instead or in addition to utilizing a predictive crop characteristic map (e.g., one or more of maps 370/480, 371/481. 372/482, 373/483 or other predictive crop characteristic maps), crop characteristic tracking logic 669 can identify an aggregated value of the crop material on-board a harvester 100 based on sensor data from sensors 208 and sensors 408. For example, crop characteristic tracking logic 669 can identify aggregated crop characteristic values of crop material on-board a harvester based on sensor data from sensors 208 (e.g., 220, 221, 222, 223, and 224). Further, crop characteristic tracking logic 669 can predict aggregated crop characteristic values of crop material that will be on-board a harvester 100 at given locations along its planned route based on sensor data from sensors 208 (e.g., indicating the crop characteristic values and amount of crop material currently on-board harvester) and based on values from predictive crop characteristic maps (e.g., one of the functional predictive crop characteristic maps or another type of predictive crop characteristic map) which indicate predictive crop characteristic values and amounts of crop material along the planned route of the harvester 100. Further, crop characteristic tracking logic 669 can identify aggregated crop characteristic values of crop material within a receiving machine 400 based on the identified aggregated crop characteristic values of crop material received by the receiving machine 400, as well as various sensor data, such as fill level data from fill sensors 424 or sensor data indicative of an amount of material transferred by a material transfer subsystem 254 or 454. For instance, crop characteristic tracking logic 669 may identify that a harvester has 300 bushels of 12% average moisture crop material. A first receiving machine 400 may receive the 300 bushels of 12% average moisture crop material from the harvester, in which case crop characteristic tracking logic 669 identifies that the first receiving machine 400 has 300 bushels of 12% average moisture crop material (if the first receiving machine 400 was empty). In other examples, if the first receiving machine 400 already had 300 bushels of 12% average moisture crop material, crop characteristic tracking logic 669 identifies that the first receiving machine 400 has 600 bushels of 12% average moisture crop material. In another example, if the first receiving machine 400 already had 300 bushels of 13% average moisture crop material, crop characteristic tracking logic 669 identifies that the first receiving machine 400 has 600 bushels of 12.5% average moisture crop material. Further, crop characteristic tracking logic 669 can identify aggregated crop characteristic values of crop material within a second receiving machine 400 that received crop material from a one or more other receiving machines based on the amount transferred to the second receiving machine 400 from the one or more other receiving machines 400 and the aggregated value of the material received from the one or more other receiving machines 400.

Material transfer amount identifier logic 653 illustratively determines amounts of material to be transferred between machines. For example, the operator or user may provide an input indicating an amount (e.g., bushels) of crop material to be delivered to a purchasing location. The amount of material already provided to a purchasing location and/or already within a receiving machine 400 that is to deliver material to the purchasing location can be identified by material transfer tracking logic 663, and based thereon the amount of material to be transferred from agricultural harvester 100 to a receiving machine 400 or from a receiving machine 400 to another receiving machine 400 can be determined. For instance, it may be that the operator or user only wishes to initially deliver 1000 bushels of soybean to a purchasing facility. Material tracking logic may indicate that 900 bushels have already been delivered and/or are within (or a portion is within) a receiving machine 400 awaiting transport. Thus, material transfer amount identifier logic 653 may determine that only 100 bushels of soybean are to be transferred from the agricultural harvester 100 to a receiving machine 400 or from a receiving machine 400 to another receiving machine 400 (or both). Thus, the material transfer subsystem(s) (e.g., 254 and/or 454) may be controlled accordingly. In other examples, it may be that the operator or user desired to fill a storage location to capacity (or near capacity) with any overage to be delivered to a purchasing facility. It may be that the storage location has a capacity of 5000 bushels. Material tracking logic 653 may determine that 4800 bushels have already been delivered and/or are within (or a portion is within) a receiving machine 400 awaiting transport. Thus, material transfer amount identifier logic 653 may determine that only 200 bushels are to be transferred from the agricultural harvester 100 to a receiving machine 400 or from a receiving machine 400 to another receiving machine 400 (or both). Thus, the material transfer subsystem(s) (e.g., 254 and/or 454) may be controlled accordingly. In another example, and as will be discussed below, mixture control logic 665 may identify a mixture of crop material having a ratio of different crop characteristic level crop material, in which case material transfer amount identifier logic 653 may identify an amount to be transferred based on the mixture of crop material identified by mixture control logic 665 and, in some examples, based further on the amounts and values of crop material already on-board one or more receiving machines or within a storage location.

Route planning logic 658 illustratively generates routes for the machines to travel along at the worksite. For example, route planning logic 658 may generate a route for an agricultural harvester 100 at the worksite based on predictive values in functional predictive map 263 and thresholds (e.g., threshold crop characteristic levels), based on harvest zones generated by harvest zone logic 654, based on zone priorities generated by zone priority logic 655, based on mixtures identified by mixture control logic 665, and based on machine assignments generated by machine assignment logic 657. For instance, route planning logic 658 may generate a route for an agricultural harvester 100 to travel through harvest zones according to priority. In another example, route planning logic 658 may generate a route for an agricultural harvester to harvest a mixture of crop to obtain a target crop characteristic level (e.g., harvest within multiple zones to obtain a desired mixture of crop). In other examples, route planning logic 658 may generate a route for the agricultural harvester 100 to travel a specific way within a field based on the crop characteristic zones (and other data, such as mixtures, priorities, etc.) or to travel a specific way within a crop characteristic zone based on the sub-yield zones therein (e.g., travel through and harvest high yield zones first). Additionally, route planning logic 658 may generate a route for a receiving machine 400 such as a route to a material transfer location (or between material transfer locations) as well as route to travel along in a harvest zone or a material transfer zone, such as when performing in-tandem material transfer. Additionally, route planning logic 658 may generate a route for a receiving machine 400 such that receiving machine 400 will travel to a certain delivery location or to a certain harvester 100 or material transfer location in order to deliver or obtain crop material having a desirable crop characteristic level.

Mixture control logic 665 identifies target crop material mixtures based on the values at the field (e.g., one or more of crop constituent values, crop moisture values, crop quality values, and yield values), which may be provided by one or more maps (e.g., one or more functional predictive maps 263 and information maps 358) or may be provided by sensor data from in-situ sensors (e.g., 208 and/or 408), as well as target crop characteristic thresholds as provided by threshold data 614. Mixture control logic 665 then generates mixture control outputs, as logistics outputs 668, for controlling one or more agricultural harvesters 100 or one or more receiving machines 400, or both, to obtain crop material mixtures based on the target crop material mixtures.

A mixture (crop material mixture or mixture of crop materials) refers to a blend (or ratioed blend) of crop material that is distinguishable based on a crop characteristic value or a location at the field from which it is derived, or both. For example, a mixture could refer to a ratio (e.g., amount) of a crop material A (e.g., 24% average starch crop) and a crop material B (e.g., 19% average starch crop). Crop material A and crop material B can be mixed/blended at a ratio of 3 parts A and 2 parts B to generate a crop material mixture having a desired or target crop characteristic level (e.g., 22% starch), for instance, 600 bushels crop material A and 400 bushels crop material B to have a receiving machine 400 load of 1000 bushels with an aggregated target crop characteristic value (e.g., 22% starch). In some examples, crop A and crop B may be separated from each other on the field such that a harvester will have to harvest from two different areas (e.g., may not be in the harvest pass, may be separated by multiple passes). In other examples, they may be within the same pass or within contiguous passes, but the machine may be controlled to start or stop harvesting to achieve the desired ratio. In other examples, a crop material A and a crop material B may have the same crop characteristic value (e.g., average 22% starch) but are from different areas of the field. For instance, crop material A is from area 1 (e.g., a first zone) and crop material B is from area 2 (e.g., a second zone). A desired amount of crop material may be 500 bushels. Area 1 may only have 300 bushels and area 2 may have 1000 bushels. In such an example, the harvester could be controlled to first harvest the 300 bushels of crop material A from area 1 and then to harvest 200 bushels of crop material B from area 2 to achieve a desired 500-bushel mixture of crop material A and crop material B that averages 22% starch. These are merely some examples. In some cases, the different component crop material groups of the mixture may have both different values and be from different distinguished areas (e.g., not part of the same pass or a contiguous set of passes). In yet other examples, multiple harvesters 100 may be at the field and each harvester can be controlled to harvest a different component crop material (e.g., part A or part B) and a receiving machine 400 can be controlled to receive a certain amount of each from each harvester 100 or separate receiving machines 400 can each be controlled to receive material only from a specific harvester and then to each deliver to a common delivery location (e.g., another receiving machine 400, a common storage location, etc.). Further, while the above examples only describe 2 component crop materials (crop material A and crop material B) in other examples, the identified mixture may be a mixture of 3 or more component crop materials.

As described above, in some examples, it may be necessary to mix or blend crop having different values (e.g., different crop constituent values, different crop moisture values, and/or different crop quality values) to achieve target crop characteristic values. A simplified example will now be described for illustrative purposes. In one example, it may be that there is a crop moisture target of 12%. The field (e.g., 40 acres) may have a yield of 10000 bushels (e.g., as indicated by yield map 336 or another source) of crop (e.g., corn). There may be 5000 bushels of crop with a moisture of 14% and 5000 bushels of crop with a moisture of 10% (e.g., as indicated by functional predictive crop moisture map 371 or another source). Thus, to achieve a target of 12% moisture, mixture control logic 665 can identify a crop mixture of equal parts of 10% moisture crop and 14% moisture crop. It will be understood that in other examples, other crop characteristics (e.g., crop constituents, crop quality, etc.) can be mixed. It will also be understood that in other examples, there may be more than two different crop characteristic levels (e.g., crop moisture levels, crop constituent levels, crop quality levels, etc.), such as 3 or more crop characteristic levels (e.g., 10% moisture, 14% moisture, and 16% moisture). Additionally, it will be understood that in other examples, the mixture may require unequal parts of different crop characteristic levels (e.g., four parts 10% moisture, two parts 14% moisture and one part 16% moisture for an average of 12% moisture). Additionally, the crop characteristic values may be a mixture of whole and decimal numbers, for instance, 10% moisture, 12.66% moisture, and 14% moisture, requiring a mixture of two parts 10% moisture, one part 14% moisture, and 3 parts 12.66% moisture to average 12% moisture. Thus, mixture control logic 665 can generate control outputs to achieve desired mixtures. For instance, there may be two agricultural harvesters 100 operating at the field. Each harvester may be harvesting in a separate harvest zone, such as one harvester harvesting 14% moisture crop and another harvester harvesting 10% moisture crop. A receiving machine 400, such as a truck and trailer, that is to deliver crop to a purchasing facility or a storage facility may have a capacity of 1000 bushels. Mixture control logic 665 can generate control outputs that control one or more receiving machines 400 (e.g., tractor and grain cart) to deliver desired mixtures to the truck and trailer. For instance, mixture control logic 665 can generate control outputs to control a first tractor and grain cart to travel to and receive crop from the harvester harvesting 10% moisture crop and a second tractor and grain cart to receive crop from the harvester harvesting 14% moisture crop.

If the two receiving machines 400 both have a capacity of 500 bushels, then mixture control logic 665 may generate control outputs such that each machine is be filled to its capacity and delivers to the truck and trailer. Thus, the truck will receive 1000 bushels, with equal parts of 10% crop moisture and 14% crop moisture. Thus, the 1000-bushel mixture will average 12% moisture.

If the two receiving machines 400 have different capacities, mixture control logic 665 may provide a control output such that the receiving machine with the larger capacity (e.g., 500 bushels) is only filled to the level to match the capacity of the other receiving machine (e.g., 400 bushels), such that equal parts are delivered (e.g., 400 bushels of each different crop moisture level). Alternatively, mixture control logic 665 may provide a control output such that both receiving machines 400 are filled to capacity and deliver their loads to the truck and trailer, thus having a mixture of 500 bushels of a first crop moisture and 400 bushels of a second crop moisture. Mixture control logic 665 may then generate a control output to control one of the receiving machines 400 to receive only an additional 100 bushels of the crop having the second crop moisture level and to deliver that 100 bushels to the truck and trailer or to control one of the receiving machines 400 to fill to capacity but only deliver 100 bushels to the truck and trailer, and deliver the rest of its load to another machine (e.g., a different truck and trailer).

Similarly, where only a single receiving machine 400 (e.g., grain cart and tractor) is used, mixture control logic 665 can generate control outputs to control the single receiving machine 400 to achieve desired mixtures, such as by controlling the harvest zone from which the receiving machine 400 receives crop, the amounts of crop that the receiving machine 400 receives, and/or the amount of crop that the receiving machine 400 delivers to another receiving machine 400. Keeping with the above example, mixture control logic can generate a control output to control a single receiving machine 400 to receive and deliver 500 bushels of 14% crop moisture and 500 bushels of 10% crop moisture. These separate 500 bushels may be received and delivered separately, or the receiving machine 400 may controlled to receive a mixture of 14% crop moisture and 10% crop moisture.

Mixture control logic 665 can also control one or more agricultural harvesters 100 to achieve desired mixtures of crop. For instance, mixture control logic 665 may generate a control output to control an agricultural harvester 100 to transfer crop to a receiving machine 400, including transferring only a given amount of crop to a receiving machine 400. In other examples, mixture control logic 665 may generate a control output to control an agricultural harvester to only harvest within one harvest zone (e.g., a 14% moisture harvest zone). In some example, agricultural harvester 100 may be controlled to harvest from multiple harvest zones. For instance, the agricultural harvester 100 may have a grain tank capacity of 300 bushels. Keeping with the above examples, mixture control logic 665 may control the agricultural harvester to harvest given amounts of crop from each different zone, such as equal parts from each different zone (e.g., 150 bushels of 10% moisture crop and 150 bushels of 14% moisture crop). In other examples, it may be that agricultural harvester 100 harvested unequal parts of crop from different zones (e.g., 200 bushels of 10% moisture crop and 100 bushels of 14% crop). Mixture control logic 665 may then generate a control output to control the agricultural harvester 100 to harvest, with its subsequent load, oppositely unequal parts of crop from different zones (e.g., 100 bushels of 10% moisture and 200 bushels of 14% crop). In some examples, it may be that the agricultural harvester 100 finished a 10% moisture zone with 150 bushels of 10% moisture crop and is set to begin harvesting 14% moisture crop. In such a scenario, mixture control logic 665 can generate a control output to control agricultural harvester 100 to harvest only 150 bushels of 14% moisture crop and transfer its load to a receiving machine 400 prior to proceeding.

In some scenarios, a receiving machine 400, such as a truck and trailer, may be delivering crop to a storage facility, such as a grain bin. The grain bin may have a capacity of 5000 bushels. Keeping with the above examples, mixture control logic 665 may generate control outputs to control the truck and trailer receiving machine 400 to deliver equal parts of 10% moisture crop (e.g., 2500 bushels) and 14% moisture crop (e.g., 2500 bushels) to the grain bin. The truck and trailer receiving machine 400 may have a capacity of 1000 bushels, thus requiring five loads to fill the grain bin. Each separate load may have the same ratio (e.g., each load may have 500 bushels of 10% moisture crop and 500 bushels of 14% moisture crop) or may have different ratios (e.g., one load has 1000 bushels of 10% moisture crop, one load has 1000 bushels of 14% moisture crop, one load has 500 bushels of 10% moisture crop and 500 bushels of 14% moisture crop, one load has 700 bushels of 10% moisture crop and 300 bushels of 14% moisture crop, and one load has 300 bushels of 10% moisture crop and 700 bushels of 14% moisture crop).

While the different types of controls are discussed separately, it will be understood that mixture control logic 665 can control both one or more receiving machines 400 and one or more agricultural harvesters 100. For instance, mixture control logic 665 may generate a mixture control output to control a particular receiving machine 400 to travel to and receive crop from a particular agricultural harvester 100 and also generate a control output to control the particular agricultural harvester 100 to deliver material to the receiving machine 400, including only delivering a given amount of material.

While crop moisture is discussed in the previous examples, it will be understood that mixture control logic 665 can also generate control outputs to achieve desired mixtures of crop constituents and crop quality.

It will be understood that the mixture control outputs generated by mixture control logic 665 can be provided to control system 214 or control system 414, or both, as logistics outputs 668, to control respective controllable subsystems of an agricultural harvester 100 or a receiving machine 400, or both. Additionally, the outputs generated by mixture control logic 665 may be provided to other items of harvesting logistics module, for instance, route planning logic 658 may generate route for agricultural harvester 100 or a route for a receiving machine 400, or both, based on the outputs of mixture control logic. In another example, machine assignment logic 657 may assign an agricultural harvester 100 or a receiving machine 400, or both, to a harvest zone, based on the outputs of mixture control logic 665. Additionally, mixture control logic 665 may utilize outputs of other items of harvesting logistics module 315 in generating mixture control outputs such as harvest zones generated by harvest zone logic 654, material transfer zones generated by material transfer zone logic 656, machine assignments generated by machine assignment logic 657, material transfer amounts identified by material transfer amount identifier logic 653, tracked material transfer amounts generated by material transfer tracking logic 663, routes generated by route planning logic 658, as well as various other outputs.

In yet other examples, it may be that zones, such as harvest zones or material transfer zones are not identified or need not be identified. Rather, it may be that one or more harvesters 100 operate at the field in a manner based on other criteria. The value of the crop characteristic of the crop material (e.g., moisture, constituent, quality, etc.) in a harvester 100 (or to be in a harvester 100) can be identified by mixture control logic 665 based on an aggregation of mapped values along the route of the harvester 100 or based on an aggregation of detected crop characteristic values of the crop already harvested, or both.

In such a scenario, harvesting logistics module 315 can generate outputs 668 to control harvester(s) 100 or receiving machine(s) 400, or both. As an illustrative example, there may be a crop constituent target level (e.g., 22% starch). A first harvester 100 may be harvesting crop and may currently have an average of 24% starch on-board (as identified by crop characteristic tracking logic 669). A second harvester 100 may currently have an average of 19% starch on-board (as identified by mixture control logic 665). In a simplified example, harvesting logistics module 315 could control or generate a route for a first receiving machine 400 to travel to the first harvester 100 and control the first harvester 100 to transfer 300 bushels of 24% starch crop material to the first receiving machine 400 and could control or generate a route for a second receiving machine 400 to travel to the second harvester 100 and control the second harvester 100 to transfer 200 bushels of 19% starch crop material to the second receiving machine 400. In this way, when the first and second receiving machines 400 deliver their respective loads to the delivery location (e.g., semi-trailer, storage location, etc.), the resultant mixture of 500 bushels will average the target crop constituent level of 22%. In another example, harvesting logistics module 315 could control a single receiving machine 400 to travel to the first harvester and receive a given amount of material and then travel to the second harvester to receive a given amount of material.

Segregation control logic 667 generates crop material segregation control outputs, as logistics outputs 668, to control one or more receiving machines 400 or one or more harvesters 100, or both, to keep crop material segregated based on the values at the field (e.g., one or more of crop constituent values, crop moisture values, crop quality values, and yield values), which may be provided by one or more maps (e.g., one or more of functional predictive maps 263 and information maps 358) or may be provided by sensor data from in-situ sensors (e.g., 208 and/or 408), as well as target crop characteristic threshold as provided by threshold data.

As previously discussed, it may be desirable to keep crop material separated based on crop characteristic values and crop characteristic thresholds. For example, there may be a threshold of X % (e.g., 15%) moisture. Crop material at or greater than X % moisture ("wet" crop) may be segregated from crop below X % ("dry" crop) moisture. For example, it may be that wet crop is to be sent to a dryer, whereas dry crop is to be sent to a purchasing facility or to a storage location such as a grain bin. Segregation control logic 667 can generate segregation control outputs to keep crop material segregated.

For example, segregation control logic 667 can generate segregation control outputs to control a route of each of one or more harvesters 100 such that each harvester 100 only harvests crop material of a given value of range of values or within a given zone. Segregation control logic 667 can generate segregation control outputs to control a route of each of one or more receiving machines 400 such that each receiving machine 400 only receives crop material of a given value or range of values or from a given harvester 100 or given zone. Further, segregation control logic 667 can generate segregation control outputs to control a route of each one of one or more receiving machines 400 such that each receiving machine 400 only delivers crop material to material delivery locations (e.g., storage locations, purchasing facilities, other receiving machines 400) that are designated (e.g., assigned) to receive crop material to which the receiving machine 400 is assigned.

For example, one or more receiving machines 400, may be designated (e.g., assigned) to a particular type of zone (e.g., constituent zone, moisture zone, quality zone, etc.) or to a particular value or range of values. For example, there may be a truck and trailer receiving machine 400 designated to receive a crop material of a given value or range of values (e.g., "dry" crop, high constituent, such as high starch or high protein, crop, or high quality crop) and a tractor and grain cart receiving machine 400 designated to receive a crop material of a given value or range of values (e.g., "dry" crop, high constituent, such as high starch or high protein, crop, or high quality crop). Segregation control logic 667 can generate segregation control outputs to control routes of the "wet/high constituent/high quality" crop material tractor and grain cart receiving machine 400 such that it only receives crop material from harvesters that have "dry/high constituent/high quality" crop material and only delivers to the designated "dry/high constituent/high quality" material delivery location (e.g., "dry/high constituent/high quality" crop material truck and trailer receiving machine 400). Further, segregation control logic 667 can generate segregation control outputs to control the material transfer subsystem 454 of the tractor and grain cart receiving machine 400 to transfer crop to the designated delivery location (e.g., "dry/high constituent/high quality" crop material truck and trailer receiving machine 400). Similarly, segregation control logic 667 can generate segregation control outputs to control routes of the "dry/high constituent/high quality" crop material truck and trailer receiving machine 400 and the transfer subsystem 454 of the "dry/high constituent/high quality" crop material truck and trailer receiving machine 400 such that it only delivers crop material to the designated delivery location (e.g., purchasing facility, or other material delivery location, such as a storage location).

In another example, there may be a truck and trailer receiving machine 400 designated to receive a crop material of a given value or range of values (e.g., "wet" crop, low constituent, such as low starch or low protein, crop, or low quality crop) and a tractor and grain cart receiving machine 400 designated to receive a crop material of a given value or range of values (e.g., "wet" crop, low constituent, such as low starch or low protein, crop, or low quality crop). Segregation control logic 667 can generate segregation control outputs to control routes of the "wet/high constituent/high quality" crop material tractor grain cart receiving machine 400 such that it only receives crop material from harvesters that have "wet/low constituent/low quality" crop material and only delivers to the designated "wet/low constituent/low quality" material delivery location (e.g., "wet/low constituent/low quality" crop material truck and trailer receiving machine 400). Further, segregation control logic 667 can generate segregation control outputs to control the material transfer subsystem 454 of the tractor and grain cart receiving machine 400 to transfer crop to the designated delivery location (e.g., "wet/low constituent/low quality" crop material truck and trailer receiving machine 400). Similarly, segregation control logic 667 can generate segregation control outputs to control routes of the "wet/low constituent/low quality" crop material truck and trailer receiving machine 400 and the transfer subsystem 454 of the "wet/low constituent/low quality" crop material truck and trailer receiving machine 400 such that it only delivers crop material to the designated delivery location (e.g., dryer, or other material delivery location, such as a storage location).

It will be understood that an agricultural harvesting operation can have one or more harvesters 100, one or more receiving machines 400, including one or more of different types of receiving machines 400 (e.g., one or more tractor and grain carts and one or more semi-trucks and semi-trailers).

Map generator 660 illustratively generates one or more harvesting logistics maps 661. Harvesting logistics maps 661 illustratively map the operational area (which may include one or more of one or more worksites [fields], roads, storage locations, and purchasing locations) in which the harvesting operation is being performed. Harvesting logistics maps 661 may include a variety of display elements (discussed below) and can be used in the control of an agricultural harvester 100 or receiving machine 400, or both. In some examples, map generator 660 may generate separate harvesting logistics maps 661 (having different display elements) for each different machine.

Display element integration component 659 illustratively generates one or more display elements, such as material transfer location display elements, material transfer amount display elements, harvest zone display elements, material transfer zone display elements, zone priority display elements, machine assignment display elements, route display elements, receiving machine display elements, agricultural harvester display elements, thresholds (e.g., target crop characteristic levels, etc.) target mixtures, as well as various other display elements. Display element integration component 659 can integrate the one or more display elements into one or more maps, such as one or more of functional predictive maps 263 to generate a harvesting logistics map 661 that includes one or more of the display elements as well as the values of the functional predictive map. In other examples, map generator 660 can generate a separate harvesting logistics map 661 into which the display elements may be integrated.

It will be noted that at the one or more functional predictive maps 263 are updated or otherwise made new (as described above in FIG. 5), the logistics outputs 668 generated by harvesting logistics module 315 can also be updated or otherwise made new according to the updated (or new) functional predictive maps 263. For example, harvesting logistics module 315 may, based on the updated or new functional predictive maps 263, may generate updated (or new) material transfer locations, material transfer amounts, harvest zones, material transfer zones, zone priorities, machine assignments, routes, target mixtures, machine assignments, display elements, harvesting logistics map(s), as well as various other data.

One or more of the material transfer location(s) identified by material transfer location identifier logic 652, the material transfer amount(s) identified by material transfer amount identifier logic 653, the harvest zone(s) identified by harvest zone logic 654, the material transfer zone(s) identified by material transfer zone identifier logic 656, the zone priority(ies) identified by zone priority logic 655, machine assignment(s) identified by machine assignment logic 657, route(s) identified by route planning logic 658, crop characteristic tracking outputs (e.g., values) generated by crop characteristic tracking logic 669, target mixtures generated by mixture control logic 665, mixture control outputs generated by mixture control logic 665, segregation control outputs generated by segregation control logic 667, as well as maps with integrated display elements, such as one or more functional predictive maps 263 with display elements generated by display element integration component 659 and/or one or more harvesting logistics maps 661 with display elements generated by display element integration component 659, can be provided as logistics outputs 668.

The logistic outputs 668 can be provided to control system 214 to control agricultural harvester 100. As illustrated in FIG. 6, controllers 235 of control system 214 include propulsion controller 630, route controller 632, communication system controller 634, interface controller 636, material transfer controller 638, and can include various other controllers 639.

Propulsion controller 630 generates control signals to control propulsion subsystem 250, such as to control the acceleration, deceleration, or travel speed of agricultural harvester 100. For example, propulsion controller 630 may control propulsion subsystem 250 to stop agricultural harvester 100 at material transfer location(s) identified by material transfer location identifier logic 652 (which may be indicated in a map). In another example, propulsion controller 630 may control propulsion subsystem 250 to start propelling the agricultural harvester 100 after a material transfer operation has been completed.

Route controller 632 generates control signals to control steering subsystem 252, such as to control the heading of agricultural harvester 100 according to a route, such as a route generated by route planning logic 658 (which may be indicated in a map).

Communication system controller 634 controls communication system 206 to send or obtain information, or both.

Interface controller 636 generates control signals to control operator interface mechanism(s) 218 such as to provide displays, alerts, notifications, recommendations, or various other indications. For example, interface controller 636 may generate control signals to generate displays of maps, such as the display of one or more functional predictive maps 263 (with or without integrated display elements generated by component 659) or harvesting logistics maps 661. In another example, interface controller 636 may generate control signals to generate displays or other indications (e.g., visual or audible alerts, notifications, recommendations, etc.) to stop the agricultural harvester 100, to propel the agricultural harvester 100, to initiate or terminate a material transfer operation, as well as various other indications.

Material transfer controller 638 generates control signals to control material transfer subsystem 254 such as to initiate or end a material transfer operation, to control the flow rate of material through the chute 134 and spout 136 such as by controlling the operational speed of the auger or blower 133, as well as to control the position (e.g., rotational position) of material transfer subsystem 254.

The logistic outputs 668 can be provided to control system 414 to control a receiving machine 400. As illustrated in FIG. 6, controllers 435 of control system 414 include propulsion controller 670, route controller 672, communication system controller 674, interface controller 676, material transfer controller 678, and can include various other controllers 639.

Propulsion controller 670 generates control signals to control propulsion subsystem 250, such as to control the acceleration, deceleration, or travel speed of receiving machine 400. For example, propulsion controller 670 may control propulsion subsystem 450 to stop receiving machine 400 at material transfer location(s) identified by material transfer location identifier logic 652 (which may be indicated in a map). In another example, propulsion controller 670 may control propulsion subsystem 450 to start propelling the receiving machine 400 after a material transfer operation has been completed.

Route controller 672 generates control signals to control steering subsystem 452, such as to control the heading of receiving machine 400 according to a route, such as a route generated by route planning logic 658 (which may be indicated in a map).

Communication system controller 674 controls communication system 406 to send or obtain information, or both.

Interface controller 676 generates control signals to control operator interface mechanism(s) 418 such as to provide displays, alerts, notifications, recommendations, or various other indications. For example, interface controller 676 may generate control signals to generate displays of maps, such as the display of one or more functional predictive maps 263 (with or without integrated display elements generated by component 659) or harvesting logistics maps 661. In another example, interface controller 676 may generate control signals to generate displays or other indications (e.g., visual or audible alerts, notifications, recommendations, etc.) to stop the receiving machine 400, to propel the receiving machine 400, to initiate or terminate a material transfer operation, as well as various other indications.

Material transfer controller 678 generates control signals to control material transfer subsystem 454 such as to initiate or end a material transfer operation, to control the flow rate of material through the chute 171 and spout 173 such as by controlling the operational speed of the auger or blower, to control the position (e.g., rotational position) of material transfer subsystem 454, or to actuate (e.g., open or close) door 191.

Figure 7A:
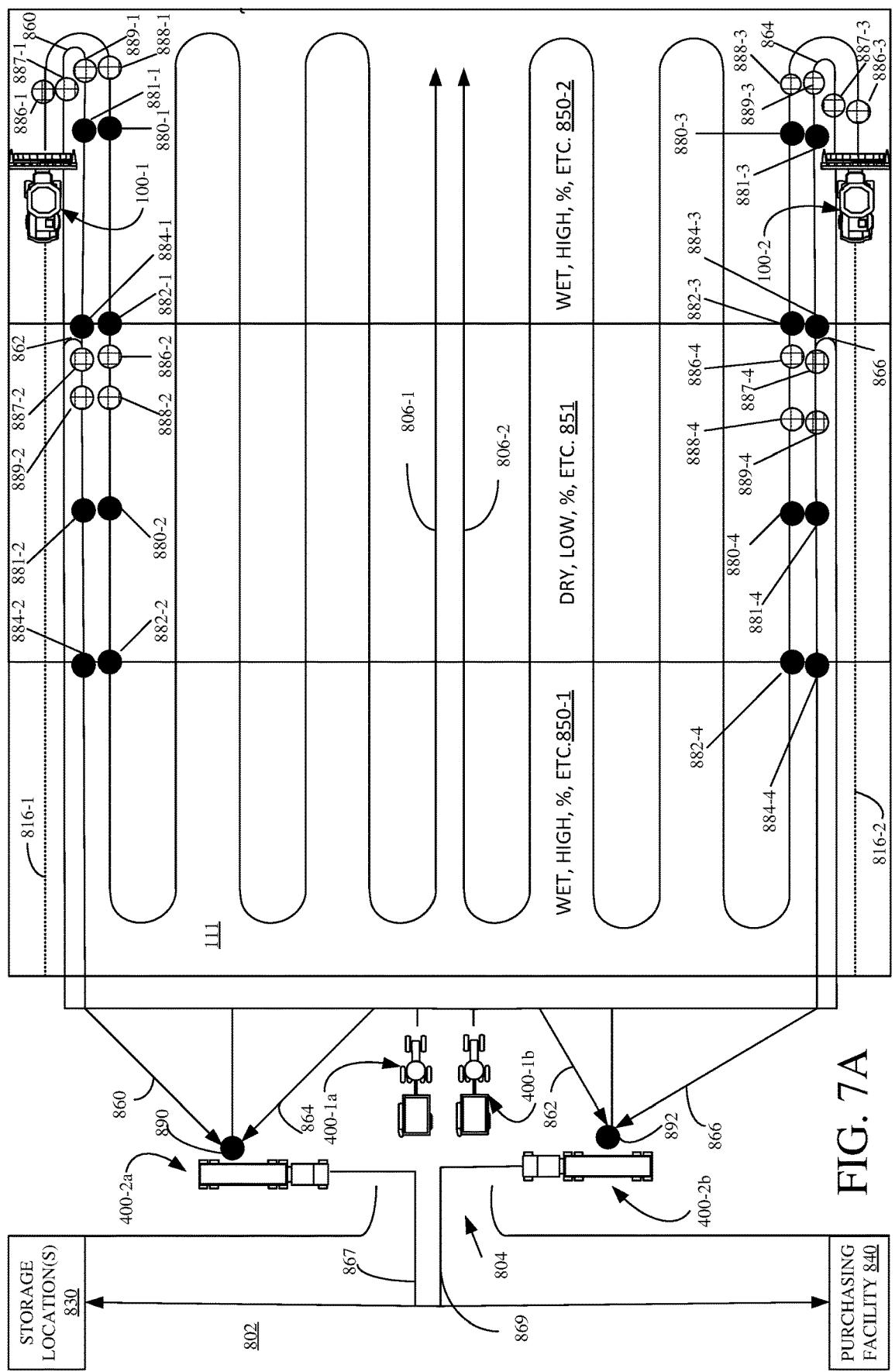
FIG. 7A is a pictorial illustration showing one example operation of harvesting logistics module in controlling a harvesting operation.

FIG. 7A is a pictorial illustration showing one example of harvesting logistics module 315 in controlling a harvesting operation. As shown in FIG. 7A, harvesting logistics module 315 is controlling the operation to segregate crop material. As illustrated, a first harvester 100-1 and a second harvester 100-2 are operating at a field 111 which is proximate to a road 802. Access to the field 111 from the road 802 is proved by entrance 804, Additionally, as shown in FIG. 7A, a plurality of receiving machines 400 are also present, such as receiving machines 400-1a and 400-1b (illustratively shown as tractor and grain cart type receiving machines) and receiving machine 400-2a and 400-2b (illustratively shown as semi-truck and semi-trailer type receiving machines).

Agricultural harvester 100-1 will travel along route 806-1 while agricultural harvester 100-2 will travel along route 806-2. The dotted portions 816-1 and 816-2 illustratively show the already travelled path of harvester 100-1 and harvester 100-2, respectively.

Also, as illustrated, harvesting logistics module 315 has identified a plurality of zones at the field 111, two zones 850 (shown as 850-1 and 850-2) and a zone 851.

Harvesting logistics module 315 has identified a harvester material transfer start area (or material transfer start location range) corresponding to zone 850-2 and harvester 100-1 stretching between an earliest possible start location 888-1 and a latest start location 880-1 along the route 806-1 of harvester 100-1. Harvesting logistics module 315 has further identified a receiving machine material transfer start location range corresponding to zone 850-2 stretching between an earliest possible start location 889-1 and a latest start location 881-1. As can be seen, the receiving machine start locations 889-1 and 881-1 correspond to the harvester start locations 888-1 and 880-1 but are offset by a given lateral distance and a given fore-to-aft distance based on machine dimensions and fill strategy (e.g., front-to-back, back-to-front, etc.). Further, harvesting logistics module 315 has identified a harvester material transfer end location 882-1 corresponding to zone 850-2 and a corresponding receiving machine material transfer end location 884-1, which, like the receiving machine starting locations, is offset by a given lateral distance and a given fore-to-aft distance. In the illustrated example, receiving machine 400-1a is designated (or assigned) to receive crop material from zones 850 (or to receive crop material having values like the crop in zones 850). Harvesting logistics module 315 may designate (assign) machine 400-1a or the designation (assignment) may be received from other sources (e.g., operator or user) and identified by harvesting logistics module 315. Harvesting logistics module 315 has further generated a receiving machine route 860 which guides receiving machine 400-1a to the receiving machine starting area to the receiving machine end location 884-1 and to the receiving machine 400-2a which has been designated to receive crop material from zones 850 (or to receive crop material having values like the crop in zones 850). Harvesting logistics module 315 may control receiving machine 400-1*a* to travel along route 860, to align with harvester 100-1 in the material transfer zone (stretching between the starting area and the end location) according to machine dimensions, fill strategy, and to control the speed of receiving machine 400-1*a* along route 860, for example, matching the speed of the harvester 100-1 during material transfer. Additionally, harvesting logistics module 315 may control (e.g., activate) the material transfer subsystem 254 of the harvester 100-1 based on the start location and confirmation of receiving machine presence and alignment (which can be derived from geographic position information of the receiving machine 400 and or sensors on the harvester 100-1 or receiving machine 400-1*a* which detect the distance and alignment between the harvester 100-1 and the receiving machine 400-1*a*). Additionally, harvesting logistics module 315 may control (e.g., deactivate) the material transfer subsystem 254 of the harvester 100-1 based on the end location and the geographic location of the harvester 100-1. Further, harvesting logistics module 315 may control receiving machine 400-1*a*, after the material transfer operation with harvester 100-1 is complete, to travel along route 860 to material transfer location 890 which is identified by harvesting logistics module 315 based on the location of the designated receiving machine 400-2*a*. When receiving machine 400-1*a* is at location 890, harvesting logistics module 315 may then control receiving machine 400-1*a* to transfer the crop material it obtained from harvester 100-1 to receiving machine 400-2*a*.

As illustrated in FIG. 7A, harvesting logistics module 315 may identify a potential earliest harvest start location 886-1 and a potential earliest receiving machine start location 887-1, however, as harvester 100-1 is approaching a turn, these potential start locations are less preferable.

Harvesting logistics module 315 has identified a harvester material transfer start location range corresponding to zone 850-2 and harvester 100-2 stretching between an earliest possible start location 888-3 and a latest start location 880-3 along the route 806-2 of harvester 100-2. Harvesting logistics module 315 has further identified a receiving machine material transfer start location range corresponding to zone 850-2 stretching between an earliest possible start location 889-3 and a latest start location 881-3. As can be seen, the receiving machine start locations 889-3 and 881-3 correspond to the harvester start locations 888-3 and 880-3 but are offset by a given lateral distance and a given fore-to-aft distance based on machine dimensions and fill strategy (e.g., front-to-back, back-to-front, etc.). Further, harvesting logistics module 315 has identified a harvester material transfer end location 882-3 corresponding to zone 850-2 and harvester 100-2 and a corresponding receiving machine material transfer end location 884-3, which, like the receiving machine starting locations, is offset by a given lateral distance and a given fore-to-aft distance. In the illustrated example, receiving machine 400-1*a* is designated (or assigned) to receive crop material from zones 850 (or to receive crop material having values like the crop in zones 850). Harvesting logistics module 315 may designate (assign) machine 400-1*a* or the designation (assignment) may be received from other sources (e.g., operator or user) and identified by harvesting logistics module 315. Harvesting logistics module 315 has further generated a receiving machine route 864 which guides receiving machine 400-1*a* to the receiving machine starting area to the receiving machine end location 884-3 and to the receiving machine 400-2*a* which has been designated to receive crop material from zones 850 (or to receive crop material having values like the crop in zones 850). Harvesting logistics module 315 may control receiving machine 400-1*a* to travel along route 864, to align with harvester 100-2 in the material transfer zone (stretching between the starting area and the end location) according to machine dimensions and fill strategy, and to control the speed of receiving machine 400-1*a* along route 864 for example, matching the speed of the harvester 100-2 during material transfer. Additionally, harvesting logistics module 315 may control (e.g., activate) the material transfer subsystem 254 of the harvester 100-2 based on the start location and confirmation of receiving machine presence and alignment (which can be derived from geographic position information of the receiving machine 400-1*a* and or sensors on the harvester 100-2 or receiving machine 400-1*a* which detect the distance and alignment between the harvester 100-2 and the receiving machine 400-1*a*). Additionally, harvesting logistics module 315 may control (e.g., deactivate) the material transfer subsystem 254 of the harvester 100-2 based on the end location and the geographic location of the harvester 100-2. Further, harvesting logistics module 315 may control receiving machine 400-1*a*, after the material transfer operation with harvester 100-2 is complete, to travel along route 864 to material transfer location 890 which is identified by harvesting logistics module 315 based on the location of the designated receiving machine 400-2*a*. When receiving machine 400-1*a* is at location 890, harvesting logistics module 315 may then control receiving machine 400-1*a* to transfer the crop material it obtained from harvester 100-2 to receiving machine 400-2*a*.

As illustrated in FIG. 7A, harvesting logistics module 315 may identify a potential earliest harvest start location 886-3 and a potential earliest receiving machine start location 887-3, however, as harvester 100-2 is approaching a turn, these potential start locations are less preferable.

Harvesting logistics module 315 has identified a harvester material transfer start location range corresponding to zone 851 and harvester 100-1 stretching between an earliest possible start location 888-2 and a latest start location 880-2 along the route 806-1 of harvester 100-1. Harvesting logistics module 315 has further identified a receiving machine material transfer start location range corresponding to zone 851 stretching between an earliest possible start location 889-2 and a latest start location 881-2. As can be seen, the receiving machine start locations 889-2 and 881-2 correspond to the harvester start locations 888-2 and 880-2 but are offset by a given lateral distance and a given fore-to-aft distance based on machine dimensions and fill strategy (e.g., front-to-back, back-to-front, etc.). Further, harvesting logistics module 315 has identified a harvester material transfer end location 882-2 corresponding to zone 851 and a corresponding receiving machine material transfer end location 884-2, which, like the receiving machine starting locations, is offset by a given lateral distance and a given fore-to-aft distance. In the illustrated example, receiving machine 400-1*b* is designated (or assigned) to receive crop material from zones 851 (or to receive crop material having values like the crop in zones 851). Harvesting logistics module 315 may designate (assign) machine 400-1*b* or the designation (assignment) may be received from other sources (e.g., operator or user) and identified by harvesting logistics module 315. Harvesting logistics module 315 has further generated a receiving machine route 862 which guides receiving machine 400-1*b* to the receiving machine starting area to the receiving machine end location 884-2 and to the receiving machine 400-2*b* which has been designated to receive crop material from zone 851 (or to receive crop material having values like the crop in zones 851). Harvesting logistics module 315 may control receiving machine 400-1*b* to travel along route 862, to align with harvester 100-1 in the material transfer zone (stretching between the starting area and the end location) according to machine dimensions, fill strategy, and to control the speed of receiving machine 400-1*b* along route 862, for example, matching the speed of the harvester 100-1 during material transfer. Additionally, harvesting logistics module 315 may control (e.g., activate) the material transfer subsystem 254 of the harvester 100-1 based on the start location and confirmation of receiving machine presence and alignment (which can be derived from geographic position information of the receiving machine 400-1*b* and or sensors on the harvester 100-1 or receiving machine 400-1*b* which detect the distance and alignment between the harvester 100-1 and the receiving machine 400-1*b*). Additionally, harvesting logistics module 315 may control (e.g., deactivate) the material transfer subsystem 254 of the harvester 100-1 based on the end location and the geographic location of the harvester 100-1. Further, harvesting logistics module may control receiving machine 400-1*b*, after the material transfer operation with harvester 100-1 is complete, to travel along route 862 to material transfer location 892 which is identified by harvesting logistics module 315 based on the location of the designated receiving machine 400-2*b*. When receiving machine 400-1*b* is at location 892, harvesting logistics module 315 may then control receiving machine 400-1*b* to transfer the crop material it obtained from harvester 100-1 to receiving machine 400-2*b*.

As illustrated in FIG. 7A, harvesting logistics module 315 may identify a potential earliest harvest start location 886-2 and a potential earliest receiving machine start location 887-2, however, as harvester 100-1 will be traveling uphill at potential start location 886-2, these potential start locations are less preferable.

Harvesting logistics module 315 has identified a harvester material transfer start location range corresponding to zone 851 and harvester 100-2 stretching between an earliest possible start location 888-4 and a latest start location 880-4 along the route 806-2 of harvester 100-2. Harvesting logistics module 315 has further identified a receiving machine material transfer start location range corresponding to zone 851 stretching between an earliest possible start location 889-4 and a latest start location 881-4. As can be seen, the receiving machine start locations 889-4 and 881-4 correspond to the harvester start locations 888-4 and 880-4 but are offset by a given lateral distance and a given fore-to-aft distance based on machine dimensions and fill strategy (e.g., front-to-back, back-to-front, etc.). Further, harvesting logistics module 315 has identified a harvester material transfer end location 882-4 corresponding to zone 851 and a corresponding receiving machine material transfer end location 884-4, which, like the receiving machine starting locations, is offset by a given lateral distance and a given fore-to-aft distance. In the illustrated example, receiving machine 400-1*b* is designated (or assigned) to receive crop material from zones 851 (or to receive crop material having values like the crop in zones 851). Harvesting logistics module 315 may designate (assign) machine 400-1*b* or the designation (assignment) may be received from other sources (e.g., operator or user) and identified by harvesting logistics module 315. Harvesting logistics module 315 has further generated a receiving machine route 866 which guides receiving machine 400-1*b* to the receiving machine starting area to the receiving machine end location 884-4 and to the receiving machine 400-2*b* which has been designated to receive crop material from zones 851 (or to receive crop material having values like the crop in zones 851). Harvesting logistics module 315 may control receiving machine 400-1*b* to travel along route 866, to align with harvester 100-2 in the material transfer zone (stretching between the starting area and the end location) according to machine dimensions, fill strategy, and to control the speed of receiving machine 400-1*b* along route 866, for example, matching the speed of the harvester 100-2 during material transfer. Additionally, harvesting logistics module 315 may control (e.g., activate) the material transfer subsystem 254 of the harvester 100-2 based on the start location and confirmation of receiving machine presence and alignment (which can be derived from geographic position information of the receiving machine 400-1*b* and or sensors on the harvester 100-2 or receiving machine 400-1*b* which detect the distance and alignment between the harvester 100-2 and the receiving machine 400-1*b*). Additionally, harvesting logistics module 315 may control (e.g., deactivate) the material transfer subsystem 254 of the harvester 100-2 based on the end location and the geographic location of the harvester 100-2. Further, harvesting logistics module 315 may control receiving machine 400-1*b*, after the material transfer operation with harvester 100-2 is complete, to travel along route 866 to material transfer location 892 which is identified by harvesting logistics module 315 based on the location of the designated receiving machine 400-2*b*. When receiving machine 400-1*b* is at location 892, harvesting logistics module 315 may then control receiving machine 400-1*b* to transfer the crop material it obtained from harvester 100-2 to receiving machine 400-2*b*.

As illustrated in FIG. 7A, harvesting logistics module 315 may identify a potential earliest harvest start location 886-4 and a potential earliest receiving machine start location 887-4, however, as harvester 100-2 will be traveling uphill at potential start location 886-2, these potential start locations are less preferable.

Harvesting logistics module 315 further identifies a route 867 for receiving machine 400-2*a* and a route 869 for receiving machine 400-2*b*. Route 867 can lead to a storage location 830 or a purchasing facility 840. Route 869 can lead to a storage location 830 or a purchasing facility 840. Harvesting logistics module 315 can control receiving machine 400-2*a* to travel along route 867 to a given material delivery location (e.g., a storage location 830 or a purchasing facility 840) and control the material delivery subsystem 454 of receiving machine 400-2*a* (e.g., door 191 or another type of material delivery subsystem, such as an auger and chute), to transfer material to the material delivery location when receiving machine 400-2*a* is at the given material delivery location. Harvesting logistics module 315 can control receiving machine 400-2*b* to travel along route 869 to a given material delivery location (e.g., a storage location 830 or a purchasing facility 840) and control the material delivery subsystem 454 of receiving machine 400-2*b* (e.g., door 191 or another type of material delivery subsystem, such as an auger and chute), to transfer material to the material delivery location when receiving machine 400-2*b* is at the given material delivery location.

While the example illustrated in FIG. 7A illustrates that each harvester 100 may be controlled to harvest from multiple zones, in other examples, it may be that harvesting logistics module 315 controls the route of harvester 100-1 such that harvester 100-1 only harvests within zones 850-1 and 850-2 and controls the route of harvester 100-2 such that harvester 100-2 only harvests within zone 851, or vice versa. In such an example, one receiving machine 400-1 may be controlled (e.g., routed) to only receive crop material from one harvester and the one receiving machine may be controlled (e.g., routed) to only receive crop material from the other harvester.

Figure 7B:
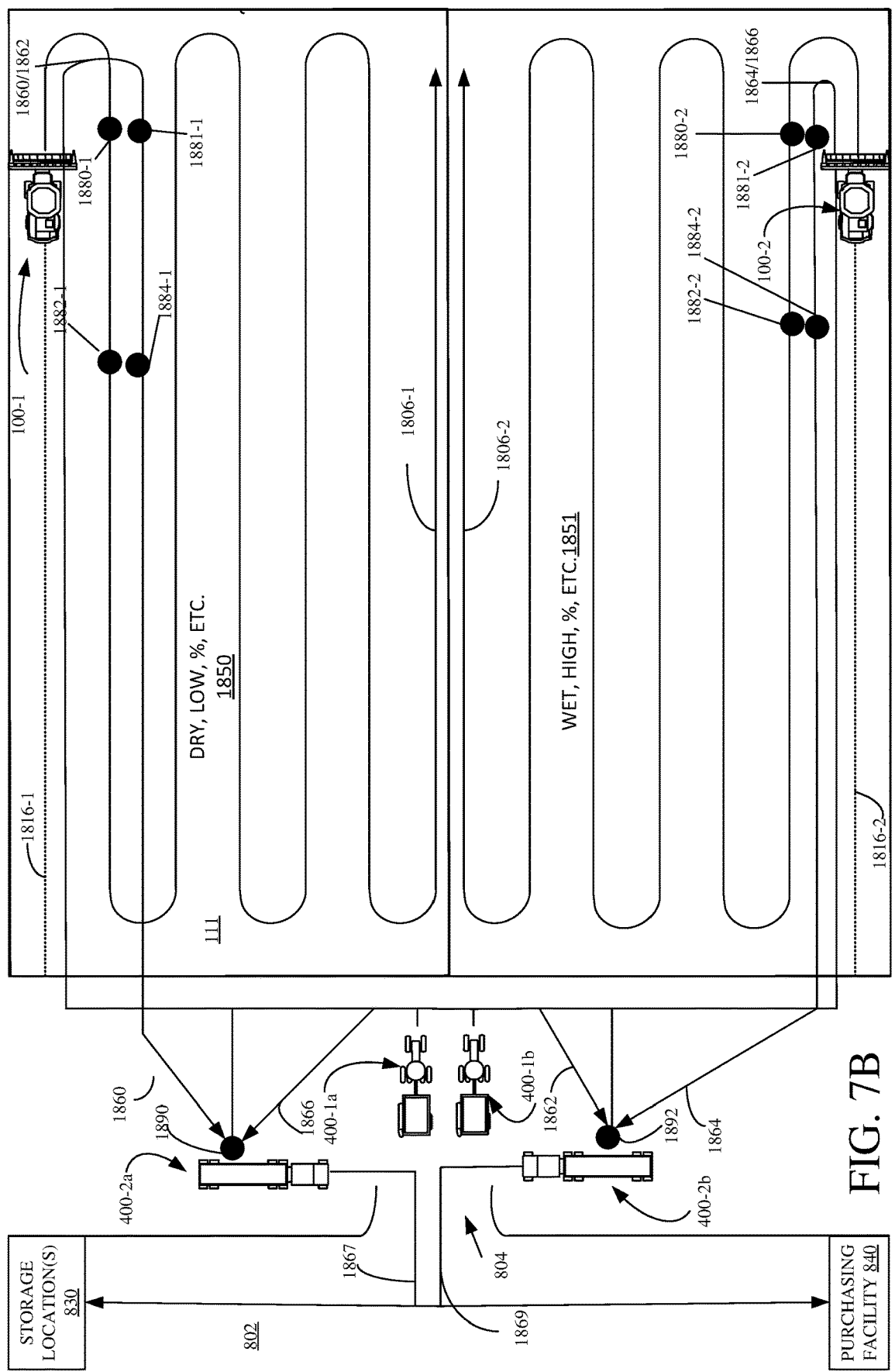
FIG. 7B is a pictorial illustration showing one example operation of harvesting logistics module in controlling a harvesting operation.

FIG. 7B is a pictorial illustration showing one example of harvesting logistics module 315 in controlling a harvesting operation. As shown in FIG. 7B, harvesting logistics module 315 is controlling the operation to generate mixtures of crop material having a desired aggregated crop characteristic value. Some items in FIG. 7B are similar to items in FIG. 7A and are thus numbered similarly. Agricultural harvester 100-1 will travel along route 1806-1 while agricultural harvester 100-2 will travel along route 1806-2. The dotted portions 1816-1 and 1816-2 illustratively show that already travelled path of harvester 100-1 and harvester 100-2, respectively.

Also, as illustrated in FIG. 7B, harvesting logistics module 315 has identified a plurality of zones at the field 111 (illustratively shown as a zone 1850 and a zone 1851).

Harvesting logistics module 315 has identified a crop characteristic threshold value of 12% moisture. Zone 1850 contains crop that is 10% moisture whereas zone 1851 contains crop that is 14% moisture. Harvesting logistics module 315 has identified a target mixture of 1 part crop material from zone 1850 and 1 part crop material from zone 1851 to achieve a mixture having an aggregated moisture value of 12%.

Both receiving machines 400-2 are currently empty and have a capacity of 1000 bushels. Thus, to achieve the target mixture, harvesting logistics module 315 determines that 500 bushels of 14% moisture crop from zone 1850 and 500 bushels of 10% moisture crop from zone 1851 need to be delivered to each receiving machine 400-2. Harvesting logistics module determines that both receiving machines 400-1 are empty and each have a capacity of 600 bushels and that harvester 100-1 currently has 200 bushels of 14% moisture crop material on-board. Based on the predictive yield values along the route 1806-1, the amount to be transferred, the speed of harvester 100-1, the transfer rate of the material transfer subsystem 254, and the current fill level of harvester 100-1, harvesting logistics module 315 determines a harvester material transfer start location 1880-1 and a harvester material transfer end location 1882-1. The start location 1880-1 may be a location at which the harvester 100-1 will be full, at least to a threshold level, or may be proximate (e.g., somewhat earlier in the route) to the location at which the harvester 100-1 will be full at least to the threshold level. In other examples, the start location may be the earliest location along the route of harvester 100-1 at which a receiving machine 400-1 can arrive. The end location 1882-1 may be identified by harvesting logistics module 315 as the location at which harvester will have been able to transfer the target amount of material (e.g., 500 bushels) to the receiving machine 400-1. Further, harvesting logistics module 315 identifies a receiving machine material transfer start location 1881-1 that corresponds to the harvester start location 1880-1, but is offset from the harvester start location 1880-1 by a given lateral distance and a given fore-to-aft distance based on machine dimensions and fill strategy. Further, harvesting logistics module 315 identifies a receiving machine material transfer end location 1884-1 that corresponds to the harvester end location 1882-1 but is offset from the harvester end location 1882-1 by a given lateral distance and a given fore-to-aft distance based on machine dimensions and fill strategy.

Harvesting logistics module 315 identifies a receiving machine 400-1 to deploy to receive material from harvester 100-1. In some examples, the receiving machines 400-1 may be assigned to particular harvesters, to particular zones, or to receiving crop material having select characteristic values. In other examples, harvesting logistics module 315 may select one of the receiving machines 400-1 based on various criteria, for example, the current fill levels of the receiving machines, the capacities of the receiving machines 400-1, the current locations of the receiving machines 400-1, as well as various other criteria. In the illustrated example, receiving machine 400-1a has been assigned to receive crop material from zone 1850. Thus, harvesting logistics module 315 generates a route for the receiving machine 400-1a to travel to the start location 1881-1 and to the end location 1884-1 and then to a receiving machine 400-2. Either of the receiving machines 400-2 may be selected as they are both assigned to receive the same mixture of crop in the illustrated example. For example, if receiving machine 400-2a is selected, then harvesting logistics module 315 generates route 1860 which guides receiving machine 400-1a to material transfer location 1890 which is located proximate to receiving machine 400-2a. If receiving machine 400-2b is selected, then harvesting logistics module 315 generates route 1862 which guides receiving machine 400-1a to material transfer location 1892 which is located proximate to receiving machine 400-2b. In some examples, the receiving machine 400-2 may be selected based on criteria, such as downtime, distance to travel to material delivery location, time to get to material delivery location, as well as various other criteria. Further, while in the illustrated example, each receiving machine 400-2 is receiving the same mixture, in other examples, each receiving machine 400-2 may be assigned a different mixture and thus may be selected based on such assignment.

Assume, in the illustrated example, that receiving machine 400-1a has been selected. Harvesting logistics module 315 may control the receiving machine 400-1a to travel along route 1860, to align with harvester 100-1 in the material transfer zone (stretching between the start location and the end location) according to machine dimensions, fill strategy, and to control the speed of receiving machine 400-1a along route 1860, for example, matching the speed of the harvester 100-1 during material transfer. Additionally, harvesting logistics module 315 may control (e.g., activate) the material transfer subsystem 254 of the harvester 100-1 based on the start location and confirmation of receiving machine presence and alignment (which can be derived from geographic position information of the receiving machine 400-1a or can be derived sensors on the harvester 100-1 or receiving machine 400-1a which detect the distance and alignment between the harvester 100-1 and the receiving machine 400-1a). Additionally, harvesting logistics module 315 may control (e.g., deactivate) the material transfer subsystem 254 of the harvester 100-1 based on the end location and the geographic location of the harvester 100-1 or based on the detected amount of material transferred (e.g., it may be that it takes less time or more time to transfer the target amount in which case the material transfer operation may terminate prior to the original end location or continue past the original end location). Further, harvesting logistics module 315 may control receiving machine 400-1a, after the material transfer operation with harvester 100-1 is complete, to travel along route 1860 to material transfer location 1890 which is identified by harvesting logistics module 315 based on the location of the designated receiving machine 400-2a. When receiving machine 400-1a is at location 1890, harvesting logistics module 315 may then control receiving machine 400-1a to transfer the crop material it obtained from harvester 100-1 to receiving machine 400-2a.

Keeping with the above example, harvesting logistics module determines that harvester 100-1 currently has 150 bushels of 10% moisture crop material on-board. Based on the predictive yield values along the route 1806-1 the amount to be transferred, the speed of harvester 100-1, the transfer rate of the material transfer subsystem 254, and the current fill level of harvester 100-1, harvesting logistics module 315 determines a harvester material transfer start location 1880-1 and a harvester material transfer end location 1882-1. The start location 1880-1 may be a location at which the harvester 100-1 will be full, at least to a threshold level, or may be proximate (e.g., somewhat earlier in the route) to the location at which the harvester 100-1 will be full at least to the threshold level. In other examples, the start location may be the earliest location along the route of harvester 100-1 at which a receiving machine 400-1 can arrive. The end location 1882-1 may be identified by harvesting logistics module 315 as the location at which harvester 100-1 will have been able to transfer the target amount of material (e.g., 500 bushels) to the receiving machine 400-1. Further, harvesting logistics module 315 identifies a receiving machine material transfer start location 1881-1 that corresponds to the harvester start location 1880-1, but is offset from the harvester start location 1880-2 by a given lateral distance and a given fore-to-aft distance based on machine dimensions and fill strategy. Further, harvesting logistics module 315 identifies a receiving machine material transfer end location 1884-1 that corresponds to the harvester end location 1882-1 but is offset from the harvester end location 1882-1 by a given lateral distance and a given fore-to-aft distance based on machine dimensions and fill strategy.

Keeping with the above example, harvesting logistics module determines that harvester 100-2 currently has 200 bushels of 14% moisture crop material on-board. Based on the predictive yield values along the route 1806-2 the amount to be transferred, the speed of harvester 100-2, the transfer rate of the material transfer subsystem 254, and the current fill level of harvester 100-2, harvesting logistics module 315 determines a harvester material transfer start location 1880-1 and a harvester material transfer end location 1882-2. The start location 1880-2 may be a location at which the harvester 100-2 will be full, at least to a threshold level, or may be proximate (e.g., somewhat earlier in the route) to the location at which the harvester 100-2 will be full at least to the threshold level. In other examples, the start location may be the earliest location along the route of harvester 100-2 at which a receiving machine 400-1 can arrive. The end location 1882-2 may be identified by harvesting logistics module 315 as the location at which harvester 100-2 will have been able to transfer the target amount of material (e.g., 500 bushels) to the receiving machine 400-1. Further, harvesting logistics module 315 identifies a receiving machine material transfer start location 1881-2 that corresponds to the harvester start location 1880-2, but is offset from the harvester start location 1880-2 by a given lateral distance and a given fore-to-aft distance based on machine dimensions and fill strategy. Further, harvesting logistics module 315 identifies a receiving machine material transfer end location 1884-2 that corresponds to the harvester end location 1882-2 but is offset from the harvester end location 1882-2 by a given lateral distance and a given fore-to-aft distance based on machine dimensions and fill strategy.

In the current example, harvesting logistics module 315 identifies receiving machine 400-1b to deploy to receive material from harvester 100-2. Thus, harvesting logistics module 315 generates a route for the receiving machine 400-1b to travel to the start location 1881-2 and to the end location 1884-2 and then to a receiving machine 400-2. Either of the receiving machines 400-2 may be selected as they are both assigned to receive the same mixture of crop in the illustrated example. For example, if receiving machine 400-2a is selected, then harvesting logistics module 315 generates route 1866 which guides receiving machine 400-1b to material transfer location 1890 which is located proximate to receiving machine 400-2a. If receiving machine 400-2b is selected, then harvesting logistics module 315 generates route 1864 which guides receiving machine 400-1b to material transfer location 1892 which is located proximate to receiving machine 400-2b. In some examples, the receiving machine 400-2 may be selected based on criteria, such as downtime, distance to travel to material delivery location, time to get to material delivery location, as well as various other criteria. Further, while in the illustrated example, each receiving machine 400-2 is receiving the same mixture, in other examples, each receiving machine 400-2 may be assigned a different mixture and thus may be selected based on such assignment.

Assume, in the illustrated example, that receiving machine 400-2a has been selected. Harvesting logistics module 315 may control the receiving machine 400-1b to travel along route 1866, to align with harvester 100-2 in the material transfer zone (stretching between the start location and the end location) according to machine dimensions and fill strategy, and to control the speed of receiving machine 400-1b along route 1866, for example, matching the speed of the harvester 100-2 during material transfer. Additionally, harvesting logistics module 315 may control (e.g., activate) the material transfer subsystem 254 of the harvester 100-2 based on the start location and confirmation of receiving machine presence and alignment (which can be derived from geographic position information of the receiving machine 400-1b and/or sensors on the harvester 100-2 or receiving machine 400-1b which detect the distance and alignment between the harvester 100-2 and the receiving machine 400-1b). Additionally, harvesting logistics module 315 may control (e.g., deactivate) the material transfer subsystem 254 of the harvester 100-2 based on the end location and the geographic location of the harvester 100-2 or based on the detected amount of material transferred (e.g., it may be that it takes less time or more time to transfer the target amount in which case the material transfer operation may terminate prior to the original end location or continue past the original end location). Further, harvesting logistics module 315 may control receiving machine 400-1b, after the material transfer operation with harvester 100-2 is complete, to travel along route 1866 to material transfer location 1890 which is identified by harvesting logistics module 315 based on the location of the designated receiving machine 400-2a. When receiving machine 400-1b is at location 1890, harvesting logistics module 315 may then control receiving machine 400-1b to transfer the crop material it obtained from harvester 100-1 to receiving machine 400-2a.

Thus, in the illustrated example, a 1000-bushel mixture having an aggregated crop moisture value of 12% will be delivered to receiving machine 400-2a and subsequently a same mixture will be delivered to receiving machine 400-2b, though, this need not be the case. In other example, receiving machine 400-2b may be assigned a different target mixture, for example, a target mixture having a crop moisture value of 13% which requires 3 parts of 14% moisture crop and 1 part of 10% moisture crop.

Harvesting logistics module 315 further identifies a route 1867 for receiving machine 400-2a and a route 1869 for receiving machine 400-2b. Route 1867 can lead to a storage location 830 or a purchasing facility 840. Route 1869 can lead to a storage location 830 or a purchasing facility 840. Harvesting logistics module 315 can control receiving machine 400-2a to travel along route 1867 to a given material delivery location (e.g., a storage location 830 or a purchasing facility 840) and control the material delivery subsystem 454 of receiving machine 400-2a (e.g., door 191 or another type of material delivery subsystem, such as an auger and chute), to transfer material to the material delivery location when receiving machine 400-2a is at the given material delivery location. Harvesting logistics module 315 can control receiving machine 400-2b to travel along route 1869 to a given material delivery location (e.g., a storage location 830 or a purchasing facility 840) and control the material delivery subsystem 454 of receiving machine 400-2b (e.g., door 191 or another type of material delivery subsystem, such as an auger and chute), to transfer material to the material delivery location when receiving machine 400-2b is at the given material delivery location.

While the example illustrated in FIG. 7B illustrates that each harvester 100 may be controlled to harvest from one zone, in other examples, it may be that harvesting logistics module controls the route of harvester 100-1 such that harvester 100-1 harvests in multiples zones and controls the route of harvester 100-2 such that harvester 100-2 within multiple zones. For example, routes for each harvester 100 can be generated such that each harvester travels through multiple zones to achieve an on-board mixture of crop material having an aggregated crop characteristic value that satisfies a target value by a given location, such as by a location at which the harvester will be full or proximate to the location at which the harvester 100 will be full.

While FIGS. 7A-B illustrate segregation and mixture separately, it will be understood that in some examples, harvesting logistics module 315 may generate control outputs that segregate crop material and mix crop material during a harvesting operation at one or more fields. For example, given quantities and crop characteristic values at the field (or fields), it may be possible to segregate at least some of the crop material to achieve target values but may also be necessary to mix some of the crop material. In a simplified example, a field (or fields) may have a total of 20,000 bushels, with 12,000 bushels of 14% moisture crop and 8,000 bushels of 10% moisture crop. There may be a crop characteristic threshold (or target) of 12% moisture crop. 4,000 bushels of the 14% moisture crop material may be segregated at designated for delivery to a dryer. 8,000 bushels of the 14% moisture crop material and the 8,000 bushels of 10% moisture crop material may be mixed across various loads (e.g., 16 separate 1000-bushel semi-trailer loads) to achieve a crop material mixture with an aggregated crop moisture value of 12%.

Further, while the examples shown in FIGS. 7A-B describe that the receiving machine starting locations and receiving machines ending locations are offset by a given lateral distance and a given fore-to-aft distance, this need not be the case. In other examples, the receiving machine need not be offset by both a lateral distance and a fore-to-aft distance. The offset can depend on the type of harvester as well as the particular dimensions of the machine. For example, for a combine harvester performing a material transfer operation, the receiving machine is often separated from the harvester by a given lateral distance, but need not necessarily be separated in a fore-to-aft direction. For a forage harvester or a sugarcane harvester, the receiving machine can be travel directly behind the harvester during material transfer and thus may not be separated from the harvester laterally, but may be separated in the fore-to-aft direction. Thus, in some examples, the receiving machine ending locations and starting locations may be offset in multiple directions (e.g., both laterally and fore-to-aft) while in other examples, the receiving machine ending locations and starting locations may be offset in one direction (e.g., either laterally or fore-to-aft). In some example offsets can vary during the same operation, for instance, some locations may be offset in both directions while others are only offset in one direction. For instance, in a forage harvesting operation, a receiving machine may travel behind the harvester or to the side of the harvester.

Figure 8:
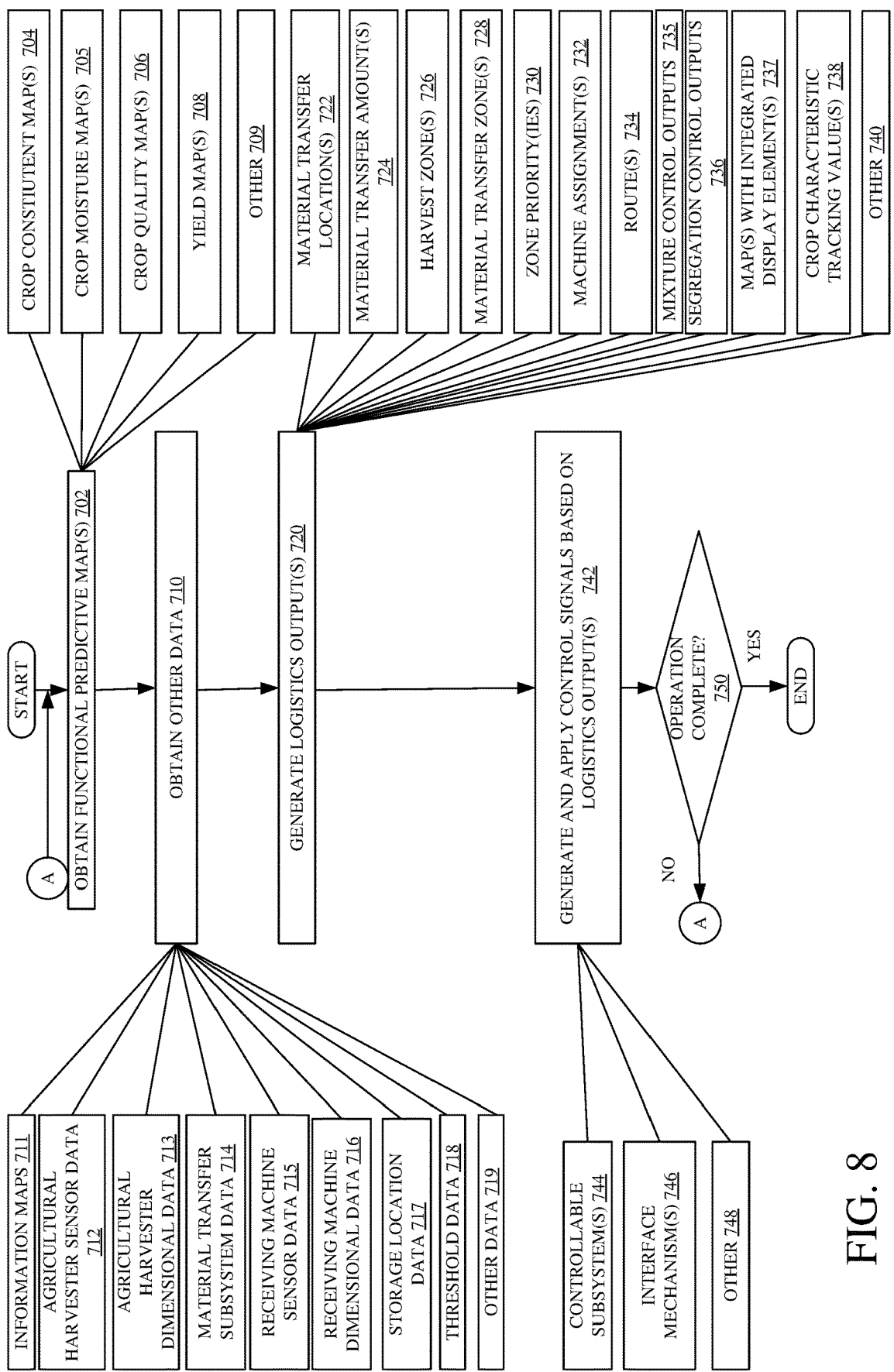
FIG. 8 is a flow diagram illustrating one example of operation of an agricultural harvesting system in controlling a harvesting operation.

FIG. 8 is a flow diagram showing one example operation of agricultural harvesting system 500 in controlling an agricultural harvester 100 or a receiving machine 400, or both, in performing a harvesting operation.

At block 702 one or more functional predictive maps 263 are obtained by harvesting logistics module 315, such as one or more predictive maps 264 or one or more predictive maps with control zones 265, or both. As indicated by block 704, the one or more functional predictive maps 263 may include functional predictive crop constituent map 370 or functional predictive crop constituent control zone map 380, or both. As indicated by block 705, the one or more functional predictive maps 263 may include functional predictive crop moisture map 371 or functional predictive crop moisture control zone map 281, or both. As indicated by block 706, the one or more functional predictive maps 263 may include functional predictive crop quality map 372 or functional predictive crop quality control zone map 282, or both. As indicated by block 708, the one or more functional predictive maps 263 may include functional predictive yield map 273 or functional predictive yield control zone map 283, or both. Functional predictive maps 263 may include various other maps, as indicated by block 709.

At block 710 various other data are obtained by harvesting logistics module 315. For example, harvesting logistics module 315 can obtain one or more of the data items illustrated in FIG. 6. As indicated by block 711, harvesting logistics module 315 can obtain one or more information maps 358. As indicated by block 712, harvesting logistics module 315 can obtain agricultural harvester sensor data 604. As indicated by block 713, harvesting logistics module 315 can obtain agricultural harvester dimensional data 606. As indicated by block 714, harvesting logistics module 315 can obtain material transfer subsystem data 607. As indicated by block 715, harvesting logistics module 315 can obtain receiving machine sensor data 608. As indicated by block 716, harvesting logistics module 315 can obtain receiving machine dimensional data 610. As indicated by block 717, harvesting logistics module 315 can obtain storage location data 612. As indicated by block 718, harvesting logistics module 315 can obtain threshold data 614. As indicated by block 719, harvesting logistics module 315 can obtain various other data 616.

At block 720 harvesting logistics module 315 generates one or more logistics outputs 668. As indicated by block 722, material transfer location identifier logic 652 can generate, as a logistics output 668, one or more material transfer locations, including one or more material transfer start locations and one or more material transfer end locations. As indicated by block 724, material transfer amount identifier logic 653 can generate, as a logistics output 668, one or more material transfer amounts. As indicated by block 726, harvest zone logic 654 can generate, as a logistics output 668, one or more harvest zones. As indicated by block 728, material transfer zone logic 656 can generate, as a logistics output 668, one or more material transfer zones. As indicated by block 730, zone priority logic 655 can generate, as a logistics output 668, priorities of harvest zones. As indicated by block 732, machine assignment logic 657 can generate, as a logistics output 668, one or more machine assignments. As indicated by block 734, route planning logic 658 can generate, as a logistics output 668, one or more routes. As indicated by block 735, harvesting logistics module 315 can generate, as logistics outputs 668, one or more mixture control outputs. As indicated by block 736, harvesting logistics module 315 can generate, as logistics outputs, one or more segregation control outputs. As indicated by block 737, harvesting logistics module 315 can generate, as a logistics output 668, one or more maps with integrated display elements, the display elements generated and integrated into the maps by display element integration component 659. For example, at block 737, the one or more maps may include one or more functional predictive maps 263 with display elements integrate or one or more harvesting logistics maps 661 with display elements integrated, or both. As indicated by block 738, material transfer tracking logic 663 can generate, as a logistics output 668, one or more crop characteristic tracking values. Harvesting logistics module 315 can generate a variety of other logistics outputs, as indicated by block 740.

At block 742, control system 214 and/or control system 414 generate control signals based on the one or more logistics outputs 668. For example, as indicated by block 744, control system 214 can generate control signals to control one or more controllable subsystems 216 based on the one or more logistics outputs 668. Additionally, or alternatively, as indicated by block 744, control system 414 can generate control signals to control one or more controllable subsystems 416 based on the one or more logistics outputs 668. As indicated by block 746, control system 214 can generate control signals to control one or more interface mechanisms (e.g., 218 or 364) to generate displays, alerts, notifications, recommendations, as well as various other indications based on the one or more logistics outputs 668. Alternatively, or additionally, as indicated by block 746, control system 414 can generate control signals to control one or more interface mechanisms (e.g., 418 or 364) to generate displays, alerts, notifications, recommendations, as well as various other indications based on the one or more logistics outputs 668. As indicated by block 748, control system 214 and/or control system 414 can generate various other control signals based on the logistics outputs 668.

At block 750 it is determined if the harvesting operation is complete. If the harvesting operation has not been completed, operation returns to block 702. If the harvesting operation has been completed, then the operation ends.

The examples herein describe the generation of a predictive model and, in some examples, the generation of a functional predictive map based on the predictive model. The examples described herein are distinguished from other approaches by the use of a model which is at least one of multi-variate or site-specific (i.e., georeferenced, such as map-based). Furthermore, the model is revised as the work machine is performing an operation and while additional in-situ sensor data is collected. The model may also be applied in the future beyond the current worksite. For example, the model may form a baseline (e.g., starting point) for a subsequent operation at a different worksite or at the same worksite at a future time.

The revision of the model in response to new data may employ machine learning methods. Without limitation, machine learning methods may include memory networks, Bayes systems, decisions trees, Eigenvectors, Cluster Analysis, Eigenvalues and Machine Learning, Evolutionary and Genetic Algorithms, Expert Systems/Rules, Support Vector Machines, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Random Forests, Reinforcement Learning or Reward-based machine learning. Learning may be supervised or unsupervised.

Model implementations may be mathematical, making use of mathematical equations, empirical correlations, statistics, tables, matrices, and the like. Other model implementations may rely more on symbols, knowledge bases, and logic such as rule-based systems. Some implementations are hybrid, utilizing both mathematics and logic. Some models may incorporate random, non-deterministic, or unpredictable elements. Some model implementations may make uses of networks of data values such as neural networks. These are just some examples of models.

The predictive paradigm examples described herein differ from non-predictive approaches where an actuator or other machine parameter is fixed at the time the machine, system, or component is designed, set once before the machine enters the worksite, is reactively adjusted manually based on operator perception, or is reactively adjusted based on a sensor value.

The functional predictive map examples described herein also differ from other map-based approaches. In some examples of these other approaches, an a priori control map is used without any modification based on in-situ sensor data or else a difference determined between data from an in-situ sensor and a predictive map are used to calibrate the in-situ sensor. In some examples of the other approaches, sensor data may be mathematically combined with a priori data to generate control signals, but in a location-agnostic way; that is, an adjustment to an a priori, georeferenced predictive setting is applied independent of the location of the work machine at the worksite. The continued use or end of use of the adjustment, in the other approaches, is not dependent on the work machine being in a particular defined location or region within the worksite.

In examples described herein, the functional predictive maps and predictive actuator control rely on obtained maps and in-situ data that are used to generate predictive models. The predictive models are then revised during the operation to generate revised functional predictive maps and revised actuator control. In some examples, the actuator control is provided based on functional predictive control zone maps which are also revised during the operation at the worksite. In some examples, the revisions (e.g., adjustments, calibrations, etc.) are tied to regions or zones of the worksite rather than to the whole worksite or some non-georeferenced condition. For example, the adjustments are applied to one or more areas of a worksite to which an adjustment is determined to be relevant (e.g., such as by satisfying one or more conditions which may result in application of an adjustment to one or more locations while not applying the adjustment to one or more other locations), as opposed to applying a change in a blanket way to every location in a non-selective way.

In some examples described herein, the models determine and apply those adjustments to selective portions or zones of the worksite based on a set of a priori data, which, in some instances, is multivariate in nature. For example, adjustments may, without limitation, be tied to defined portions of the worksite based on site-specific factors such as topography, soil type, crop variety, soil moisture, as well as various other factors, alone or in combination. Consequently, the adjustments are applied to the portions of the field in which the site-specific factors satisfy one or more criteria and not to other portions of the field where those site-specific factors do not satisfy the one or more criteria. Thus, in some examples described herein, the model generates a revised functional predictive map for at least the current location or zone, the unworked part of the worksite, or the whole worksite.

As an example, in which the adjustment is applied only to certain areas of the field, consider the following. The system may determine that a detected in-situ characteristic value (e.g., detected crop constituent value, detected crop moisture value, or detected crop quality value) varies from a predictive value of the characteristic (e.g., predictive crop constituent value, predictive crop moisture value, or predictive crop quality value), such as by a threshold amount. This deviation may only be detected in areas of the field where the elevation of the worksite is above a certain level. Thus, the revision to the predictive value is only applied to other areas of the worksite having elevation above the certain level. In this simpler example, the predictive characteristic value and elevation at the point the deviation occurred and the detected characteristic value and elevation at the point the deviation cross the threshold are used to generate a linear equation. The linear equation is used to adjust the predictive characteristic value in unharvested areas of the worksite in the functional predictive map as a function of elevation and the predicted characteristic value. This results in a revised functional predictive map in which some values are adjusted while others remain unchanged based on selected criteria, e.g., elevation as well as threshold deviation. The revised functional map is then used to generate a revised functional control zone map for controlling the machine.

As an example, without limitation, consider an instance of the paradigm described herein which is parameterized as follows.

One or more maps of the field are obtained, such as one or more of a vegetative index map, a historical yield map, and another type of map.

In-situ sensors generate sensor data indicative of in-situ characteristic values, such as in-situ yield values.

A predictive model generator generates one or more predictive models based on the one or more obtained maps and the in-situ sensor data, such as a predictive yield model.

A predictive map generator generates one or more functional predictive maps based on a model generated by the predictive model generator and the one or more obtained maps. For example, the predictive map generator may generate a functional predictive yield map that maps predictive yield values to one or more locations on the worksite based on a predictive yield model and the one or more obtained maps.

Control zones, which include machine settings values, can be incorporated into the functional predictive yield map to generate a functional predictive yield control zone map.

As another example, without limitation, consider an instance of the paradigm described herein which is parameterized as follows.

One or more maps of the field are obtained, such as one or more of a vegetative index map, a historical crop constituent map, a prior operation map, a soil property map, a biomass map, a yield map, and another type of map.

In-situ sensors generate sensor data indicative of in-situ characteristic values, such as in-situ crop constituent values.

A predictive model generator generates one or more predictive models based on the one or more obtained maps and the in-situ sensor data, such as a predictive crop constituent model.

A predictive map generator generates one or more functional predictive maps based on a model generated by the predictive model generator and the one or more obtained maps. For example, the predictive map generator may generate a functional predictive crop constituent map that maps predictive crop constituent values to one or more locations on the worksite based on a predictive crop constituent model and the one or more obtained maps.

Control zones, which include machine settings values, can be incorporated into the functional predictive crop constituent map to generate a functional predictive crop constituent control zone map.

As another example, without limitation, consider an instance of the paradigm described herein which is parameterized as follows.

One or more maps of the field are obtained, such as one or more of a vegetative index map, a historical crop moisture map, a topographic map, a soil property map, a prior operation map, and another type of map.

In-situ sensors generate sensor data indicative of in-situ characteristic values, such as in-situ crop moisture values.

A predictive model generator generates one or more predictive models based on the one or more obtained maps and the in-situ sensor data, such as a predictive crop moisture model.

A predictive map generator generates one or more functional predictive maps based on a model generated by the predictive model generator and the one or more obtained maps. For example, the predictive map generator may generate a functional predictive crop moisture map that maps predictive crop moisture values to one or more locations on the worksite based on a predictive crop moisture model and the one or more obtained maps.

Control zones, which include machine settings values, can be incorporated into the functional predictive crop moisture map to generate a functional predictive crop moisture control zone map.

As another example, without limitation, consider an instance of the paradigm described herein which is parameterized as follows.

One or more maps of the field are obtained, such as one or more of a topographic map, a vegetative index map, a biomass map, a seeding map, a yield map, a weed map, a historical pest map, an optical characteristic map, a scouting map, an animal activity map, and another type of map.

In-situ sensors generate sensor data indicative of in-situ characteristic values, such as in-situ crop quality values.

A predictive model generator generates one or more predictive models based on the one or more obtained maps and the in-situ sensor data, such as a predictive crop quality model.

A predictive map generator generates one or more functional predictive maps based on a model generated by the predictive model generator and the one or more obtained maps. For example, the predictive map generator may generate a functional predictive crop quality map that maps predictive crop quality values to one or more locations on the worksite based on a predictive crop quality model and the one or more obtained maps.

Control zones, which include machine settings values, can be incorporated into the functional predictive crop quality map to generate a functional predictive crop quality control zone map.

As the mobile machine continues to operate at the worksite, additional in-situ sensor data is collected. A learning trigger criteria can be detected, such as threshold amount of additional in-situ sensor data being collected, a magnitude of change in a relationship (e.g., the in-situ characteristic values varies to a certain [e.g., threshold] degree from a predictive value of the characteristic), and operator or user makes edits to the predictive map(s) or to a control algorithm, or both, a certain (e.g., threshold) amount of time elapses, as well as various other learning trigger criteria. The predictive model(s) are then revised based on the additional in-situ sensor data and the values from the obtained maps. The functional predictive maps or the functional predictive control zone maps, or both, are then revised based on the revised model(s) and the values in the obtained maps.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic, modules, generators, and interactions. It will be appreciated that any or all of such systems, components, logic, modules, generators, and interactions may be implemented by hardware items, such as one or more processors, one or more processors executing computer executable instruction stored in memory, memory, or other processing components, some of which are described below, that perform the functions associated with those systems, components, logic, modules, generators, or interactions. In addition, any or all of the systems, components, logic, modules, generators, and interactions may be implemented by software that is loaded into a memory and is subsequently executed by one or more processors or one or more servers or other computing component(s), as described below. Any or all of the systems, components, logic, modules, generators, and interactions may also be implemented by different combinations of hardware, software, firmware, etc., some examples of which are described below. These are some examples of different structures that may be used to implement any or all of the systems, components, logic, modules, generators, and interactions described above. Other structures may be used as well.

Figure 9:
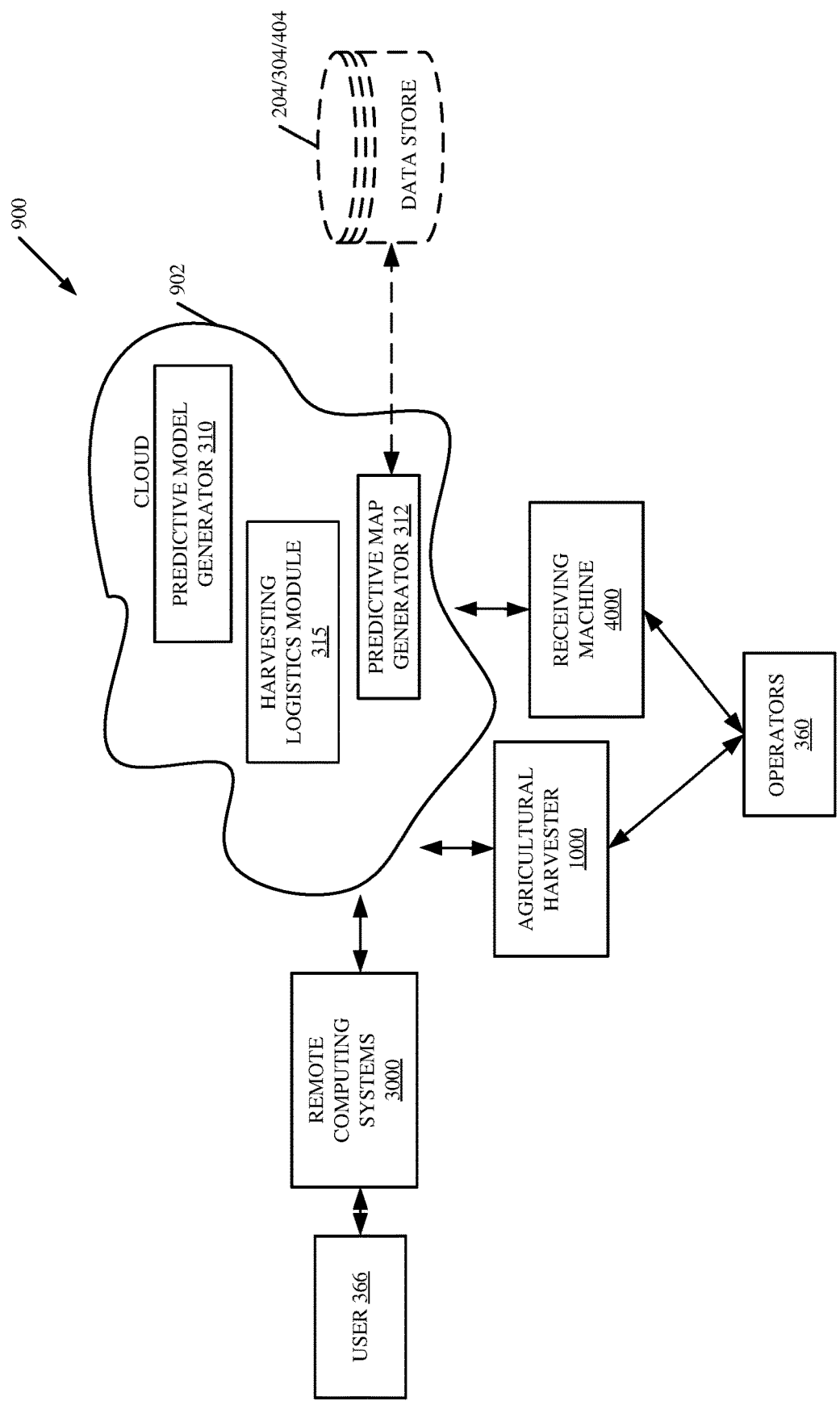
FIG. 9 is a block diagram showing one example of a mobile machine in communication with a remote server environment.

FIG. 9 is a block diagram of agricultural harvester 1000, which may be similar to agricultural harvester 100 shown in FIG. 3, receiving machine 4000, which may be similar to receiving machine 400 shown in FIG. 3, and remote computing systems 3000, which may be similar to remote computing systems 300 shown in FIG. 3. The agricultural harvester 1000, receiving machine 4000, and remote computing system 3000 communicates with elements in a remote server architecture 900. In some examples, remote server architecture 900 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in FIG. 3 as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 9, some items are similar to those shown in FIG. 3 and those items are similarly numbered. FIG. 9 specifically shows that predictive model generator 310, predictive map generator 312, and harvesting logistics module 315 may be located at a server location 902 that is remote from the agricultural harvester 1000, the receiving machine 2000, and the remote computing systems 3000. Therefore, in the example shown in FIG. 9, agricultural harvester 1000, receiving machine 4000, and remote computing systems 3000 accesses systems through remote server location 902. In other examples, various other items may also be located at server location 902, such as predictive model 311, functional predictive maps 263 (including predictive maps 264 and predictive control zone maps 265), control zone generator 313, and processing system 338.

FIG. 9 also depicts another example of a remote server architecture. FIG. 9 shows that some elements of FIG. 3 may be disposed at a remote server location 902 while others may be located elsewhere. By way of example, one or more of data store(s) 204, 304, and 404 may be disposed at a location separate from location 902 and accessed via the remote server at location 902. Regardless of where the elements are located, the elements can be accessed directly by agricultural harvester 1000, receiving machine 4000, and remote computing systems 3000 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As the agricultural harvester 1000 or receiving machine 4000, or both, comes close to the machine containing the information collection system, such as a fuel truck prior to fueling, the information collection system collects the information from the agricultural harvester 1000 or the receiving machine 4000, or both, using any type of ad-hoc wireless connection. The collected information may then be forwarded to another network when the machine containing the received information reaches a location where wireless telecommunication service coverage or other wireless coverage—is available. For instance, a fuel truck may enter an area having wireless communication coverage when traveling to a location to fuel other machines or when at a main fuel storage location. All of these architectures are contemplated herein. Further, the information may be stored on the agricultural harvester 1000 or the receiving machine 4000, or both, until the agricultural harvester 1000 or the receiving machine 4000, or both, enters an area having wireless communication coverage. The agricultural harvester 1000, itself, may send the information to another network. The receiving machine 4000, itself, may send the information to another network.

It will also be noted that the elements of FIG. 3, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 902 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 10:
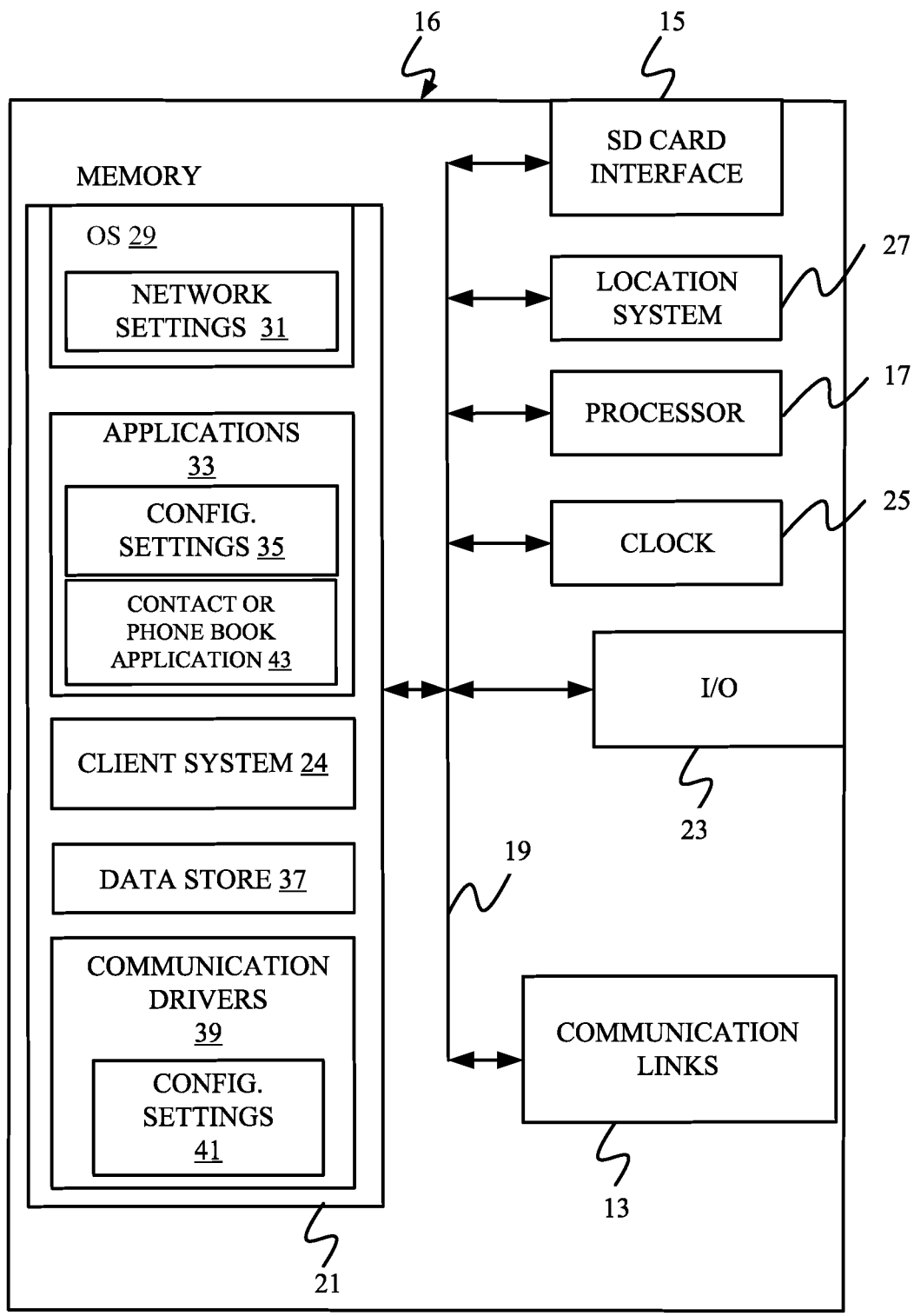
FIGS. 10-12 show examples of mobile devices that can be used in an agricultural harvesting system.
Figure 11:
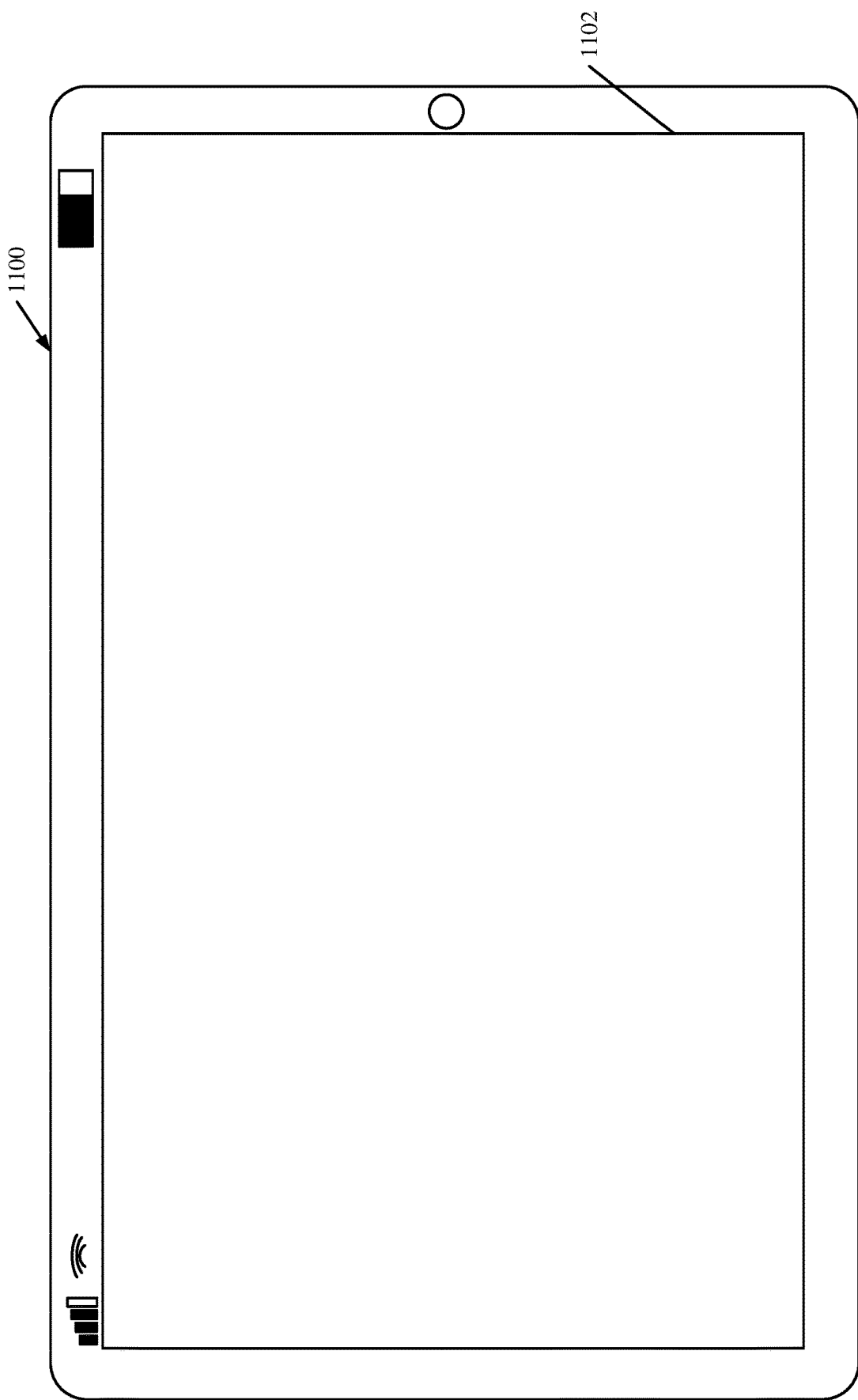
Figure 12:
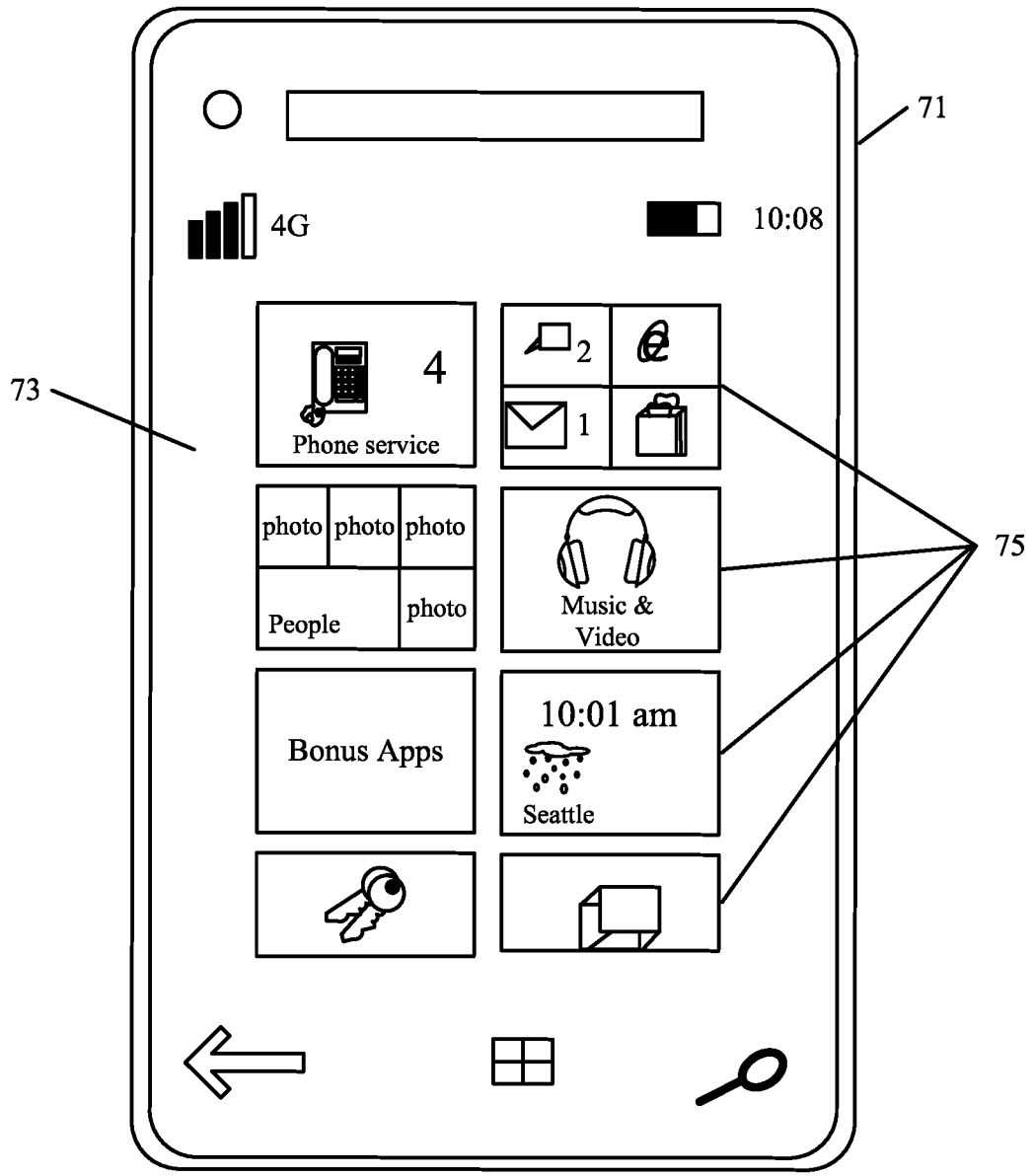

FIG. 10 is a simplified block diagram of one illustrative example of a handheld or mobile computing device that can be used as a user's or client's handheld device 16, in which the present system (or parts of it) can be deployed. For instance, a mobile device can be deployed in the operator compartment of agricultural harvester 100 or receiving machine 400, or both, for use in generating, processing, or displaying the maps discussed above. FIGS. 11-12 are examples of handheld or mobile devices.

FIG. 10 provides a general block diagram of the components of a client device 16 that can run some components shown in FIG. 3, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 11 shows one example in which device 16 is a tablet computer 1100. In FIG. 11, computer 1100 is shown with user interface display screen 1102. Screen 1102 can be a touch screen or a pen-enabled interface that receives inputs from a pen or stylus. Tablet computer 1100 may also use an on-screen virtual keyboard. Of course, computer 1100 might also be attached to a keyboard or other user input device through a suitable attachment mechanism, such as a wireless link or USB port, for instance. Computer 1100 may also illustratively receive voice inputs as well.

FIG. 12 is similar to FIG. 11 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
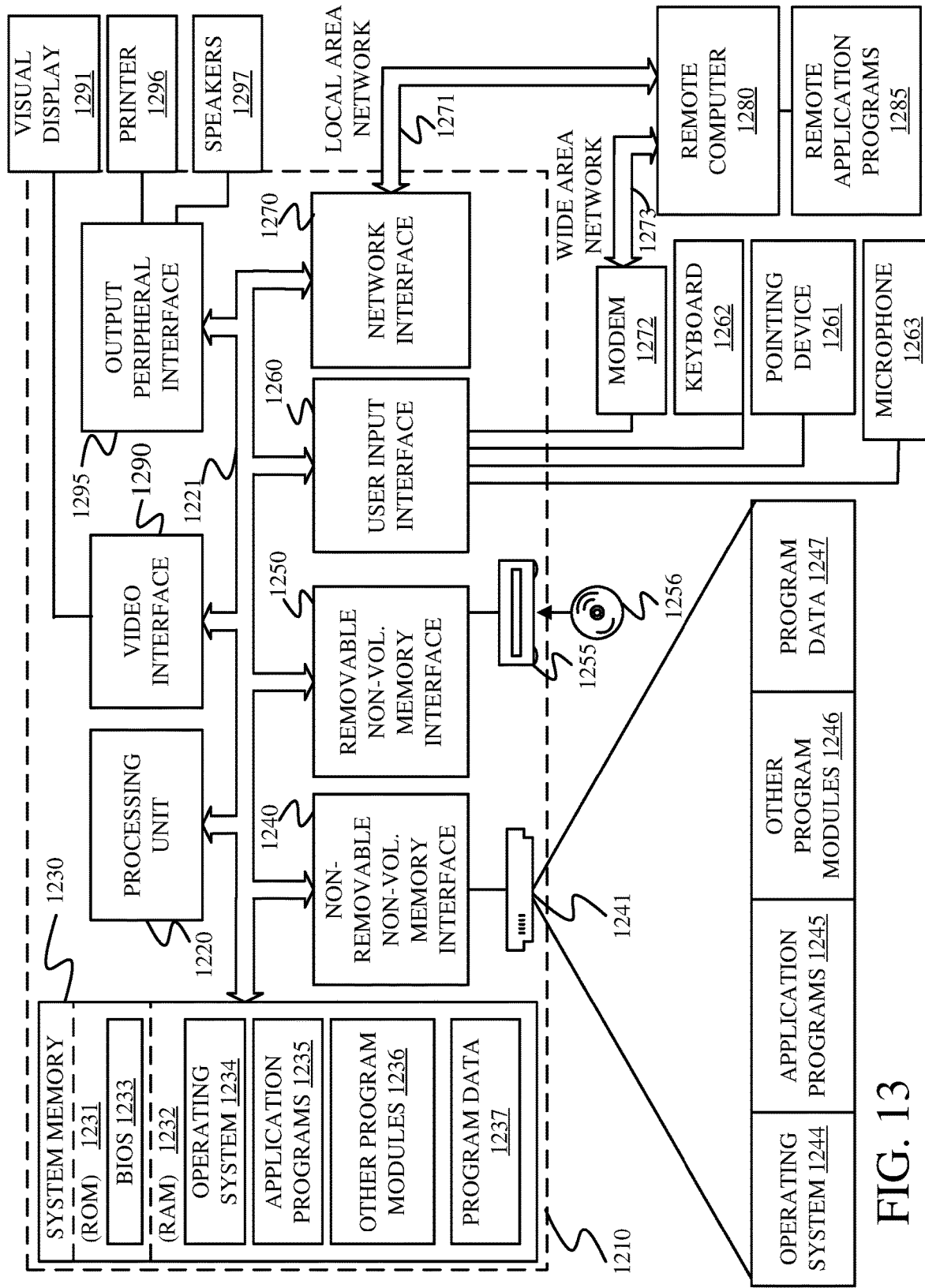
FIG. 13 is a block diagram showing one example of a computing environment that can be used in an agricultural harvesting system.

FIG. 13 is one example of a computing environment in which elements of previous figures described herein can be deployed. With reference to FIG. 13, an example system for implementing some embodiments includes a computing device in the form of a computer 1210 programmed to operate as discussed above. Components of computer 1210 may include, but are not limited to, a processing unit 1220 (which can comprise processors or servers from previous FIGS.), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. Memory and programs described with respect to previous figures described herein can be deployed in corresponding portions of FIG. 13.

Computer 1210 typically includes a variety of computer readable media. Computer readable media may be any available media that can be accessed by computer 1210 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 13 illustrates operating system 1234, application programs 1235, other program modules 1236, and program data 1237.

The computer 1210 may also include other removable/non-removable volatile/nonvolatile computer storage media. By way of example only, FIG. 13 illustrates a hard disk drive 1241 that reads from or writes to non-removable, nonvolatile magnetic media, an optical disk drive 1255, and nonvolatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 1210. In FIG. 13, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user may enter commands and information into the computer 1210 through input devices such as a keyboard 1262, a microphone 1263, and a pointing device 1261, such as a mouse, trackball or touch pad. Other input devices (not shown) may include a joystick, game pad, satellite dish, scanner, or the like. These and other input devices are often connected to the processing unit 1220 through a user input interface 1260 that is coupled to the system bus, but may be connected by other interface and bus structures. A visual display 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 is operated in a networked environment using logical connections (such as a controller area network—CAN, local area network—LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules may be stored in a remote memory storage device. FIG. 13 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. A computer implemented method comprising:
receiving a map that maps values of a crop characteristic to different locations across a field;
receiving harvester route data indicative of a planned route of a harvester at the field;
identifying a crop characteristic threshold;
identifying a material transfer end location indicative of a location, along the planned route of the harvester, at which a material transfer operation between the harvester and a receiving machine is to end, based on the map, the planned route of the harvester, and the crop characteristic threshold;
identifying a material transfer start location range indicative of a geographic area, along the planned route of the harvester, at which the material transfer operation is to start based on the material transfer end location, wherein the material transfer start location range is separated, along the planned route of the harvester, from the material transfer end location; and
generating a route for the receiving machine to travel based on the material transfer end location and the material transfer start location range.

2. The computer implemented method of claim 1, wherein identifying the material transfer end location comprises:
identifying a location along the planned route of the harvester at which a value of the crop characteristic of the crop material harvested by the harvester will cross the crop characteristic threshold; and
identifying, as the material transfer end location, a location along the planned route of the harvester relative to the location at which the value of the crop characteristic of the crop material harvested by the harvester will cross the crop characteristic threshold.

3. The computer implemented method of claim 2, wherein identifying the material transfer start location range comprises:
identifying an end of range location, along the planned route of the harvester, at which the material transfer operation can start based on the material transfer end location, a current location of the harvester, a predictive yield of the crop along the planned route of the harvester from the current location of the harvester to the material transfer end location, and a current fill level of the harvester; and
identifying a start of range location, along the planned route of the harvester, at which the material transfer operation can start, wherein the material transfer start location range stretches from the start of range location to the end of range.

4. The computer implemented method of claim 1, wherein generating the route for the receiving machine further comprises:
identifying the receiving machine as a receiving machine designated to receive crop material having the crop characteristic value of the crop material transferred by the harvester during the material transfer operation;
receiving a current location of the designated receiving machine; and
generating the route for the designated receiving machine to travel from the current location of the designated receiving machine to the material transfer start location range and the material transfer end based on the material transfer end location, the material transfer start location range, and the current location of the designated receiving machine.

5. The computer implemented method of claim 4, wherein the designated receiving machine comprises a designated first receiving machine and wherein generating the route for the designated first receiving machine further comprises:
identifying a second receiving machine designated to receive crop material having the crop characteristic value of the crop material transferred by the harvester during the material transfer operation; and
generating the route for the designated first receiving machine to travel from the current location of the designated first receiving machine to the material transfer start location range and the material transfer end location, and to travel to the designated second receiving machine, based on the material transfer end location, the material transfer start location range, the current location of the designated first receiving machine, and a current location of the designated second receiving machine.

6. The computer implemented method of claim 5, wherein the harvester comprises a first harvester, the method further comprising:
receiving harvester route data indicative of a planned route of a second harvester at the field;
identifying a second material transfer end location indicative of a location, along the planned route of the second harvester, at which a second material transfer operation between the second harvester and a third receiving machine is to end, based on the map, the planned route of the second harvester, and the crop characteristic threshold;
identifying a second material transfer start location range indicative of a geographic area, along the planned route of the second harvester, at which the second material transfer operation is to start; and
generating a route for the third receiving machine to travel based on the second material transfer end location and the second material transfer start location range.

7. The computer implemented method of claim 6, wherein generating the route for the third receiving machine further comprises:
identifying the third receiving machine as a receiving machine designated to receive crop material having the crop characteristic value of the crop material transferred by the second harvester during the second material transfer operation;
receiving a current location of the designated third receiving machine; and
generating the route for the designated third receiving machine to travel from the current location of the designated third receiving machine to the second material transfer start location range and the second material transfer end location, based on the second material transfer end location, the second material transfer start location range, and the current location of the designated third receiving machine.

8. The computer implemented method of claim 7, wherein generating the route for the designated third receiving machine further comprises:
identifying a fourth receiving machine designated to receive crop material having the crop characteristic value of the crop material transferred by the second harvester during the material transfer operation; and
generating the route for the designated third receiving machine to travel from the current location of the designated third receiving machine to the second material transfer start location range and the second material transfer end location, and to travel to the designated fourth receiving machine, based on the second material transfer end location, the second material transfer start location range, the current location of the designated third receiving machine, and a current location of the designated fourth receiving machine.

9. The computer implemented method of claim 1, wherein the crop characteristic is one of:
   a crop constituent;
   a crop moisture; or
   a crop quality.

10. The computer implemented method of claim 1 and further comprising:
   controlling a steering subsystem and a propulsion subsystem of the receiving machine to cause the receiving machine to travel along the generated route.

11. An agricultural harvesting system comprising:
   a harvesting logistics module configured to:
      receive a map that maps values of a crop characteristic to different locations across a field;
      receive harvester route data indicative of a planned route of a harvester at the field;
      identify a crop characteristic threshold;
      identify a material transfer end location indicative of a location, along the planned route of the harvester, at which a material transfer operation between the harvester and a receiving machine is to end, based on the map, the planned route of the harvester, and the crop characteristic threshold;
      identify a material transfer start location range indicative of a geographic area, along the planned route of the harvester, at which the material transfer operation is to start, wherein the material transfer start location range is separated, along the planned route of the harvester, from the material transfer end location; and
      generate a route for the receiving machine to travel based on the material transfer end location and the material transfer start location range.

12. The agricultural harvesting system of claim 11, wherein the harvesting logistics module is further configured to:
   identify a location, along the planned route of the harvester, at which a value of the crop characteristic of the crop material harvested by the harvester satisfies the crop characteristic threshold; and
   identify the material transfer end location based on the location at which the value of the crop characteristic of the crop material harvested by the harvester satisfies the crop characteristic threshold.

13. The agricultural harvesting system of claim 12, wherein harvesting logistic module is further configured to:
   identify an end of range location along the planned route of the harvester at which the material transfer operation can start based on the material transfer end location, a current location of the harvester, a predictive yield of the crop along the planned route of the harvester from the current location of the harvester to the material transfer end location, and a current fill level of the harvester;
   identify a start of range location along the planned route of the harvester at which the material transfer operation can start; and identify, as the material transfer start location range, an area that stretches from the start of range location to the end of range location.

14. The agricultural harvesting system of claim 11, wherein the harvesting logistics module is further configured to:
   identify the receiving machine as a receiving machine designated to receive crop material having the crop characteristic value of the crop material transferred by the harvester during the material transfer operation;
   receive a current location of the designated receiving machine; and
   generate the route for the designated receiving machine to travel from the current location of the designated receiving machine to the material transfer start location range and the material transfer end location, based on the material transfer end location, the material transfer start location range, and the current location of the designated receiving machine.

15. The agricultural harvesting system of claim 14, wherein the designated receiving machine comprises a designated first receiving machine and wherein the harvesting logistics module is further configured to:
   identify a second receiving machine designated to receive crop material having the crop characteristic value of the crop material transferred by the harvester during the material transfer operation; and
   generate the route for the designated first receiving machine to travel from the current location of the designated first receiving machine to the material transfer start location range and the material transfer end location, and to travel to the designated second receiving machine, based on the material transfer end location, the material transfer start location range, the current location of the designated first receiving machine, and a current location of the designated second receiving machine.

16. The agricultural harvesting system of claim 15, wherein the harvester comprises a first harvester, the harvesting logistics module further configured to:
   receive harvester route data indicative of a planned route of a second harvester at the field;
   identify a second material transfer end location indicative of a location, along the planned route of the second harvester, at which a second material transfer operation between the second harvester and a third receiving machine is to end, based on the map, the planned route of the second harvester, and the crop characteristic threshold;
   identify a second material transfer start location range indicative of a geographic area, along the planned route of the second harvester, at which the second material transfer operation is to start; and
   generating a route for the third receiving machine to travel based on the second material transfer end location and the second material transfer start location range.

17. The agricultural harvesting system of claim 16, wherein the harvesting logistics module is further configured to:
   identify the third receiving machine as a receiving machine designated to receive crop material having the crop characteristic value of the crop material transferred by the second harvester during the second material transfer operation;
   receiving a current location of the designated third receiving machine; and generating the route for the third designated third receiving machine to travel from the current location of the designated third receiving machine to the second material transfer start location range and the second material transfer end location, based on the second material transfer end location, the second material transfer start location range, and the current location of the designated third receiving machine.

18. The agricultural harvesting system of claim 17, wherein the harvesting logistics module is further configured to:
identify a fourth receiving machine designated to receive crop material having the crop characteristic value of the crop material transferred by the second harvester during the second material transfer operation; and
generate the route for the designated third receiving machine to travel from the current location of the designated third receiving machine to the second material transfer start location range and the second material transfer end location, and to travel to the designated fourth receiving machine, based on the second material transfer end location, the second material transfer start location range, the current location of the designated third receiving machine, and a current location of the designated fourth receiving machine.

19. A computer implemented method comprising:
receiving a predictive crop characteristic map that maps predictive values of a crop characteristic to different locations across a field;
receiving harvester route data indicative of a planned route of a harvester at the field;
identifying a crop characteristic threshold;
identifying, a location along the planned route of the harvester at which crop material harvested by the harvester will cross the crop characteristic threshold based on the predictive map, the planned route of the harvester, and the crop characteristic threshold;
identifying a material transfer end location, along the planned route of the harvester, indicative of a location at which a material transfer operation is to end based on the location along the planned route of the harvester at which crop material harvested by the harvester will cross the crop characteristic threshold;
identifying a material start location indicative of a location, separated from the material end location along the planned route of the harvester, at which the material transfer operation must start based on the material transfer end location, a current fill level of the harvester, and a predictive yield of the crop along the planned route of the harvester from a current location of the harvester to the material transfer end location; and
identifying a receiving machine as a receiving machine designated to receive crop material having the crop characteristic value of the crop material to be transferred by the harvester during the material transfer operation;
generating a route for the designated receiving machine to travel based on the material transfer end location and the material transfer start location; and
controlling the receiving machine to travel along the generated route.

20. The computer implemented method of claim 19, wherein receiving the predictive crop characteristic map comprises:
receiving an information map that maps values of a characteristic to different locations across the field;
detecting, with an in-situ sensor, a value of the crop characteristic corresponding to a geographic location in the field;
generating, based on the detected value of the crop characteristic corresponding to the geographic location and a value of the characteristic in the map at the geographic location to which the detected value of the crop characteristic corresponds, a predictive crop characteristic model that is configured to receive a value of the characteristic as an input and generate a predictive crop characteristic value as an output; and
generating the crop characteristic map based on the values of the characteristic in the information map and the predictive crop characteristic model.

* * * * *